(12) United States Patent
Desai et al.

(10) Patent No.: US 7,139,247 B2
(45) Date of Patent: Nov. 21, 2006

(54) BROADBAND SYSTEM WITH TOPOLOGY DISCOVERY

(75) Inventors: Gautam Desai, Westford, MA (US); Prasad Dorbala, Waltham, MA (US); Subrahmanyam Dravida, Shrewsbury, MA (US); Dev V. Gupta, Concord, MA (US); Anoop Jayadevan, Waltham, MA (US); Kiran Rege, Marlboro, NJ (US); Manas Tandon, Waltham, MA (US); Sitaram Dikshitulu, Westford, MA (US)

(73) Assignee: Narad Networks, Inc., Westford, MA (US)

( * ) Notice: Subject to any disclaimer, the term of this patent is extended or adjusted under 35 U.S.C. 154(b) by 780 days.

(21) Appl. No.: 09/952,321

(22) Filed: Sep. 13, 2001

(65) Prior Publication Data

US 2002/0075814 A1    Jun. 20, 2002

Related U.S. Application Data

(60) Provisional application No. 60/278,811, filed on Mar. 26, 2001, provisional application No. 60/234,682, filed on Sep. 22, 2000.

(51) Int. Cl.
   *H04L 12/28*    (2006.01)
(52) U.S. Cl. ................. 370/255; 370/401; 370/392
(58) Field of Classification Search ............... 370/235, 370/401, 389, 392, 395.31, 399
   See application file for complete search history.

(56) References Cited

U.S. PATENT DOCUMENTS 3,730,998 A    5/1973    Schmidt et al.

(Continued)

FOREIGN PATENT DOCUMENTS

WO    WO 99/22528    5/1999

OTHER PUBLICATIONS

RFC2131 Dynamic Host Configuration Protocol, by R. Droms, Mar. 1997, IETF Network Working Group, pp. 1 & 24-35 (Sec. 4.3-4.4.1).*

(Continued)

*Primary Examiner*—Hassan Kizou
*Assistant Examiner*—Albert T. Chou
(74) *Attorney, Agent, or Firm*—Fish & Neave IP Group, Ropes & Gray LLP

(57) ABSTRACT

Hybrid fiber/coax networks employ the existing cable plant used for cable TV and transmit data signals in a frequency bandwidth above that which is used for cable TV. As this cable plant was deployed in a tree and branch topology, data transmissions may be susceptible to noise, variable transmission loss and frequency dispersion, particularly in the upstream direction. Further, due to the tree and branch topology, homes at the far end of the network experience much greater loss than do the homes that are near to the headend/ONU. The present system, which uses point-to-point data links between intelligent network elements located in the feeder/distribution network to provide reliable, secure, bi-directional broadband access. Digital signals are terminated at the intelligent network elements, switched and regenerated for transmission across additional upstream or downstream data links as needed to connect a home to a headend or router. The intelligent network elements can be co-located with or replace the standard network elements to take advantage of existing network configurations. The standard network elements can be selectively replaced by the intelligent network elements in an incremental approach. A method of discovering the network topology includes sending a message from one of the network elements on a transmission path to a topology server, the message including information identifying the one network element. At each intermediate network element in the transmission path, information identifying each intermediate network element is appended to the message. In this manner, the data links are made over relatively short runs of coax cable, which can provide greater bandwidth than the typical end-to-end feeder/distribution connection between a home and the headend or optical network unit.

14 Claims, 43 Drawing Sheets

U.S. PATENT DOCUMENTS

| | | | |
|---|---|---|---|
| 4,748,638 A | 5/1988 | Friedman et al. | |
| 5,499,047 A | 3/1996 | Terry et al. | 348/6 |
| 5,528,582 A | 6/1996 | Bodeep et al. | 370/24 |
| 5,696,762 A | 12/1997 | Natali et al. | |
| 5,745,837 A | 4/1998 | Fuhrmann | |
| 5,754,586 A | 5/1998 | Carsello | |
| 5,754,941 A | 5/1998 | Sharpe et al. | |
| 5,765,097 A | 6/1998 | Dail | 455/5.1 |
| 5,774,458 A | 6/1998 | Williamson | 370/276 |
| 5,805,586 A | 9/1998 | Perreault et al. | |
| 5,812,786 A | 9/1998 | Seazholtz et al. | 395/200.63 |
| 5,822,677 A | 10/1998 | Peyrovian | 455/5.1 |
| 5,835,023 A | 11/1998 | Ito et al. | |
| 5,835,125 A | 11/1998 | Bhagavath | 348/6 |
| 5,841,468 A | 11/1998 | Wright | 348/6 |
| 5,854,703 A | 12/1998 | West, Jr. | |
| 5,864,672 A | 1/1999 | Bodeep et al. | 395/200.48 |
| 5,864,748 A | 1/1999 | Dail | 455/5.1 |
| 5,878,177 A | 3/1999 | Karasan et al. | 385/17 |
| 5,878,325 A | 3/1999 | Dail | 455/5.1 |
| 5,884,024 A | 3/1999 | Lim et al. | |
| 5,917,822 A | 6/1999 | Lyles et al. | |
| 5,922,049 A | 7/1999 | Radia et al. | |
| 5,953,338 A | 9/1999 | Ma et al. | |
| 5,959,658 A | 9/1999 | Gnauck et al. | 348/6 |
| 5,963,561 A | 10/1999 | Lu | 370/458 |
| 5,963,844 A | 10/1999 | Dail | 455/5.1 |
| 5,982,554 A | 11/1999 | Goldstein et al. | 359/629 |
| 6,011,548 A | 1/2000 | Thacker | |
| 6,052,375 A | 4/2000 | Bass et al. | |
| 6,061,330 A | 5/2000 | Johansson | |
| 6,064,805 A | 5/2000 | McCrory et al. | |
| 6,073,178 A | 6/2000 | Wong et al. | |
| 6,075,787 A | 6/2000 | Bobeck et al. | |
| 6,084,905 A | 7/2000 | Ishifuji et al. | |
| 6,088,729 A | 7/2000 | McCrory et al. | |
| 6,104,700 A | 8/2000 | Haddock et al. | |
| 6,137,780 A | 10/2000 | Darcie et al. | 370/248 |
| 6,137,793 A | 10/2000 | Gorman et al. | 370/360 |
| 6,173,312 B1 | 1/2001 | Atarashi et al. | |
| 6,188,698 B1 | 2/2001 | Galand et al. | |
| 6,230,203 B1 | 5/2001 | Koperda et al. | |
| 6,240,464 B1 | 5/2001 | Fijolek et al. | |
| 6,256,505 B1 | 7/2001 | Kingdon et al. | |
| 6,331,987 B1 | 12/2001 | Beser | |
| 6,339,595 B1 | 1/2002 | Rekhter et al. | |
| 6,345,296 B1 | 2/2002 | McCrory et al. | |
| 6,381,242 B1 | 4/2002 | Maher, III et al. | |
| 6,408,006 B1 | 6/2002 | Wolff | |
| 6,442,138 B1 | 8/2002 | Yin et al. | |
| 6,490,727 B1 | 12/2002 | Nazarathy et al. | |
| 6,493,402 B1 | 12/2002 | Fimoff | |
| 6,504,819 B1 | 1/2003 | Fowler et al. | |
| 6,512,768 B1 | 1/2003 | Thomas | |
| 6,588,016 B1 | 7/2003 | Chen et al. | |
| 6,603,758 B1 | 8/2003 | Schmuelling et al. | |
| 6,604,147 B1 | 8/2003 | Woo | |
| 6,633,540 B1 | 10/2003 | Raisanen et al. | |
| 6,643,694 B1 | 11/2003 | Chernin | |
| 6,693,878 B1 * | 2/2004 | Daruwalla et al. | 370/235 |
| 6,693,912 B1 | 2/2004 | Wang | |
| 6,697,360 B1 | 2/2004 | Gai et al. | |
| 6,697,864 B1 | 2/2004 | Demirtjis et al. | |
| 6,704,789 B1 | 3/2004 | Ala-Laurila et al. | |
| 6,728,208 B1 | 4/2004 | Puuskari | |
| 6,731,639 B1 | 5/2004 | Ors et al. | |
| 6,742,187 B1 | 5/2004 | Vogel | |
| 6,751,417 B1 | 6/2004 | Combs et al. | |
| 6,768,743 B1 * | 7/2004 | Borella et al. | 370/401 |
| 6,785,236 B1 | 8/2004 | Lo et al. | |
| 6,788,681 B1 | 9/2004 | Hurren et al. | |
| 6,799,220 B1 | 9/2004 | Merritt et al. | |
| 6,804,776 B1 | 10/2004 | Lothberg et al. | |
| 6,839,321 B1 | 1/2005 | Chiruvolu | |
| 6,847,609 B1 | 1/2005 | Sarnikowski et al. | |
| 6,862,286 B1 * | 3/2005 | Tams et al. | 370/401 |
| 6,865,185 B1 | 3/2005 | Patel et al. | |
| 2001/0030970 A1 | 10/2001 | Wiryaman et al. | |
| 2001/0053149 A1 | 12/2001 | Mo et al. | |
| 2002/0007360 A1 | 1/2002 | Hawkinson | |
| 2002/0026523 A1 | 2/2002 | Mallory et al. | |
| 2002/0059634 A1 | 5/2002 | Terry et al. | |
| 2002/0061012 A1 | 5/2002 | Thi et al. | |
| 2003/0095562 A1 | 5/2003 | Liu et al. | |
| 2003/0142642 A1 | 7/2003 | Agrawal et al. | |
| 2005/0031097 A1 | 2/2005 | Rabenko et al. | |

OTHER PUBLICATIONS

"Data-over-cable Service Interface Specification," Radio Frequency Interference Specification, SP-RFI-104-980724.

Cable Digital News; Copyright 1999; http://www.cabledatacomnews.com/cmic/diagram.html.

Chand, N., et al., "Delivery of Digital Video and Other Multimedia Services (>1 Gb/s Bandwidth) in Passband above the 155 Mb/s Baseband Services on a FTT x Full Service Access Network," Journal of Lightwave Technology, 17(12):2449-2460 (1999).

Droubi, M., et al., "Dynamic bandwidth allocation for the HFC DOCSIS MAC protocol," 0-7803-6494-5/00/$10.00 (c) 2000 IEEE.

Smythe, C., et al., "Standards of Interactive Multimedia Delivery Across CATV Infrastructures," International Broadcasting Convention, Sep. 12-16, 1997, Conference Publication No. 447, (c) IEE, 1997.

* cited by examiner

| 834 | Type = 171 | Length = 1 | Device Type = DA/TAP/NIU | |
|---|---|---|---|---|
| 836 | Type = 174 | Length = 1 | Number of elements = 3 | |
| 838 | Type = 175 | Length = 7 | MAC Address_0 | Ingress Port No. = 0 |
| 840A | Type = 175 | Length = 7 | MAC Address_1 | Ingress Port No. = 2 |
| 840B | Type = 175 | Length = 7 | MAC Address_2 | Ingress Port No. = 4 |

*FIG. 25*

| 852 | 854 | 856 |
|---|---|---|
| Message Type 2-Bytes | Message Length 2-Bytes | Information 1-1000 Bytes |

| Message Type | Call Agent ID. | Conn. ID | NBAN User IP Address And Port No. | Remote User IP Address And Port No. | Traffic Descriptor | | | | |
|---|---|---|---|---|---|---|---|---|---|
| | | | | | Sust. Rate | Peak Rate | Max. Burst Size | Max. Packet Size | Delay Param. |

*FIG. 37D*

| Message Type | Call Agent ID. | Conn. ID | NBAN User IP Address And Port No. | Remote User IP Address And Port No. | Traffic Descriptor | | | | |
|---|---|---|---|---|---|---|---|---|---|
| | | | | | Sust. Rate | Peak Rate | Max. Burst Size | Max. Packet Size | Delay Param. |

*FIG. 37E*

| Message Type | CAC Server Identifier | Conn. Identifier |
|---|---|---|

*FIG. 37F*

| Message Type | Call Agent Identifier | Conn. Identifier |
|---|---|---|

*FIG. 37G*

BROADBAND SYSTEM WITH TOPOLOGY DISCOVERY

RELATED APPLICATIONS

This application claims the benefit of U.S. Provisional Application No. 60/234,682, filed Sep. 22, 2000 and U.S. Provisional Application No. 60/278,811, filed on Mar. 26, 2001. This application is co-pending with U.S. patent application Ser. No. 09/952,374, entitled "Broadband System with Intelligent Network Devices," U.S. patent application Ser. No. 09/952,482, entitled "Network Architecture for Intelligent Network Elements," U.S. patent application Ser. No. 09/952,479, entitled "System and Method of Assigning Network Data Packet Header," U.S. patent application Ser. No. 09/952,327, entitled "System and Method for Call Admission Control," U.S. patent application Ser. No. 09/952,480, entitled "System and Method for Mapping End User Identifiers to Access Device Identifiers," U.S. patent application 09/952,373, entitled "System and Method for Message Transmission Based on Intelligent Network Element Device Identifiers," U.S. patent application Ser. No. 09/952,207, entitled "Broadband System Having Routing Identification Based Switching," U.S. patent application Ser. No. 09/952,306, entitled "Broadband System Having Routing Identification Assignment," U.S. patent application Ser. No. 09/952,322, entitled "Broadband System with QOS Based Packet Handling," U.S. patent application Ser. No. 09/952,381, entitled "Broadband System with Transmission Scheduling and Flow Control," and U.S. patent application Ser. No. 09/952,481, entitled "Broadband System with Traffic Policing and Transmission Scheduling" all filed on Sep. 13, 2001. The entire teachings of the above application(s) are incorporated herein by reference.

BACKGROUND

Data networking technology has witnessed tremendous growth over the past decade, and is ready to take off in an unprecedented manner as newer services and applications become available to the home and business user. However, most of this development and growth has been in the backhaul networks where high capacity routers and ultra-high capacity optical links have created a truly broadband infrastructure. The so-called last mile—the access link connecting the user to the backhaul infrastructure—remains a bottleneck in terms of the bandwidth and service quality it affords the end-user. It is possible to provide a high quality, high bandwidth access medium by taking "fiber to the home." However, such a solution is inordinately expensive from the service provider's perspective. Alternate solutions such as ADSL (Asymmetric Digital Subscriber Line) and DOCSIS (Data Over Cable System Interface Specification) based cable access, which make use of the existing access infrastructure, are asymmetric in the bandwidth they provide in the upstream and downstream directions.

The typical communication network deployed today by cable television service providers uses hybrid fiber/coax (HFC) technology. An example of such a network is shown in FIG. 1. The network includes a headend 10 connected to an optical network unit (ONU) 12 over optical fiber cable 11 using analog transmission, trunk amplifiers 14, taps 16, line extenders 18 and coax cable 20 (feeder 22, distribution 24 and drop 26 connected to homes 28). The network is considered hybrid because the connection between the ONU and the headend uses optical fiber cable in a physical star or point-to-point configuration while the connections between the ONU and the homes use coax cable in a tree and branch topology.

An HFC network with a single ONU typically serves anywhere from 500 to 2000 homes. The feeder portion 22 includes trunk amplifiers 14 that are spaced every 2000 to 3000 feet. In the distribution portion 24, taps 16 are added as needed to serve homes passed by the distribution coax cable 20. A tap typically serves between 2 and 8 homes to connect to individual homes over drops 26 that are up to 400 feet in length. Line extenders 18 are added in the distribution to boost the signals as needed.

The tree and branch feeder/distribution portions 22 24 were designed originally for downstream broadcast signal distribution. For example, each of the trunk amplifiers, line extenders and taps was designed for handling downstream signals. Nevertheless, today's networks have been adapted to provide upstream signal transmission also. FIG. 2 shows the typical frequency spectrum for upstream and downstream transmission in the network. Downstream transmission of analog signals from the ONU 12 to the homes 28 generally occupies a bandwidth range that starts at 55 MHz and ends at 550, 750 or 860 MHz, depending on the type of network equipment used. The downstream analog bandwidth is divided into 6 MHz channels (8 MHz in Europe). The upstream transmission from the homes 28 to the ONU 12 is usually specified to occupy the bandwidth range between 5 and 45 MHz. The DOCSIS protocol has been developed for handling bi-directional signal transmission. Newer systems also use a band of frequencies located above the analog downstream band to provide downstream digital services. These digital services are delivered in 6 MHz channels at a typical data rate of 25 Mbps.

There are several problems that can occur with the upstream signal transmission, namely, ingress noise, variable transmission loss and frequency dispersion. Ingress noise in the upstream direction is a problem that is due primarily to poor and irregular grounding of the drop coax cable terminated at the home. Because of the tree and branch topology, homes at the far end of the network experience much greater loss than do the homes that are near to the headend/ONU. In addition, the impulse response can be very different from home to home due to reflections. The variable loss and variable impulse response requires the use of complex signal equalization at the receiver located at the headend/ONU. This equalization can require on the order of milliseconds to converge and can only correct for flat loss in the cable plant. To deal with the frequency dispersion, the DOCSIS protocol may divide the upstream signal into subchannels, such as 10 or 20 subchannels of 1 MHz bandwidth each and uses Quadrature Phase-Shift Keying (QPSK) or 16 QAM (Quadrature Amplitude Modulation) signal modulation. Each such subchannel operates at about 1.5 Mbps for a total upstream bandwidth on the order of 10 to 20 Mbps. Since the upstream bandwidth is shared typically by about 500 homes, a DOCSIS modem at the home typically is restricted to a maximum upstream data rate of 100 Kbps.

As cable service providers modernize their network plant, they have begun to lay optical fiber from the headend to the trunk amplifiers 14. Their intent has been to separate the DOCSIS based digital data onto an optical fiber that is separate from that which carries the analog video signals. In addition, Cable Modem Termination System (CMTS) functionality has been introduced at the trunk amplifiers to allow the customers on each distribution segment to access the DOCSIS bandwidth. However, this approach still suffers from limited bandwidth in both the upstream and downstream directions. Furthermore, this approach continues to suffer from performance problems caused by ingress and the quality of service and delay problems caused by a contention based access scheme in the upstream direction. In addition, due to the shared medium nature of the cable plant, privacy and security are very big concerns in the DOCSIS specification. In such systems it is possible for a customer on the shared medium to receive and decipher unencrypted data from other customers.

Maintaining optimal performance of the network elements can be a challenge in today's networks. For example, trunk amplifiers and line extenders can drift which then requires manual measurements and realignments in the field. Component failure in the feeding branches of the existing system can render an entire neighborhood out of service. In addition, service provisioning requires manual labor in the field. Current network repair is primarily done in a reactionary mode, prompted by phone calls from affected customers.

SUMMARY

The requirements of broadband applications and services continue to stress the abilities of today's communication networks. In particular, the upstream requirements of next generation applications are not supported in scale by existing ADSL or cable systems. There is a need for an access technology that can expand the bandwidth available to the end user to a level that is consistent with the capacity of the optical network core such that a true peer-to-peer broadband internet can be realized.

The above and other problems are solved by the present system, which uses point-to-point data links between intelligent network elements located in the feeder/distribution network to provide reliable, secure, symmetric, bi-directional broadband access. Digital signals are terminated at the intelligent network elements, switched and regenerated for transmission across additional upstream or downstream data links as needed to connect a home to a headend or router. In one embodiment, the present system provides an overlay onto the existing cable television network such that the point-to-point data links are carried on the cable plant using bandwidth that resides above the standard upstream/downstream spectrum. The intelligent network elements can be co-located with or replace the standard network elements (i.e., trunk amplifiers, taps, line extenders, network interface at the home) to take advantage of existing network configurations. The standard network elements can be selectively replaced by the intelligent network elements in an incremental approach. In this manner, the data links are made over relatively short runs of coax cable, which can provide greater bandwidth than the typical end-to-end feeder/distribution connection between a home and the headend or optical network unit.

The bandwidth on a distribution portion in an embodiment of the invention is about 100 Mbps and is shared by only about 50 to 60 homes. The point-to-point nature of the present system allows a user to operate with statistically multiplexed rates on the order of an average of 2 Mbps while peaking up to 100 Mbps occasionally. By increasing the transmission rates in the feeder and distribution portions, still higher user rates are possible. For example, increasing the feeder distribution bandwidth to 10 Gbps using separate fiber feeder and increasing the distribution bandwidth to 1 Gbps using 1 Gbps Ethernet or other RF technologies allows user rates at the home on the order of 100 Mbps. It should be understood that while embodiments are described herein which employ hybrid fiber/coax cable plant, the principles of the present invention are applicable to alternate embodiments, which use all fiber cable in the feeder/distribution in tree and branch topologies.

In accordance with the present invention, an intelligent network element includes a data switch, at least two transceivers and a processor. In an embodiment, the data switch is a multiport Layer 2 data switch controlled by the processor and the transceiver comprises 100BaseT or 1 Gbps Ethernet or other data transmission technologies. The transmitter input and the receiver output are connected to respective output and input ports of the Layer 2 data switch. The transmitter output and the receiver input are coupled to the coax cable plant through respective up and down converters. The transmitters and receivers terminate data links, which connect with other upstream, or downstream intelligent network elements. The Layer 2 data switch multiplexes messages received on the data links across the multiple ports.

The present invention provides a truly broadband access medium. Components are capable of being inserted into an existing HFC cable infrastructure to convert that infrastructure into a truly broadband, Quality of Service (QoS) enabled access medium. The present invention offers cable service providers a low cost solution that enables them to provide to the home and small business users a high quality, high bandwidth access medium capable of delivering next generation services. The present approach also provides immediate data security starting at the customer drop. Since all of the network elements are addressable, a proactive rather than reactive maintenance approach is made possible. In addition, a switch-bypass capability incorporated in the intelligent network elements can be automatically invoked in the event of component malfunction thereby drastically reducing system unavailability to customers in a given neighborhood.

A method of discovering the network topology includes sending a message from one of the network elements on an upstream path to a topology server, the message including information identifying the one network element. At each intermediate network element in the upstream path, information identifying each intermediate network element is appended to the message.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 25 illustrates DHCP options fields at an intermediate network element.

FIG. 27 shows a message structure for control messages.

FIGS. 37A–37G show message formats for resource request, request grant, request denial, resource commit, commit confirm, release confirm and resource release messages, respectively.

DETAILED DESCRIPTION OF THE INVENTION

A description of preferred embodiments of the invention follows.

The following definitions are employed herein:

Intelligent Network Element:

A device for receiving and transmitting signals over a transmission medium such as a coaxial cable including a data switch, two or more transceivers each connected to the medium, and a processor, and operable to pass through a portion of the signals on the coaxial cable at a lower bandwidth and operable to process and switch a portion of the signals on the medium at a higher bandwidth, the intelligent network elements including a distribution switch, subscriber access switch, intelligent line extender, and network interface unit.

Connection (also Interconnection):

A physical or logical coupling between network elements operable for communication of signals, including messages, packets, and frames, between the network elements.

Point-to-Point:

A manner of transmitting signals (including messages, packets, and frames) over a connection between two network elements.

Tree and Branch:

A network topology in which a physical connections extending from a headend to an end user define an acyclic path having no loops or meshes.

Link (or Data Link):

A connection between adjacent network elements and terminating at a transceiver in each of the adjacent network elements.

Utilization Parameters:

Data indicative of the current rate of message transmission, or bandwidth, currently being carried relative to the maximum message throughput which may be accommodated, or carried, over a connection or portion of a connection.

Admissible Region:

The difference between the current rate of message transmission and the maximum message throughput which may be carried, and therefore indicative of the remaining bandwidth which remains for allocation to user message traffic.

Critical Segment:

A link which brings upstream traffic to an element at a speed which is lower than the speed at which the traffic is going to be carried beyond that element i.e. a bottleneck which defines the lowest throughput of the path back to the headend from an end user.

Overview of Access Network

Figure 3:
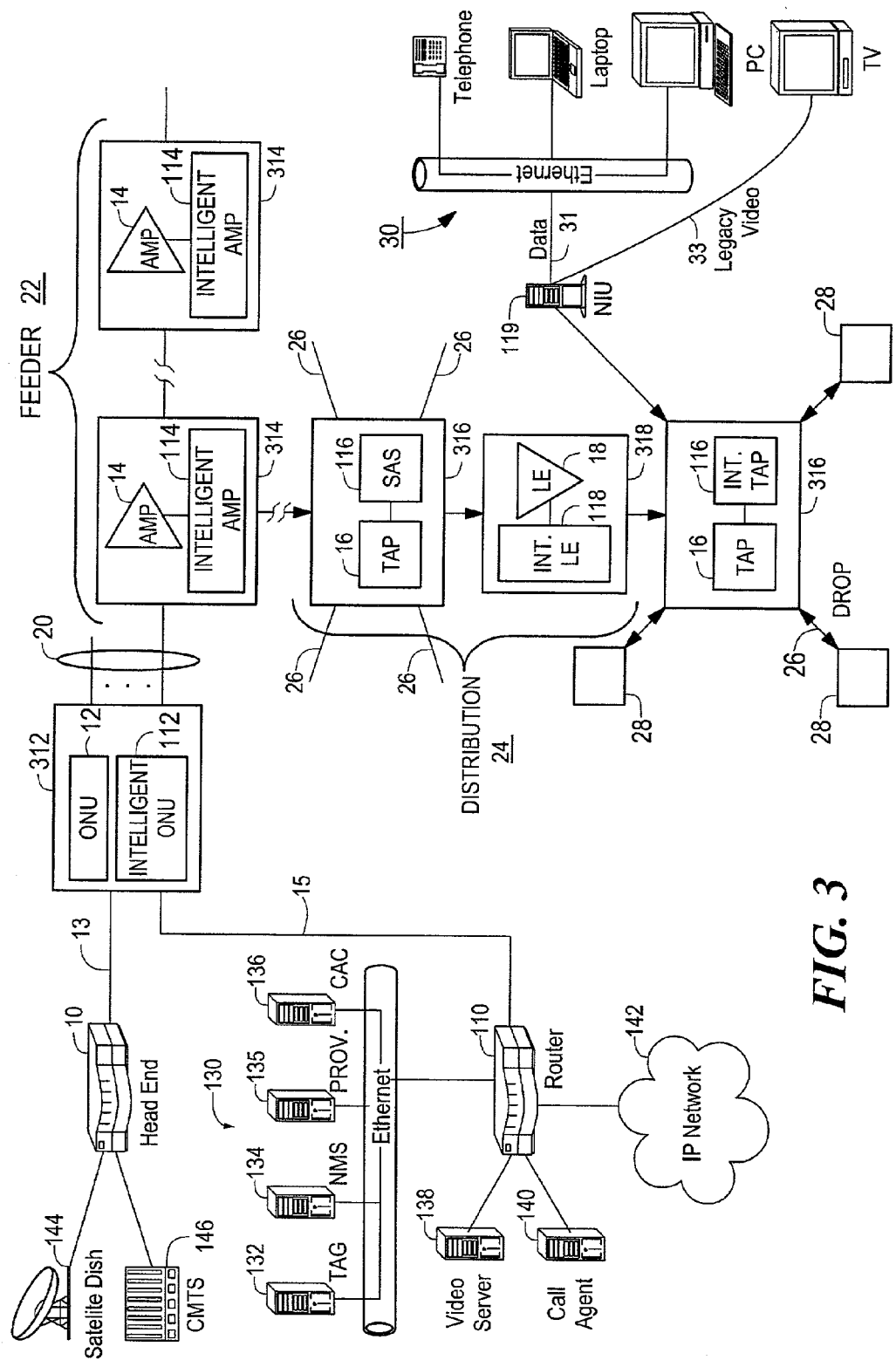
FIG. 3 illustrates an embodiment of a network configuration of intelligent network elements in accordance with the present invention for providing point-to-point data links between intelligent network elements in a broadband, bidirectional access system.

FIG. 3 illustrates an embodiment of a network configuration in accordance with the present invention. This network configuration is described in U.S. Provisional Application No. 60/234,682 filed Sep. 22, 2000 which is incorporated herein in its entirety. The network configuration, also referred to herein as an Access Network, includes intelligent network elements each of which uses a physical layer technology that allows data connections to be carried over coax cable distribution facilities from every subscriber. In particular, point-to-point data links are established between the intelligent network elements over the coax cable plant. Signals are terminated at the intelligent network elements, switched and regenerated for transmission across upstream or downstream data links as needed to connect a home to the headend.

Figure 4:
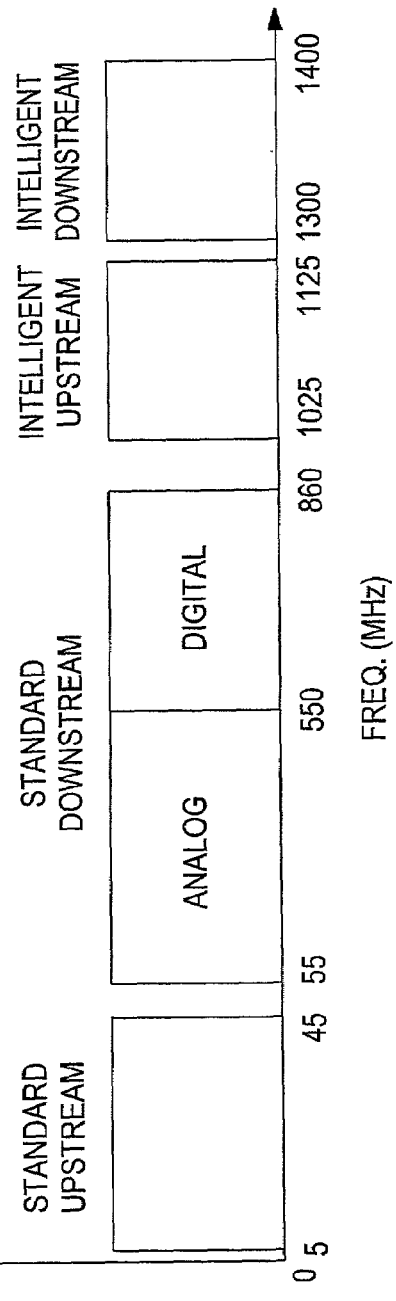
FIG. 4 shows additional frequency spectrum included for upstream and downstream communications over a first embodiment of the network of FIG. 3.
Figure 5:
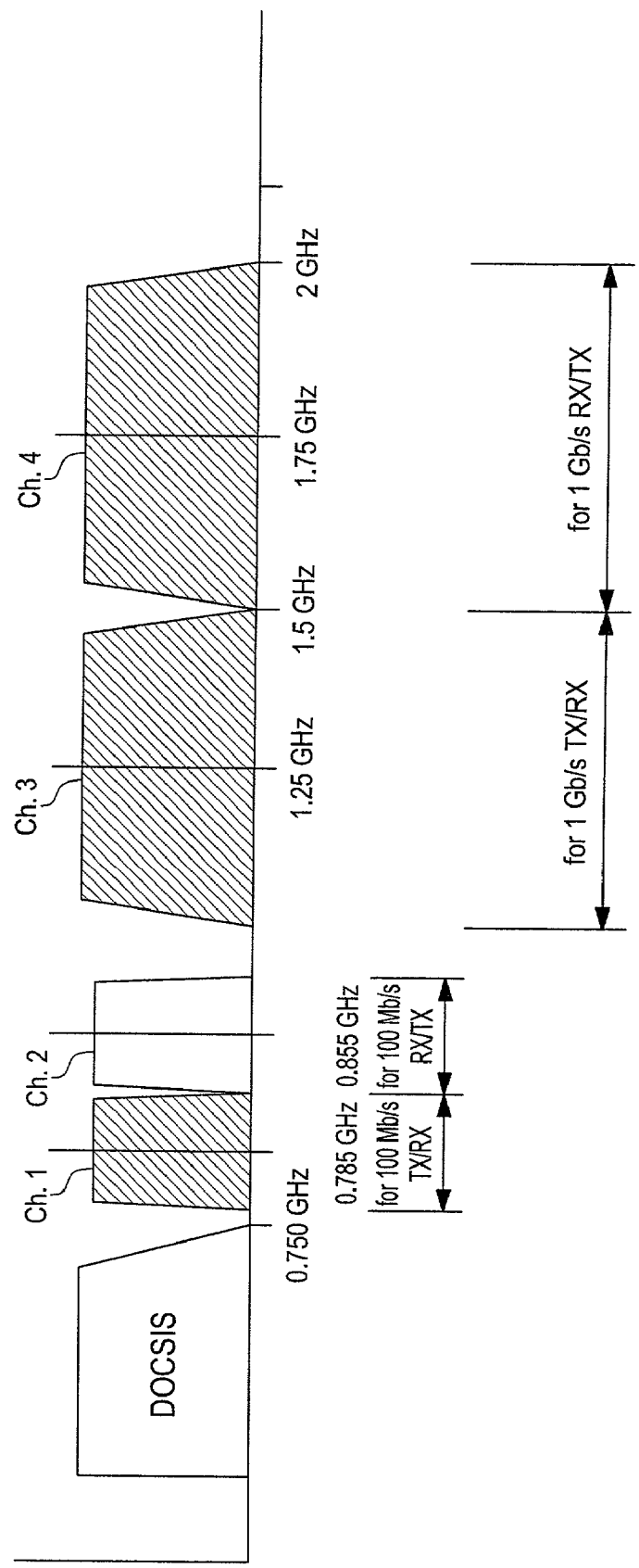
FIG. 5 shows additional frequency spectrum included for upstream and downstream communications over a second embodiment of the network of FIG. 3.

The intelligent network elements are interconnected using the existing cable television network such that the point-to-point data links are carried on the cable plant using bandwidth that resides above the standard upstream/downstream spectrum. FIG. 4 shows the additional upstream and downstream bandwidth, nominally illustrated as residing at 1025 to 1125 MHz (upstream) and 1300 to 1400 MHz (downstream), though other bandwidths and frequencies can be used. In a second embodiment, the 100 Mbps upstream and downstream bandwidths are provided in the spectrum 750 to 860 MHz. In these embodiments, intelligent network elements can co-exist with today's standard elements which allow signals up to about 1 GHz to be passed through. FIG. 5 shows a frequency spectrum allocation above the DOCSIS spectrum as defined in the following table for a second embodiment, with duplexing channel spectrums allocated in the 777.5 MHz to 922.5 MHz regime for 100 Mb/s operation and in the 1 GHz to 2 GHz regime for 1 Gb/s operation. These are example frequencies and can vary depending on implementation.

TABLE 1

| | Frequency Allocation | | | |
|---|---|---|---|---|
| | 100 Mb/s Ch 1 | 100 Mb/s Ch 2 | 1 Gb/s Ch 3 | 1 Gb/s Ch 4 |
| Lower Cutoff | 777.5 MHz | 857.5 MHz | 1 GHz | 1.5 GHz |
| Upper Cutoff | 842.5 MHz | 922.5 MHz | 1.5 GHz | 2 GHz |

Figure 1:
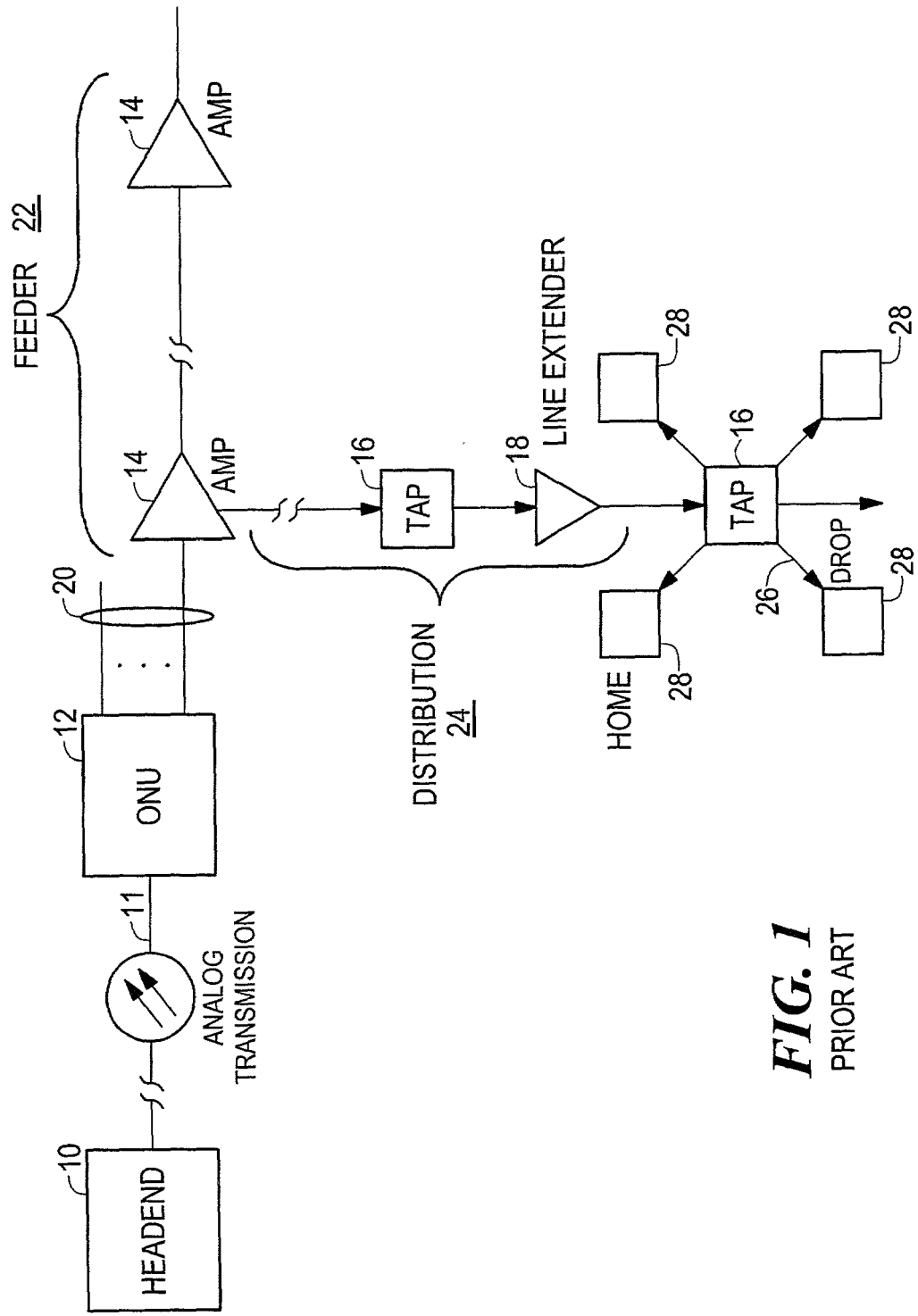
FIG. 1 illustrates a conventional hybrid fiber/coax cable television feeder/distribution network.
Figure 2:
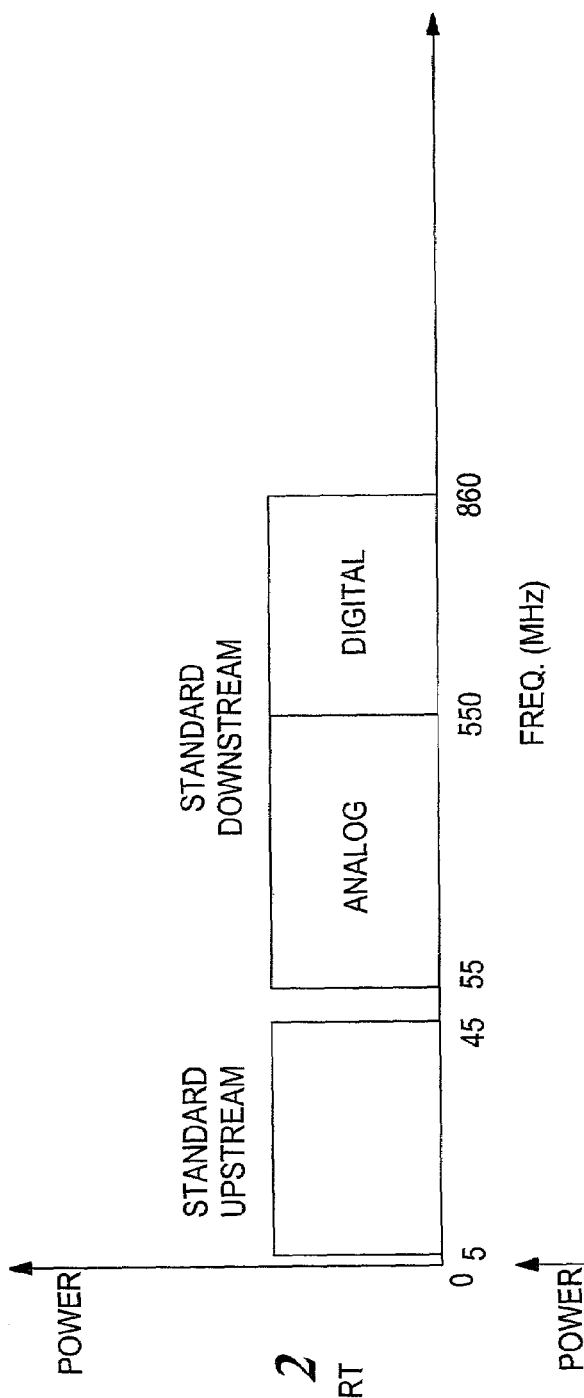
FIG. 2 shows the typical frequency spectrum for upstream and downstream communications over the network of FIG. 1.

Referring again to FIG. 3, the intelligent network elements include an intelligent optical network unit or node 112, intelligent trunk amplifier 114, subscriber access switch (SAS) 116, intelligent line extender 118 and network interface unit (NIU) 119. A standard residential gateway or local area network 30 connected to the NIU 119 at the home is also shown. Note that the trunk amplifier 114 is also referred to herein as a distribution switch (DS). In an embodiment, the intelligent network elements can be combined with or replace the respective standard network elements (FIG. 1) so as to take advantage of existing network configurations. Thus, the configuration shown includes ONU assembly 312 comprising standard ONU 12 and intelligent ONU 112 also referred to herein as an optical distribution switch (ODS). Likewise, trunk amplifier or DA assembly 314 includes conventional trunk amp 14 and intelligent trunk amp 114; cable tap assembly 316 includes standard tap 16 and subscriber access switch 116; and line extender assembly 318 includes standard line extender 18 and intelligent line extender 118.

The intelligent ONU or ODS is connected over line 15 to a router 110, which has connections to a server farm 130, a video server 138, a call agent 140 and IP network 142. The server farm 130 includes a Tag/Topology server 132, a network management system (NMS) server 134, a provisioning server 135 and a connection admission control (CAC) server 136, all coupled to an Ethernet bus which are described further herein.

A headend 10 is shown having connections to a satellite dish 144 and CMTS 146. To serve the legacy portion of the network, the headend 10 delivers a conventional amplitude modulated optical signal to the ONU 12. This signal includes the analog video and DOCSIS channels. The ONU performs an optical to electrical (O/E) conversion and sends radio frequency (RF) signals over feeder coax cables 20 to the trunk amplifiers or DAs 14. Each DA along the path amplifies these RF signals and distributes them over the distribution portion 24.

The present system includes intelligent network elements that can provide high bandwidth capacity to each home. In the Access Network of the present invention, each intelligent network element provides switching of data packets for data flow downstream and statistical multiplexing and priority queuing for data flow upstream. The legacy video and DOCSIS data signals are able to flow through transparently because the intelligent network elements use a part of the frequency spectrum of the coax cable that does not overlap with the spectrum being used for legacy services.

Overview of Network Elements

The functionality of each of the intelligent network elements is now described in relation to particular embodiments.

As noted above, the network elements of the Access Network combine the legacy functions of distribution amplifiers and taps into intelligent devices that also provide switching of digital traffic in the downstream direction and queuing, prioritization and multiplexing in the upstream direction.

Figure 6:
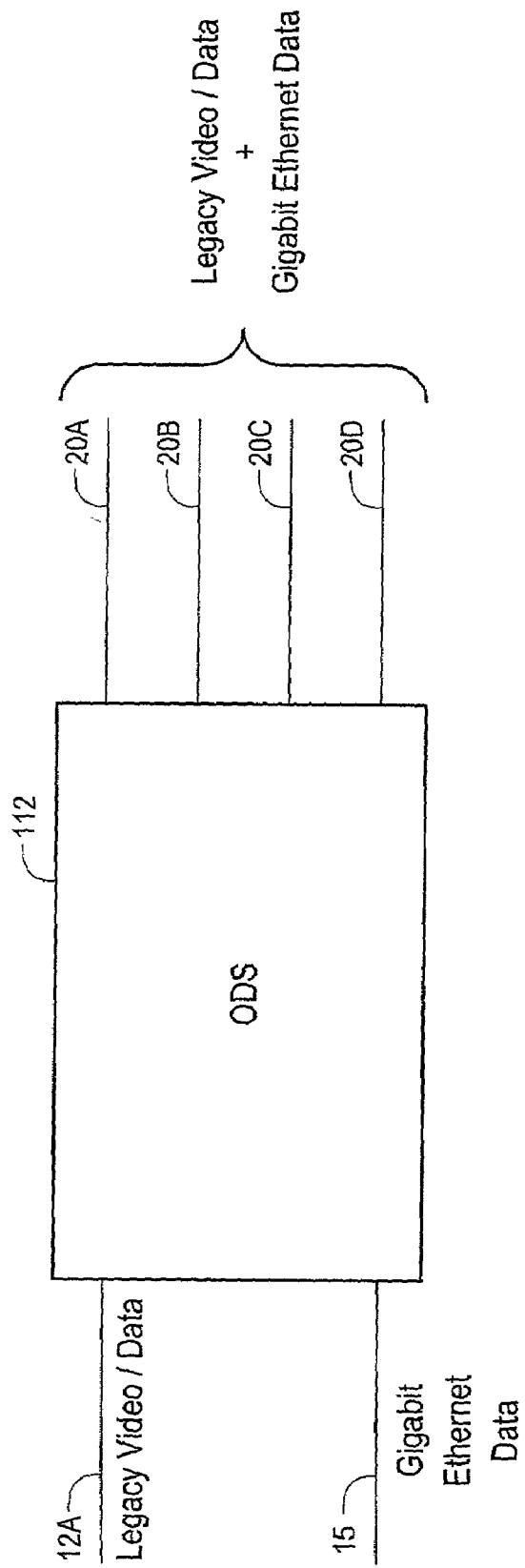
FIG. 6 is a block diagram of interfaces to an optical distribution switch.

Referring to FIG. 6, in an embodiment of the Access Network of the present invention, the intelligent ONU or ODS 112 receives a high-speed data signal (e.g., Gigabit Ethernet) from router 110 on line 15. After an O/E conversion, the Gigabit Ethernet packetized data is switched depending on its destination to the appropriate port 20A, 20B, 20C or 20D. At the egress of this port, the data is modulated into RF bandwidth signals and combined with the legacy RF signals received from the ONU 12 on line 12A for transmission over the feeder coax cables 20. Switching of the data is also performed at each DS 114 and SAS 116 until the data reaches the destination NIU 119, at which point the data is transmitted on the Home LAN, or Ethernet 30. Filtering and switching at each intelligent network element provides guaranteed privacy of user data downstream.

In the upstream direction, the ODS 112 collects data from the ports 20A, 20B, 20C, 20D and separates the legacy data and video from the Gigabit Ethernet data. The legacy data and video signals are passed to the ONU on line 12A and the Gigabit Ethernet data is multiplexed, converted to optical signals and forwarded to the router on line 15.

The ODS performs several functions that allow the Access Network to inter-work with any standard router and at the same time switch data efficiently through the Access Network. As is well known, a standard Ethernet packet includes layer 2 and layer 3 address information and a data payload. The layer 2 information includes a destination MAC address that is 48 bits in length. As described further herein, the present approach provides for more efficient switching in the Access Network by associating a routing identification or Routing ID (RID) with each network element e.g. NIUs 119 in the Access Network. The RID is 12 bits in length and is included in an Access Network Header. As described further herein, the Tag/Topology server 132 (FIG. 3) assigns the RIDs. The ODS 12 acts as a learning bridge to learn and maintain the MAC address<->RID mapping and inserts the Access Network Header containing the RID of the destination element (e.g., NIU) for all packets going downstream into the Access Network. In case of an unknown MAC Address, the ODS inserts a broadcast RID. The Gigabit Ethernet data is terminated, processed and switched onto the appropriate port(s) based on the entry for the corresponding RID in a routing table kept at the ODS. The routing table simply maps the RIDs to the egress ports of the network element. For upstream packets received from the Access Network, the ODS strips off the Access Network Header and forwards a standard Ethernet packet to the router.

Additionally, the ODS communicates with the NMS 134 (FIG. 3) to provision the upstream and downstream traffic shaping criteria. The ODS uses this criteria to regulate the upstream and downstream traffic.

Figure 7:
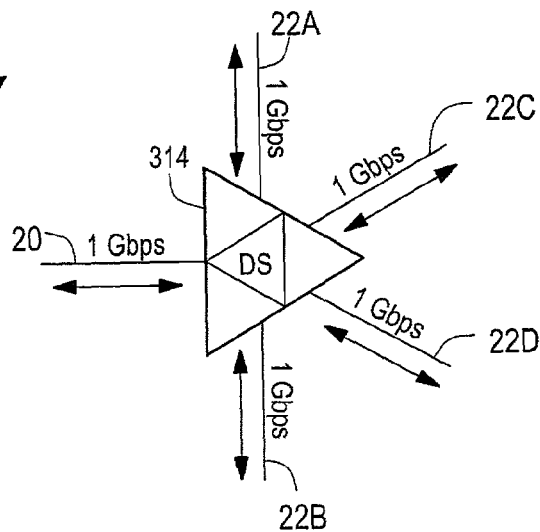
FIG. 7 is a block diagram of interfaces to a network distribution switch.

Referring now to FIG. 7, the DS 314 has a coax 20 port coupled to an upstream ODS, SAS, or DS and at least four coax ports 22A, 22B, 22C and 22D coupled to downstream DSs or SASs. In the downstream direction, the DS receives legacy video/data and Gigabit Ethernet data from either the ODS or an upstream DS or SAS on the coax 20. The legacy video and data is amplified and propagated on all of the ports 22A, 22B, 22C and 22D. The Gigabit Ethernet data is processed and switched onto the appropriate port(s) based on the entry for the corresponding Routing ID in a routing table kept at the DS.

In the upstream direction, the DS 314 receives Gigabit Ethernet data and legacy data signals from all four ports 22A, 22B, 22C and 22D and queues the Gigabit Ethernet data based on assigned priorities as described further herein. The DS also performs flow control to prevent its buffers from overflowing. The received upstream Gigabit Ethernet data from ports 22A, 22B, 22C and 22D is queued, prioritized and forwarded upstream. The legacy data is coupled directly into the upstream port.

Figure 8:
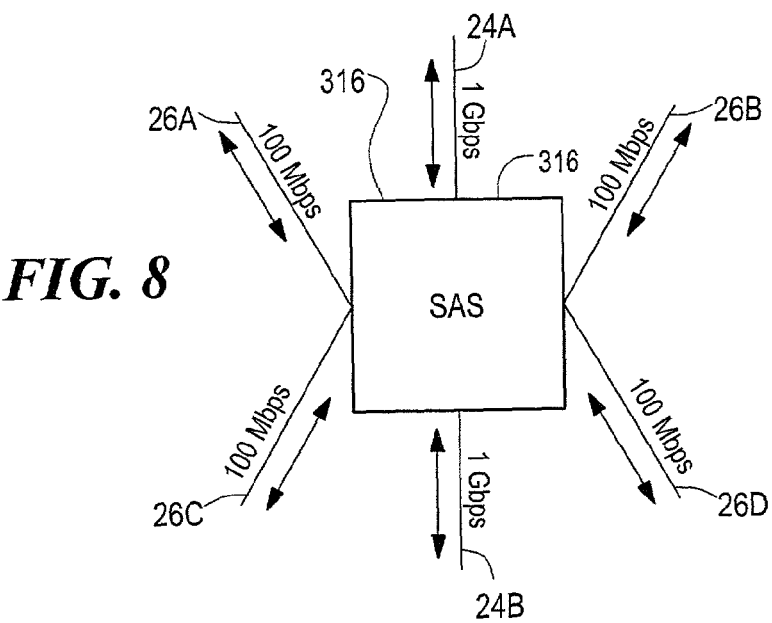
FIG. 8 is a block diagram of interfaces to a subscriber access switch.

Referring now to FIG. 8, the SAS 316 has a coax port 24A coupled to an upstream DS or SAS, a coax port 24B for coupling to a downstream SAS (or, possibly, a DS) and four coax drop ports 26A, 26B, 26C, 26D each for coupling to an NIU 119. In the downstream direction, coax port 24A receives legacy video/data and Gigabit Ethernet data from an upstream DS or SAS. Legacy video/data is propagated on the ports 24B and 26A, 26B, 26C, 26D. The Gigabit Ethernet data is processed and switched onto the appropriate drop port(s) 26A, 26B, 26C, 26D and/or forwarded to the downstream SAS (or, possibly, DS) on port 24B based on the entry for the corresponding Routing ID in a routing table kept at the SAS.

In the upstream direction, the SAS 316 receives Gigabit Ethernet data and legacy data signals from all five ports 24B, 26A, 26B, 26C and 26D and queues the Gigabit Ethernet data based on assigned priorities as described further herein. The SAS also performs flow control to prevent its buffers from overflowing. The received Gigabit Ethernet upstream data is queued, prioritized and forwarded further upstream. The legacy data is coupled directly into the upstream port.

Figure 9:
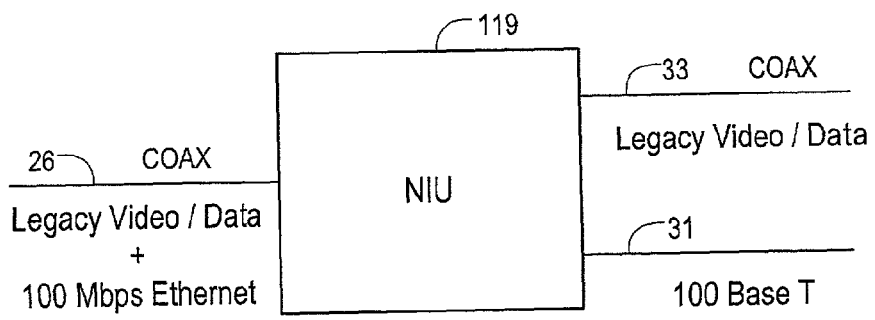
FIG. 9 is a block diagram of interfaces to a network interface unit.

Referring now to FIG. 9, the interfaces to the NIU 119 are shown. In the downstream direction, the NIU receives legacy video/data and 100 Mbps Ethernet data from the SAS 316 on drop 26. The legacy video/data and the 100 Mbps data signals are split by the NIU. The legacy video and data is transmitted over coax 33 and the Ethernet data stream on line 31 is processed and user data is transmitted to the Home LAN 30 (FIG. 3) via the 100BaseT Ethernet interface 31. Data processing includes checking the Routing ID to ensure privacy of user traffic and stripping the Access Network Header to form standard Ethernet packets for transmission on the Home LAN.

In the upstream direction, the NIU performs a bridging function to prevent local user traffic from entering the Access Network. The NIU also provides a per service policing function which enables the service provider to enforce service level agreements and protect network resources. The NIU also inserts the Access Network Header. This data stream is combined with the legacy upstream traffic and forwarded to the SAS.

While the drop portion is described above as using standard coaxial cable drop, other embodiments can use wireless drops. To provide wireless drops, the intelligent tap 116 (FIG. 3) and the intelligent network interface device 119 (FIG. 3) are modified to include one or more radio frequency (RF) transceivers which operate at an appropriate RF frequency, e.g., using Multichannel Multipoint Distribution Service ("MMDS"), Local Multipoint Distribution Systems ("LMDS") or other frequencies. MMDS operates in the 2.1–2.7 GHz microwave band and LMDS operates at approximately 28 Ghz.

Description of Network Element

Figure 10:
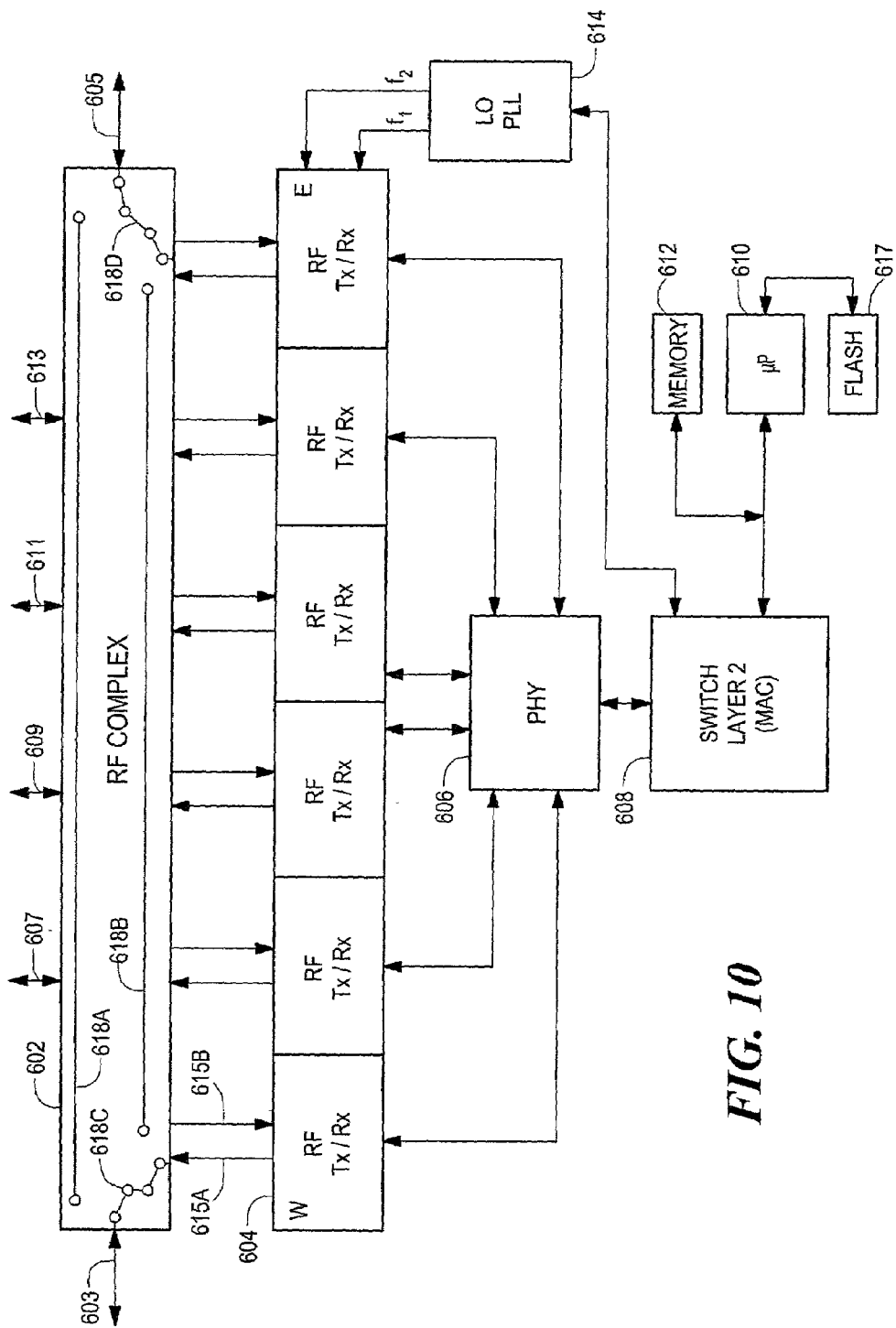
FIG. 10 is a block diagram of an embodiment of a network element for the network of FIG. 3.

An embodiment of a typical network element is now described with reference to the block diagram of FIG. 10. The network element includes an RF complex 602, RF transmitter/receiver pairs or modems 604a–604n, a PHY (physical layer) device 606, a switch 608, microprocessor 610, memory 612, flash memory 617 and a local oscillator/phase locked loop (LO/PLL) 614. All of the components are common to embodiments of the ODS, DS, SAS and NIU. The ODS further includes an optical/electrical interface. The NIU further includes a 100BaseT physical interface for connecting to the Home LAN 30 (FIG. 3). In addition, the RF complex is shown as having a bypass path 618A and a built in self test path 618B controlled by switches 618C, 618D which are described further herein.

The number of modems, 604$n$ generally, depends on the number of links that connect to the network element. For example, as noted above, DS 314 has five ports (FIG. 7) and thus has five modems 604. A SAS 316 has six ports (FIG. 8) and thus has six modems 604. The network element in FIG. 10 is shown having six ports indicated as ports 603, 605, 607, 609, 611 and 613. The ports 603, 605 correspond to upstream and downstream ports 24A, 24B respectively and ports 607, 609, 611, 613 correspond to drop ports 26A, 26B, 26C, 26D respectively of the SAS shown in FIG. 8. The PHY device 606 provides physical layer functions between each of the modems 604 and the switch 608. The switch 608, controlled by the microprocessor 610, provides layer 2 switching functions and is referred to herein as the MAC device or simply MAC. The LO/PLL 614 provides master clock signals to the modems 604 at the channel frequencies indicated above in Table 1 and described further herein.

Figure 11:
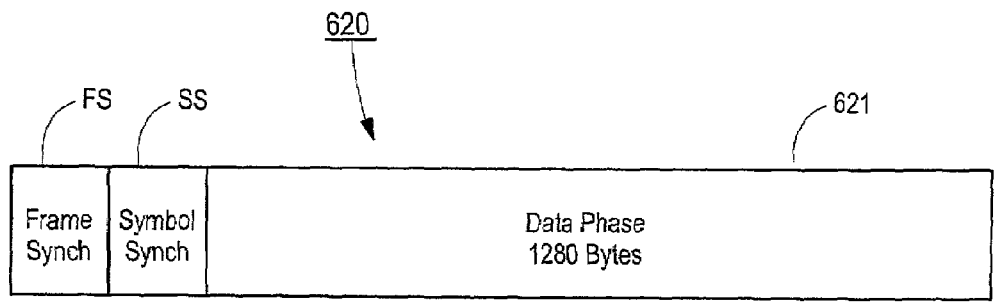
FIG. 11 is a diagram of a frame structure for use in the network of FIG. 3.

A frame structure 620 used in the system is shown in FIG. 11. A frame 620 includes frame synchronization, symbol synchronization and a data phase. In a particular embodiment, the frame synchronization (FS) is for a period of 1us and the symbol synchronization (SS) uses a 400 ns period. Carrier and framing synchronization is performed every 10 us followed by 1280 bytes of Data Phase 621. It should be understood that other frame structures are possible and the frame structure described is only an example.

Figure 12A:
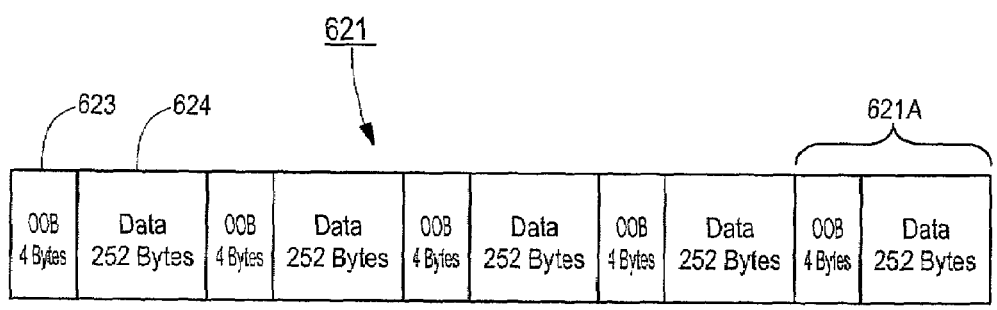
FIG. 12A illustrates a data phase portion of the frame structure of FIG. 11.

The Data Phase is shown in FIG. 12A and includes 5 blocks 621A of 256 bytes each. Each 256 byte block 621A consists of 4 bytes for out-of-band (OOB) data/signaling 623 and 252 bytes of in-band data 624.

Figure 12B:
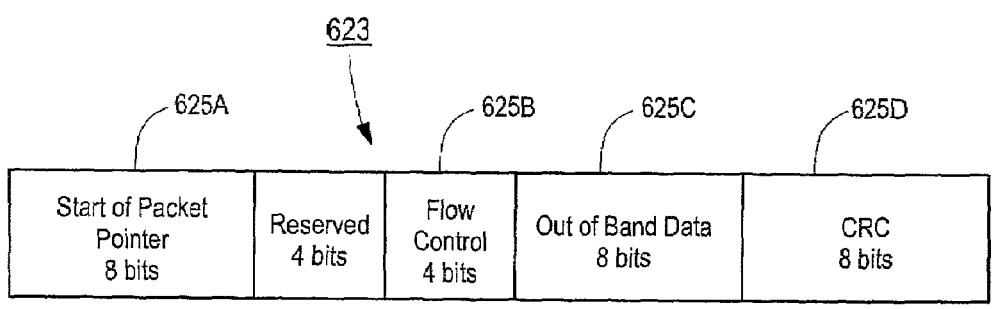
FIG. 12B illustrates an out-of-band (OOB) data/signaling section of the data phase portion of FIG. 12A.

FIG. 12B shows the fields for the OOB data/signaling 623. The fields include a start-of-packet pointer (8 bits) 625A, flow control (4 bits) 625B, out-of-band data (8 bits) 625C and CRC (8 bits) 625D. In addition, 4 bits are reserved. The start-of-packet pointer 625A indicates the start of a new MAC frame in the following 252 byte block 624 (FIG. 12A). A value greater than or equal to '252' indicates no new packet boundary in this block. The flow control bits 625B are used to carry flow control information from parent to child i.e. from a device such as DA, SAS, or ODS to another device that is directly connected to it on the downstream side. The out-of-band data bits 625C are used to carry out-of-band data from parent to child. The CRC 625D is used for CRC of the OOB data/signaling 623.

RF Modem

Figure 13:
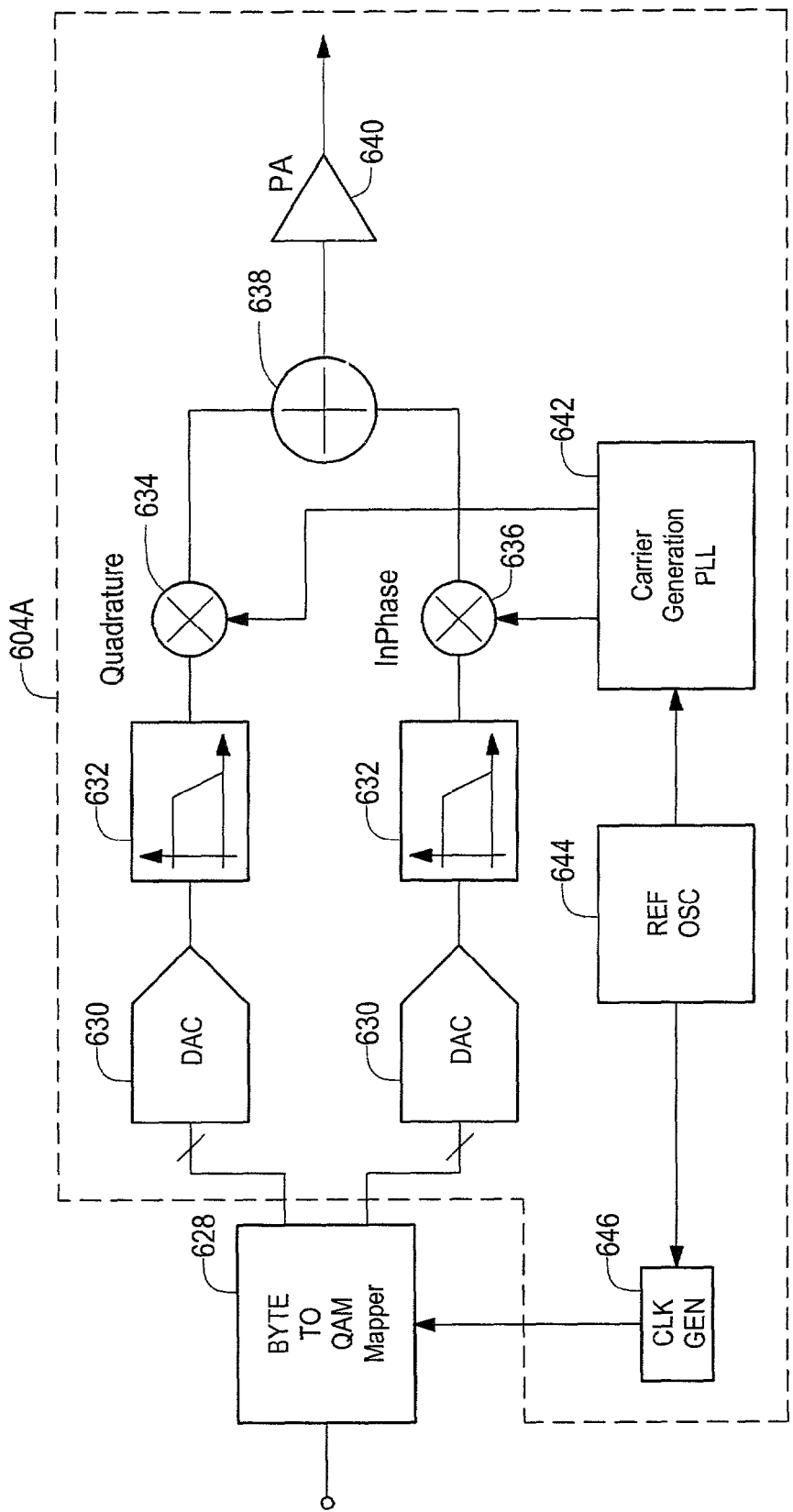
FIG. 13 is a block diagram of a transmitter of the network element of FIG. 10.

The RF modem 604$n$ (FIG. 10) is now described. A modulation system with spectral efficiency of 4 bits/s/Hz is used to provide high data rates within the allocated bandwidth. In particular, 16-state Quadrature Amplitude Modulation (16-QAM) is preferably used, which involves the quadrature multiplexing of two 4-level symbol channels. Embodiments of the network elements of the present system described herein support 100 Mb/s and 1 Gb/s Ethernet transfer rates, using the 16-QAM modulation at symbol rates of 31 or 311 MHz. A block diagram of one of the transmitter sections 604A of the modem is shown in FIG. 13. The transmitter section includes at least two digital-to-analog converters (DACs) 630, low pass filters 632 and in-phase and quadrature multiplier stages 634, 636 respectively. A crystal oscillator 644 serves as the system clock reference, and is used by clock generator 646 and by carrier generation phase locked loop circuit (PLL) 642.

Byte data is first mapped into parallel multi-bit streams by the byte-to-QAM mapper 628 in the PHY device 606 described in detail in connection with FIG. 16 for driving each of the DACs 630. The DAC outputs are low-pass filtered, and passed to the multiplier stages for modulation with in-phase (I) and quadrature (Q) carriers provided by the carrier generation PLL circuit 642. The up-converted, quadrature-multiplexed signal is mixed in mixer 638 and passed to an output power amplifier 640 for transmission to other intelligent network devices.

Figure 14:
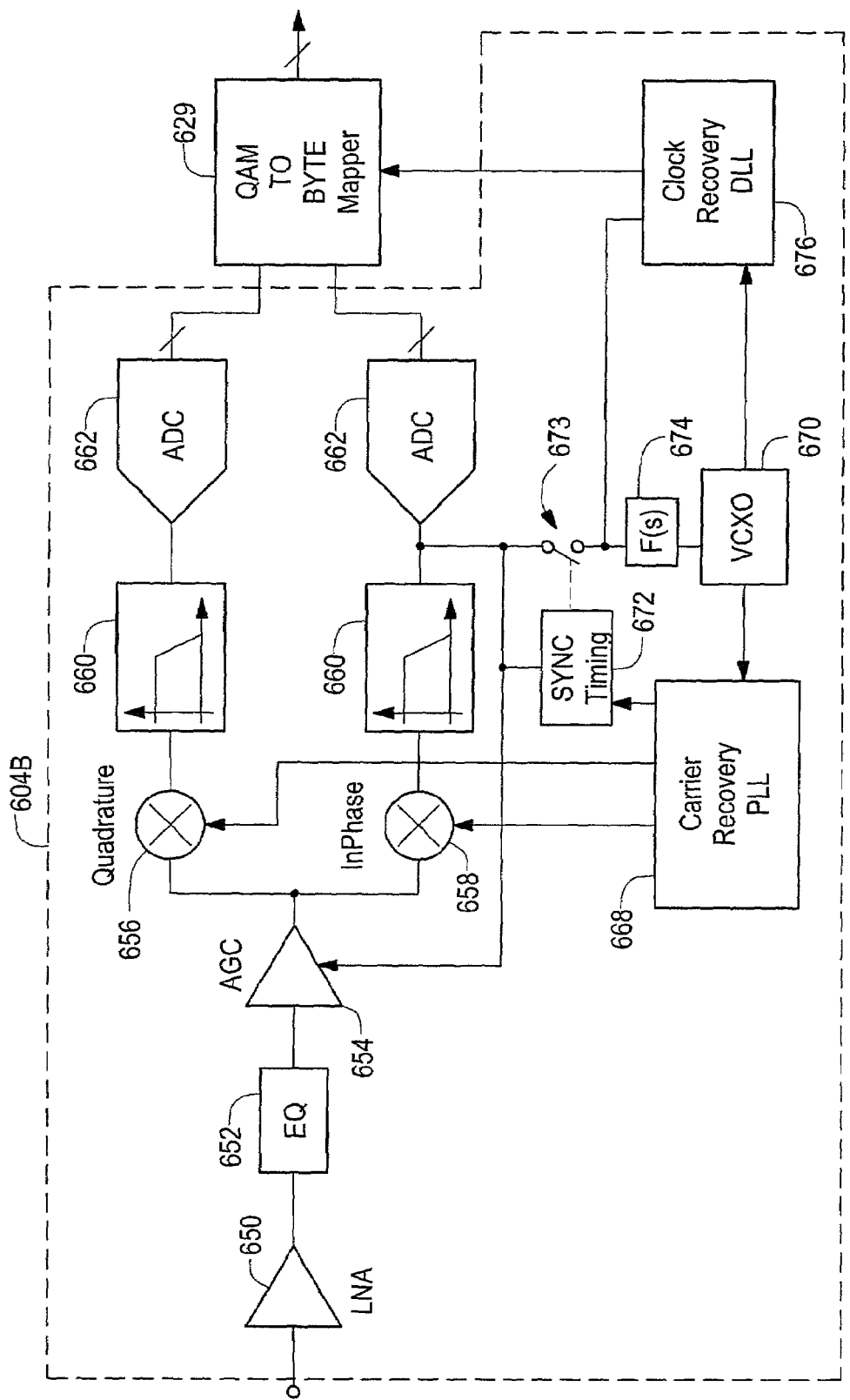
FIG. 14 is a block diagram of a receiver of the network element of FIG. 10.

A block diagram for the receiver section 604B of the modem is shown in FIG. 14. At the front end, the receiver section 604B includes low-noise amplifier (LNA) 650, equalizer 652 and automatic gain control (AGC) 654. The received signal from PHY 606 is boosted in the LNA 650 and corrected for frequency-dependent line loss in the equalizer 652. The equalized signal is passed through the AGC stage 654 to I and Q multiplier stages 656, 658, low pass filters 660 and analog-to-digital converters (ADC) 662. After down-conversion in the multiplier stages 656, 658 and low-pass filtering, the I and Q channels are digitized and passed on to the QAM-to-byte mapper 629 for conversion to a byte-wide data stream in the PHY device 606 (FIG. 10).

Carrier and clock recovery, for use in synchronization at symbol and frame levels, are performed during periodic training periods described below. A carrier recovery PLL circuit 668 provides the I and Q carriers to the multipliers 656, 658. A clock recovery delay locked loop (DLL) circuit 676 provides clock to the QAM-to-byte mapper 629. During each training period, PLL and DLL paths that include F(s) block 674 and voltage controlled oscillator (VCXO) 670 are switched in using normally open switch 673 under control of SYNC timing circuit 672 in order to provide updated samples of phase/delay error correction information.

Figure 15:
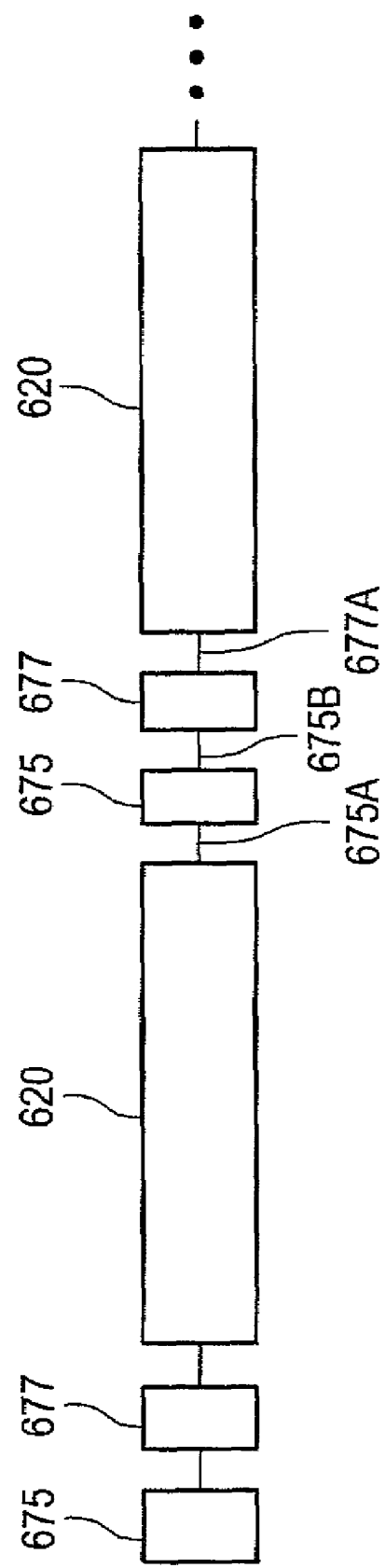
FIG. 15 is a timing diagram showing the states in the receiver of FIG. 14.

FIG. 15 shows the training periods and data as parts of the frame structure. The frame structure is now described with reference to both FIGS. 14 and 15. During the normal operation, the RF local oscillator may drift. Periodically during the normal state, the receiver updates carrier and timing. For part of every frame, the receiver section 604B is in a training mode in which it receives a carrier recovery signal 675 followed by a symbol timing recovery signal 677. During the carrier recovery period 675, the VCXO 670 tunes in with the RF frequency/phase reference provided by F(s) block 674 (FIG. 14). The local oscillator in the carrier recovery PLL circuit 668 uses the VXCO as a reference and follows the VCXO (FIG. 15) to tune in. At the falling edge of the carrier recovery period 675, the receiver 604B counts a programmable delay, then the receiver 604B enables the clock-recovery DLL circuit 676. This timing recovery occurs in relation to the symbol timing recovery signal 677. The SYNC timing circuit closes switch 673 to connect the carrier recovery PLL circuit 668 and clock recovery DLL circuit 676. Following these short update periods, the receiver is in a normal operational mode in which it receives data frames 620.

PHY Device

Figure 16:
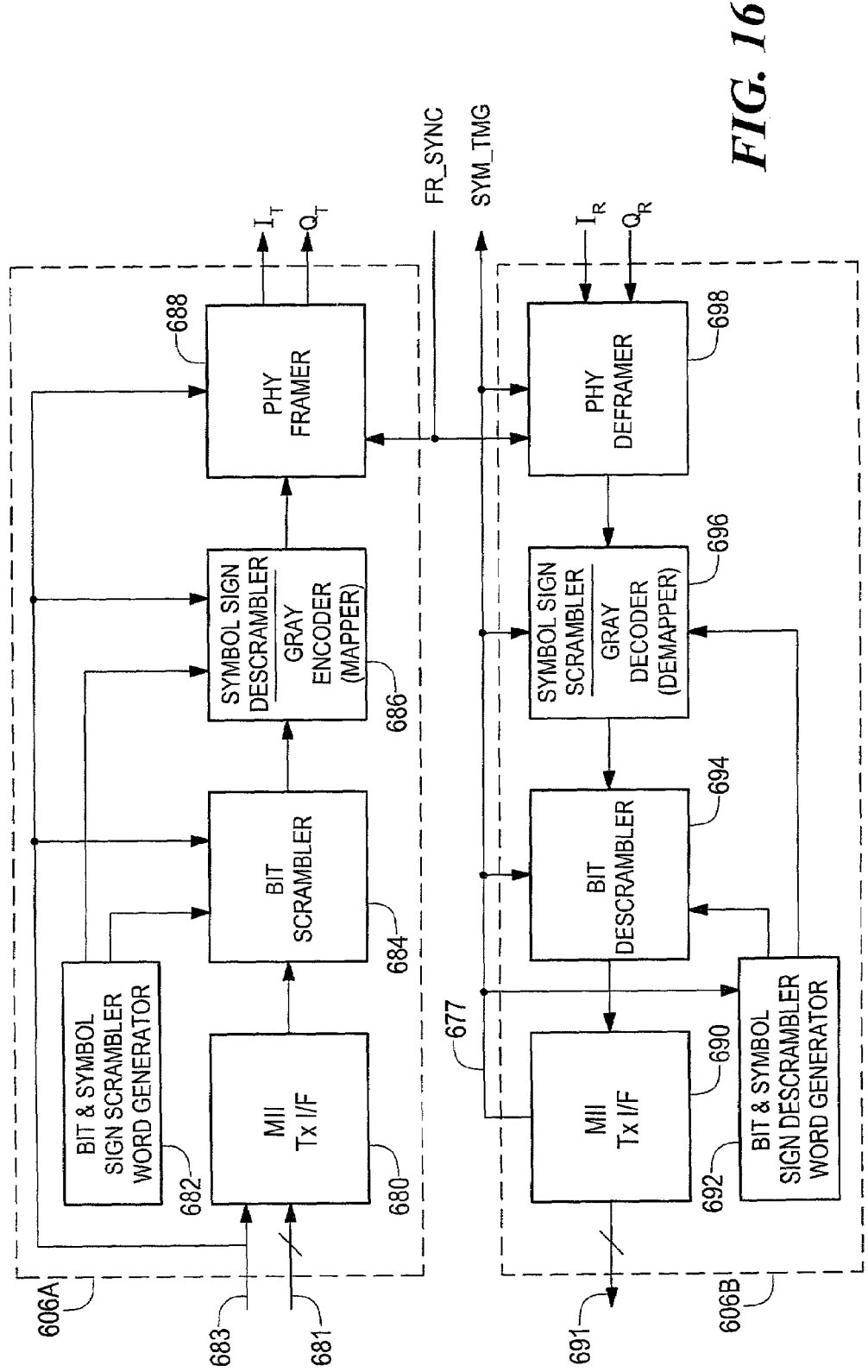
FIG. 16 is a block diagram of a PHY device of the network element of FIG. 10.

A block diagram of the PHY device 606 (FIG. 10) is shown in FIG. 16. The PHY includes a transmit section 606A and a receive section 606B. It should be understood that the PHY device 606 includes a pair of transmit and receive sections 606A, 606B for each corresponding RF modem 604 (FIG. 10). Thus, for example, the PHY device in the network element in FIG. 10 includes six PHY transmit/receive section pairs 606A, 606B to connect to the corresponding six RF modems 604.

The transmit section 606A includes transmit media independent interface (MII) 680, byte and symbol sign scrambler word generator 682, byte scrambler 684, Gray encoder and symbol sign scrambler (mapper) 686 and PHY framer 688. The mapper 686 corresponds to the byte-to-QAM mapper 628 (FIG. 13), described further below. Scrambling is used to balance the distribution of symbols and flows (polarity).

The receive section 606B includes receive MII 690, byte and symbol sign descrambler word generator 692, byte descrambler 694, Gray decoder and symbol sign descrambler (demapper) 696 and PHY deframer 698. The demapper 696 corresponds to the QAM-to-byte mapper 629 (FIG. 14).

The PHY device provides interfaces to the MAC layer device 608 and the modems 604 (FIG. 10) in the network element. The PHY provides full-duplex conversion of byte data into 16-QAM wire symbols, and vice-versa, at a rate of 100 Mb/s or 1 Gb/s. The MAC device 608 (FIG. 10) runs all of its ports from one set of clocks; therefore, the PHY/MAC interface contains shallow byte-wide FIFOs to buffer data due to differences between the MAC clock and received clock rates. In the transmit section 606A the PHY scrambles the byte data, breaks the bytes into 16-QAM symbols, and scrambles the signs of the symbols before passing the symbols on to the analog portion of the modem 604. In the receive section 606B, the PHY collects 16-QAM symbols, descrambles the signs, packs the symbols into bytes, and descrambles the bytes before passing them on to the MAC device 608.

A PHY is considered either a master or a slave, depending upon how it receives its clocks. A master PHY uses a transmit clock derived from the local reference crystal 644 (FIG. 13). A slave PHY uses a transmit clock derived from its partner receiver. In a SAS device 316 (FIG. 3), for instance, the PHY that looks upstream is a slave PHY; the downstream and drop PHYs are all masters, using the local reference crystal. The PHY in an NIU 119 (FIG. 3) is a slave to the PHY in the corresponding SAS device 316.

MAC Interface

Referring again to FIG. 16, the PHY 606 supports a MAC interface, referred to herein as the media-independent interface (MII), for 1 Gb/s and 100 Mb/s transport. The Tx MII 680 and Rx MII 690 provide an interface indicated at 681, 683, 691 and defined in 2. The MII includes transmit and receive FIFOs (not shown) which buffer byte data between the MAC and PHY devices.

TABLE 2

MII Signals

| Signal Name | Source | Description |
| --- | --- | --- |
| TXD<7:0> | MAC | Transmit Data |
| TX_DV | MAC | Transmit Data Valid |
| TX_EN | MAC | Transmit Enable |
| TX_RDY | PHY | Transmit Ready |
| RXD<7:0> | PHY | Receive Data |
| RX_DV | PHY | Receive Data Valid |
| MAC_CLK | MAC | Tx and Rx FIFO Clock (Byte clock-155 or 15.5 MHz) |
| FS | PHY | Frame Synchronization |

The transmit interface 606A is now described in connection with FIG. 16. The MAC 608 (FIG. 10) asserts TX_EN when it is ready to begin transmitting data to the receiver section 606B of PHY device 606. While TX_EN is deasserted, the PHY sends frames with normal preambles but with random data. In this mode, the LFSR is not reset at the start of every frame. When the MAC asserts TX_EN, the PHY completes the frame it is currently sending, sends normal frame resynchronization segments, sends a start-of-frame delimiter (SFD) segment, and begins transmitting data. The PHY deasserts TX_RDY while TX_EN remains asserted. TX_RDY will assert for the first time shortly before the PHY sends the first SFD segment.

When the PHY Tx FIFO is not full, the MAC may load data into it by asserting the TX_DV signal for one cycle of TX_CLK. When the Tx FIFO is close to full, the PHY will deassert the TX_RDY signal, and it will accept the byte of data currently on TXD. TX_RDY will assert during the periodic frame synchronization periods.

The PHY generates its 311 MHz symbol clock from a 155 MHz local reference oscillator (if a master PHY) or from the demodulator (if a slave PHY). A master PHY also generates the 155 MHz MAC_CLK. The MAC side of the PHY Tx FIFO uses the 155 MHz MAC CLK.

The receive interface will now be described. When valid data is in the PHY Rx FIFO, the PHY asserts RX_DV. The PHY assumes that the MAC consumes valid data immediately, so the PHY advances the read pointer to the next valid entry. When the Rx FIFO is empty, the PHY deasserts RX_DV. If the PHY has properly received 2 of the previous 3 frames, the PHY asserts FS.

The PHY does not have a 311 MHz symbol clock for the receiver; instead, it uses both edges of the 155 MHz clock supplied to it by the demodulator. The MAC side of the PHY Rx FIFO uses the 155 MHz MAC_CLK.

Carrier and Frame Synchronization

The PHY and MAC use FS to support framing control. The PHY receiver 606b will deassert FS when it believes it has lost track of the framing sequence. If the PHY has not received an SFD segment in a span of 2 frame periods, the PHY will deassert FS. FS powers up deasserted.

Modem Interface

The digital PHY connects to the transmit modulator via 10 digital pins: two differential pairs for in-phase signal (I), two differential pairs for quadrature signal (Q), and an additional 2 pins to indicate when one or both of the in-phase signal (I) and/or quadrature signal (Q) should be tristated. The digital outputs connect to D-to-A converters in the Tx modulator section.

The Rx demodulator slices the incoming symbols into 4 sets of 2-bit coded signals. There is one set of signals for each of $I_1$, $I_2$, $Q_1$, and $Q_2$. The demodulator supplies a 155 MHz clock to the PHY, which it uses for synchronously loading the received symbols.

The framer, scrambler and mapper elements of the transmit section 606A (FIG. 16) are now described.

The transmit section 606A of the PHY accepts one byte per clock (155 MHz) when framing conditions permit. When sending frame synchronization patterns, the PHY asserts TX_FULL to indicate that the MAC should stop sending new data on TXD<7:0>.

The clocks at the transmit and receive sections 606A, 606B of the PHY can have some discrepancy. To keep the receiver in synchronization with the transmitter (and data transmission), the PHY framer 688 of the transmitter periodically sends certain special, non-data patterns that the receiver uses to re-acquire lock. The receiver uses the first segment of the frame to acquire carrier synchronization. After locking to the incoming carrier, the receiver uses the second segment of the frame to find the optimal point within each symbol time (maximum eye opening) at which to sample (slice) the symbol. After sufficient time for the receiver to locate the eye opening, a short, unique pattern— Start-of-Frame Delimiter (SFD)—is used to mark the start of the data payload. After a time short enough to guarantee that the transmitter and receiver remain in lock, the transmitter stops transmitting data, and starts another frame sequence by sending the carrier synchronization segment. This sequence is described above in relation to FIG. 15.

The transmit PHY 606A controls the framing, and tells the MAC when it is sending data, and when the MAC should pause its data transfer to the PHY. While the PHY is sending anything but the data payload, the PHY will assert TX_FULL. The MAC does not send new data to the PHY while TX_FULL is asserted.

Two kinds of scrambling are performed in the transmitter. Bit scrambling tries to ensure a balanced distribution of symbols. This scrambling can minimize the likelihood of transmitting a sequence of low-amplitude signals. A good amplitude distribution may improve the performance of the receiver's AGC circuitry, and may be necessary for determining the threshold levels at the receiver's slicer. Sign scrambling tries to eliminate any DC component in the output signal.

The bit and sign scrambler word generator 682 generates 8-bit words for bit-scrambling and 4-bit words for sign-scrambling. Bit scrambling occurs one byte at a time, in the bit scrambler 684, before the data has been split into 16-QAM symbols. Sign scrambling occurs after the symbols have been mapped, just before driving the off-chip D-to-A converters. The Gray Encoder (mapper) 686 also provides the sign scrambling function.

A 33-bit LFSR generates the pseudo-random number sequence used for both types of scrambling. The LFSR polynomial is. The bit scrambling equations are listed in Tables 3 and 4.

TABLE 3

Bit Scrambling

| Bit Number | Equation |
|---|---|
| 7 | $Scr_n[30] \oplus Scr_n[28] \oplus Scr_n[25] \oplus Scr_n[23] \oplus Scr_n[20] \oplus Scr_n[18] \oplus Scr_n[15] \oplus Scr_n[13]$ |
| 6 | $Scr_n[22] \oplus Scr_n[20] \oplus Scr_n[12] \oplus Scr_n[10]$ |
| 5 | $Scr_n[14] \oplus Scr_n[12] \oplus Scr_n[09] \oplus Scr_n[07]$ |
| 4 | $Scr_n[06] \oplus Scr_n[04]$ |
| 3 | $Scr_n[24] \oplus Scr_n[19] \oplus Scr_n[14] \oplus Scr_n[09] \oplus (n \bmod 2)$ |
| 2 | $Scr_n[16] \oplus Scr_n[06] \oplus (n \bmod 2)$ |
| 1 | $Scr_n[08] \oplus Scr_n[03] \oplus (n \bmod 2)$ |
| 0 | $Scr_n[00]$ |

TABLE 4

Sign Scrambling

| Symbol | Equation |
|---|---|
| $I_1$ | $Scr_n[29] \oplus Scr_n[25] \oplus Scr_n[24] \oplus Scr_n[20] \oplus Scr_n[19] \oplus Scr_n[15] \oplus Scr_n[14] \oplus Scr_n[10]$ |
| $I_2$ | $Scr_n[21] \oplus Scr_n[17] \oplus Scr_n[11] \oplus Scr_n[07]$ |
| $Q_1$ | $Scr_n[13] \oplus Scr_n[09] \oplus Scr_n[08] \oplus Scr_n[04]$ |
| $Q_2$ | $Scr_n[05] \oplus Scr_n[01]$ |

TABLE 5

Data Bit to Symbol Mapping

| Scrambled data bit | Symbol Assignment |
|---|---|
| 7 | $Q_2[1]$ |
| 6 | $Q_2[0]$ |
| 5 | $I_2[1]$ |
| 4 | $I_2[0]$ |
| 3 | $Q_1[1]$ |
| 2 | $Q_1[0]$ |
| 1 | $I_1[1]$ |
| 0 | $I_1[0]$ |

After grouping, the symbols are sign-scrambled and converted to the virtual Gray code for output to the modulator as shown in Table 6.

TABLE 6

Symbol to DAC Input Mapping

| Symbol[1:0] | Desired Mapping | Pinout Mapping (V[1:0]) | |
|---|---|---|---|
| | | No Sign Inversion | With Sign Inversion |
| 01 | +3 | 00 | 10 |
| 00 | +1 | 01 | 11 |
| 10 | −1 | 11 | 01 |
| 11 | −3 | 10 | 00 |

The deframer, descrambler and demapper elements of the receive section 606B (FIG. 16) are now described.

The frame structure (FIG. 15) consists of several different segments, each with a particular purpose. The roughly 1 (s carrier synchronization burst 675 is bracketed by brief periods where there is no signal transmission at all. The "front porch" 675A and "middle porch" 675B help the analog demodulator determine the start and end of the carrier synchronization burst. The analog demodulator must use a carrier envelope detector to identify the carrier synchronization burst 675.

After the carrier envelope detector signal falls (for the "middle porch"), the digital PHY 606B enables (closes) the symbol synchronization-tracking loop 676 after some delay. The digital PHY opens the symbol-tracking loop 676 after the symbol-tracking segment 677 ends (during the "back porch" 677A). The PHY begins searching for the SFD pattern after opening the symbol-tracking loop. The delay from carrier envelope signal deassertion until closing the symbol-tracking loop and the length of the symbol-tracking period are both programmable.

The SFD search must check for four possibilities. Assume the SFD pattern consists of the 2 hex-digit code 0x01. Because of indeterminacy in the arrival time or latency of each link, the SFD byte may be received with the '0' on the I/Q$_1$ lines and the '1' on the I/Q$_2$ lines, or vice versa. In addition, the demodulating mixer may or may not invert the phase of its outputs, potentially converting the '0' to 'F' and the '1' to 'E'. Fortunately, both I and Q will have the same inversion state. Taking all this into account, the SFD search much consider matching any of 4 patterns: 0x01, 0x10, 0xFE, and 0xEF. When the SFD pattern is matched, the topology of the match is stored and used to properly de-map each symbol and form byte-aligned words.

The slicer-encoded signals are converted to digital signals as described in Table 7.

TABLE 7

Slicer to Symbol Mapping

| | | Symbol Mapping (V[1:0]) | |
|---|---|---|---|
| Slicer[1:0] | Desired Mapping | No Sign Inversion | With Sign Inversion |
| 00 | +3 | 01 | 11 |
| 01 | +1 | 00 | 10 |
| 11 | −1 | 10 | 00 |
| 10 | −3 | 11 | 01 |

Based on the topology of the SFD match, the individual symbols are potentially inverted, potentially reordered, then packed into bytes according to Table 5.

The Descrambler 694 uses the same LFSR polynomial and seed as the Scrambler. The LFSR is initialized to the seed, and n is initialized to 0, upon detection of the SFD pattern.

When RX_DV is asserted, the receiver sends one byte per clock (155 MHz) to the MAC on RXD<7:0>. The PHY receiver derives the 155 MHz RX_CLK from the 155 MHz demodulator clocks, but the MAC side of the Rx FIFO is clocked with the 155 MHz MAC_CLK.

RF Complex

Figure 17:
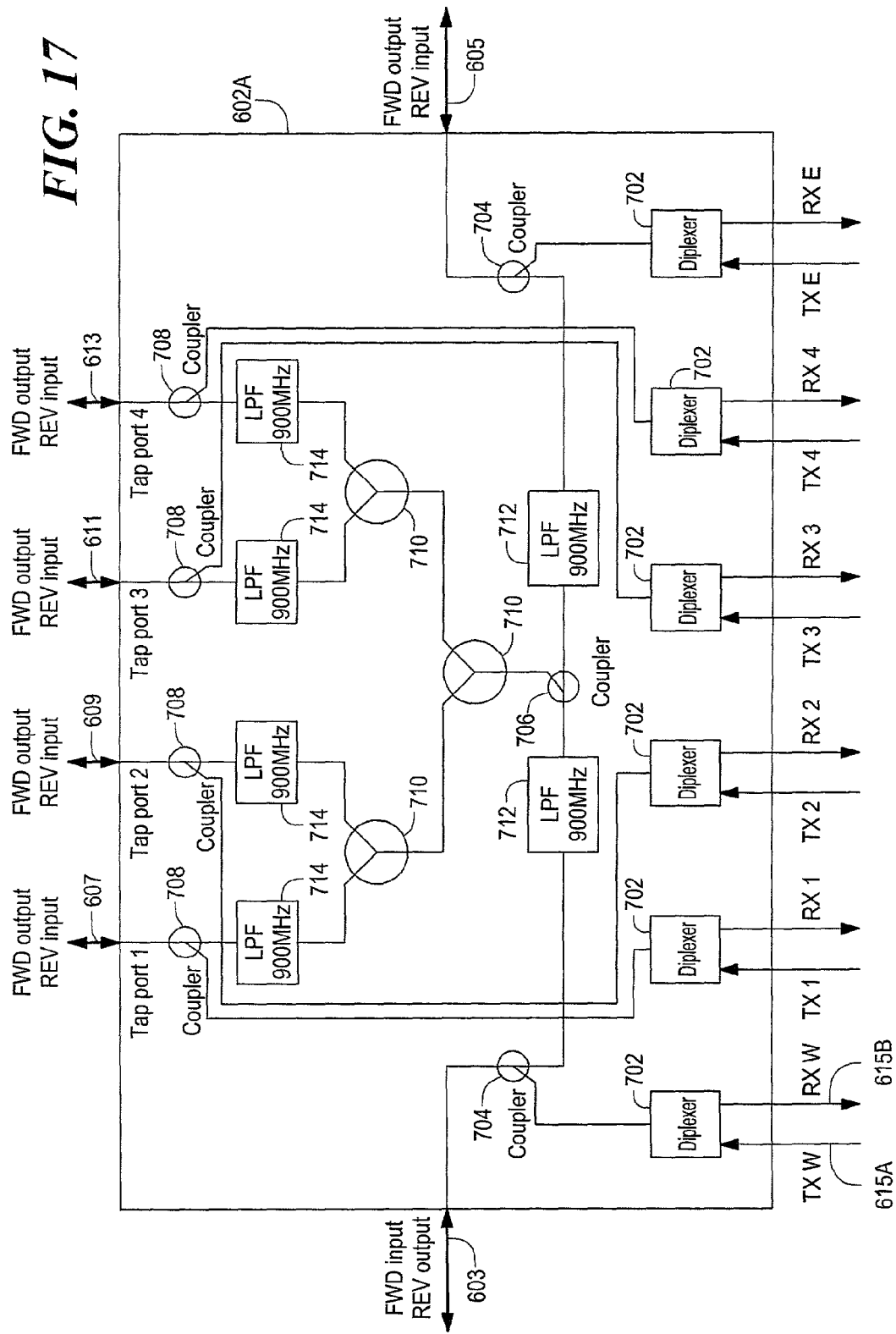
FIG. 17 is a block diagram of a first embodiment of an RF complex.

An embodiment of the RF complex 602 (FIG. 10) provides passive coupling and splitting of digital signals provided by the intelligent network elements and the legacy signals. The RF complex 602A shown in FIG. 17 includes diplexers 702, couplers 704, 706, 708, 710 and low pass filters 712, 714.

The legacy signals transmitted to and received from lines 603, 605 are coupled and split through couplers 704, 706, 708, 710. The low pass filters 712, 714 block the digital signals provided by the intelligent network elements and pass the legacy signals above, e.g., 900 MHz to and from the ports 603, 605, 607, 609, 611, 613. Similar arrangements are made for connecting other standard network elements with the corresponding intelligent network devices.

Figure 18:
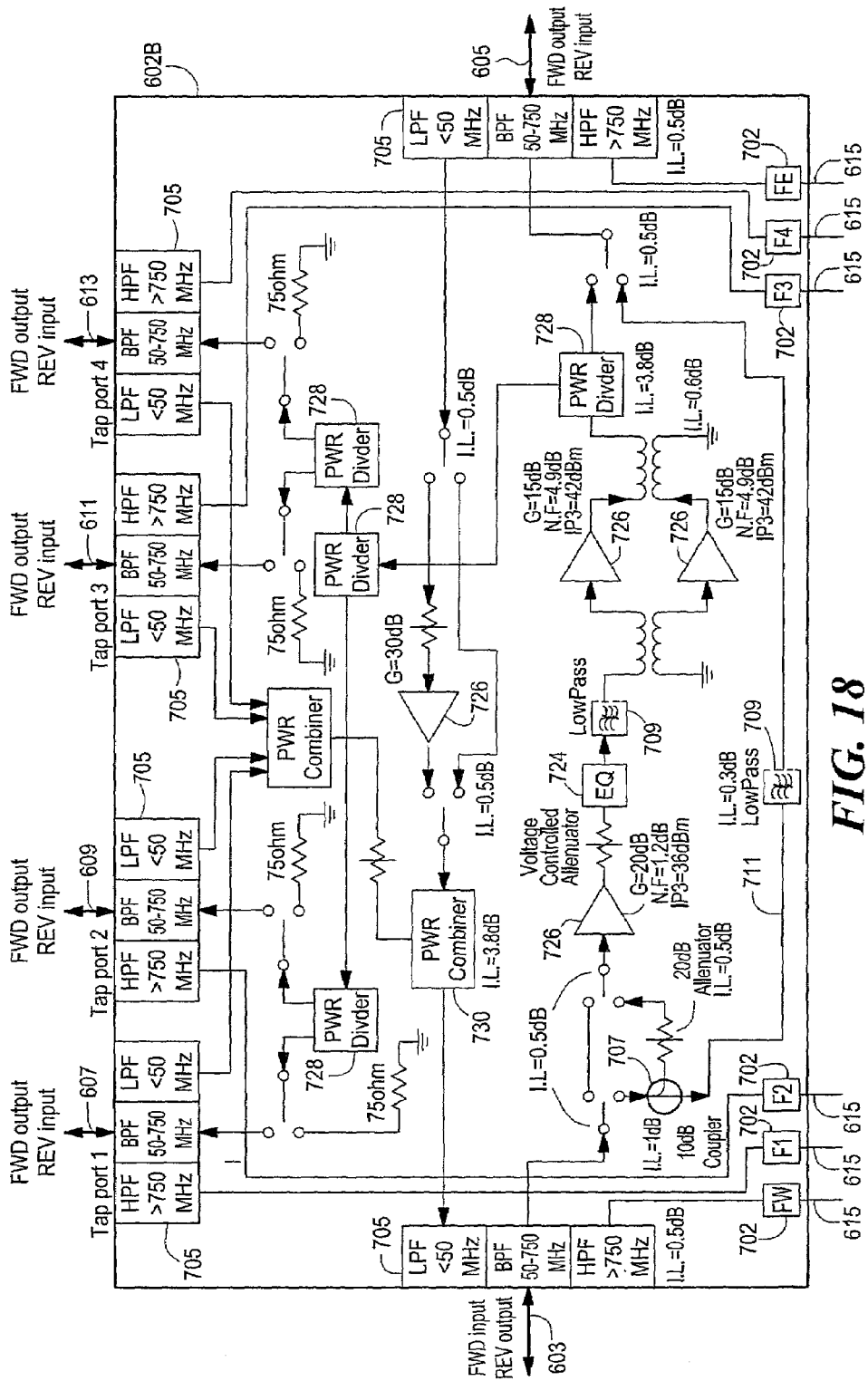
FIG. 18 is a block diagram of a second embodiment of an RF complex.

A second embodiment of the RF complex provides active functions, including equalization and amplification. The RF complex 602B shown in FIG. 18 includes diplexers 702, triplexers 705, coupler 707, low pass filters 709, bypass path 711, equalizers 724, amplifiers 726, power dividers 728 and power combiners 730.

The amplifiers 726 provide the line-extender function of legacy HFC systems. In addition, the amplifiers 726 and equalizer 724 provide addressable attenuation and equalization capabilities for use in downstream Line Build Out (LBO) and coaxial skin-effect correction respectively. Further, addressable attenuation is also provided in the return-path for equalization of funneled noise. Return paths can be selectively disconnected in areas not requiring upstream services. The RF complex 602B also includes an automatic bypass path 711 that is switched in upon component failure.

Switching Within the Access Network

In a communications environment, there can be typically many user devices per household. Switching data traffic on the basis of the MAC addresses of the devices leads to very large 48-bit wide switching table entries. To avoid this problem, as noted above the Access Network of the present system assigns a unique 12-bit Routing ID (RID) to each network element (e.g., DS, SAS and NIU). In the case of the NIU, this NIU-ID identifies itself and a subscriber premises connected thereto and for switching within the access network all Internet appliances within the home are associated with it. Switching within the network takes place using the RID, thus reducing the size of the switching table tremendously.

Present day cable systems support a maximum of 2,000 households passed per ONU. Over time, the ONUs can be expected to support fewer homes as the ONUs become deployed further into the feeder and distribution portions of the network. Thus, a 12-bit field for the RID is sufficient to identify each NIU, DS and SAS in the network.

Figure 19:
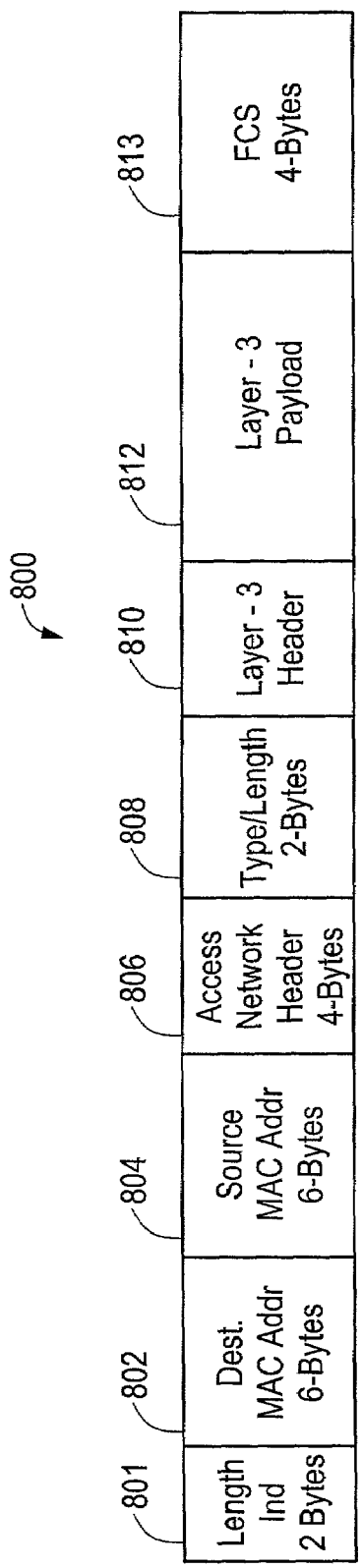
FIG. 19 illustrates a packet structure.

An exemplary structure for an encapsulated packet of the present system is shown in FIG. 19. The encapsulated packet 800 includes length indicator (LI) 801 and Ethernet packet allocations. The LI is comprised of 2 bytes (11 bits plus 5 for CRC). The Ethernet packet length can vary from 68 to 1536 bytes. The Ethernet packet is chopped up and transported in one or more in-band data segments 624 (FIG. 12A).

The Ethernet packet allocations include destination MAC address 802, source MAC address 804, Access Network Header 806, type/length 808, layer 3 header 810, layer 3 payload 812 and frame check sequence (FCS) 813.

Figure 20:
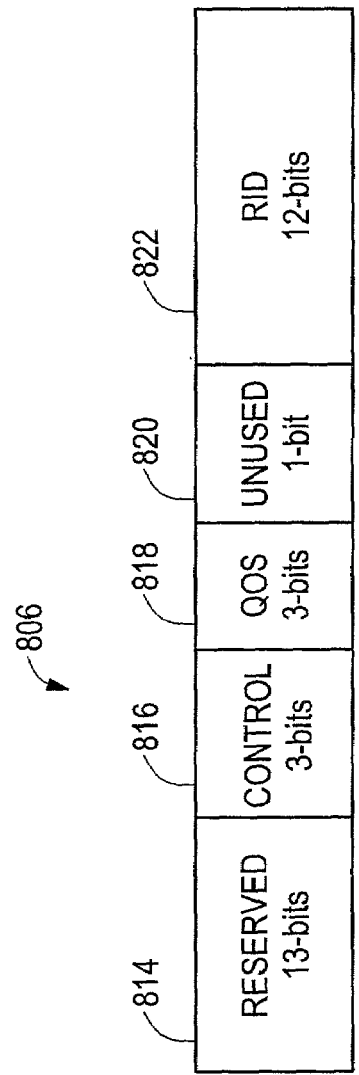
FIG. 20 illustrates a header structure for the packet of FIG. 19.

An exemplary format for the Access Network Header 806 is shown in FIG. 20. The format includes the following sub-fields: Reserved (13 bits) 814, Control (3 bits) 816, Quality of Service (QoS) (3 bits) 818, Unused (1 bit) 820 and Routing ID (RID) (12 bits) 822. The Control bits are used to indicate control information and are used in messaging and for triggering different actions at the intelligent network elements described further herein.

The QoS bits are used to prioritize traffic. The Control bits and QoS bits are described further herein. Using the 12-bit RID, packets can be routed to the appropriate DS, SAS or NIU. All user data is transmitted by the NIU onto the Home LAN using standard Ethernet frames. The 12-bit RID allows the system to address 4096 entities which can be used to indicate an entity (Unicast), a group of entities (for Multicast) or all entities (for Broadcast). In an embodiment, the different RIDs are specified as follows in Table 8.

TABLE 8

RID Assignment

| Routing ID | Kind of Traffic |
| --- | --- |
| 0 | Illegal (Packet Should Not Be Forwarded) |
| 1–4000 | Unicast Traffic (Forward packet on ONE Port) |
| 4001–4094 | Multicast Traffic (Forward Packet on Multiple Ports) |
| 4095 | Broadcast Traffic (Forward Packet on ALL Ports) |

The RID is assigned to all network elements at boot time. The Tag/Topology server 132 (FIG. 3) is responsible for assigning the RIDs that are also referred to herein interchangeably as Tags. The Tag/Topology Server acts as a Dynamic Host Configuration Protocol (DHCP) server for assigning the RIDs and IP Addresses to the network elements of the Access Network.

DHCP is a network protocol that enables a DHCP server to automatically assign an IP address to an individual computer or network device. DHCP assigns a number dynamically from a defined range of numbers configured for a given network. Client computers or devices configured to use DHCP for IP address assignment do not need to have a statically assigned IP address. DHCP assigns an IP address when a system is started. Typically, the assignment process using the DHCP server works as follows. A user turns on a computer with a DHCP client. The client computer sends a broadcast request (called a DISCOVER), looking for a DHCP server to answer. A router directs the request to one or more DHCP servers. The server(s) send(s) a DHCP OFFER packet. The client sends a DHCP REQUEST packet to the desired server. The desired server sends a DHCP ACK packet.

Figure 21:
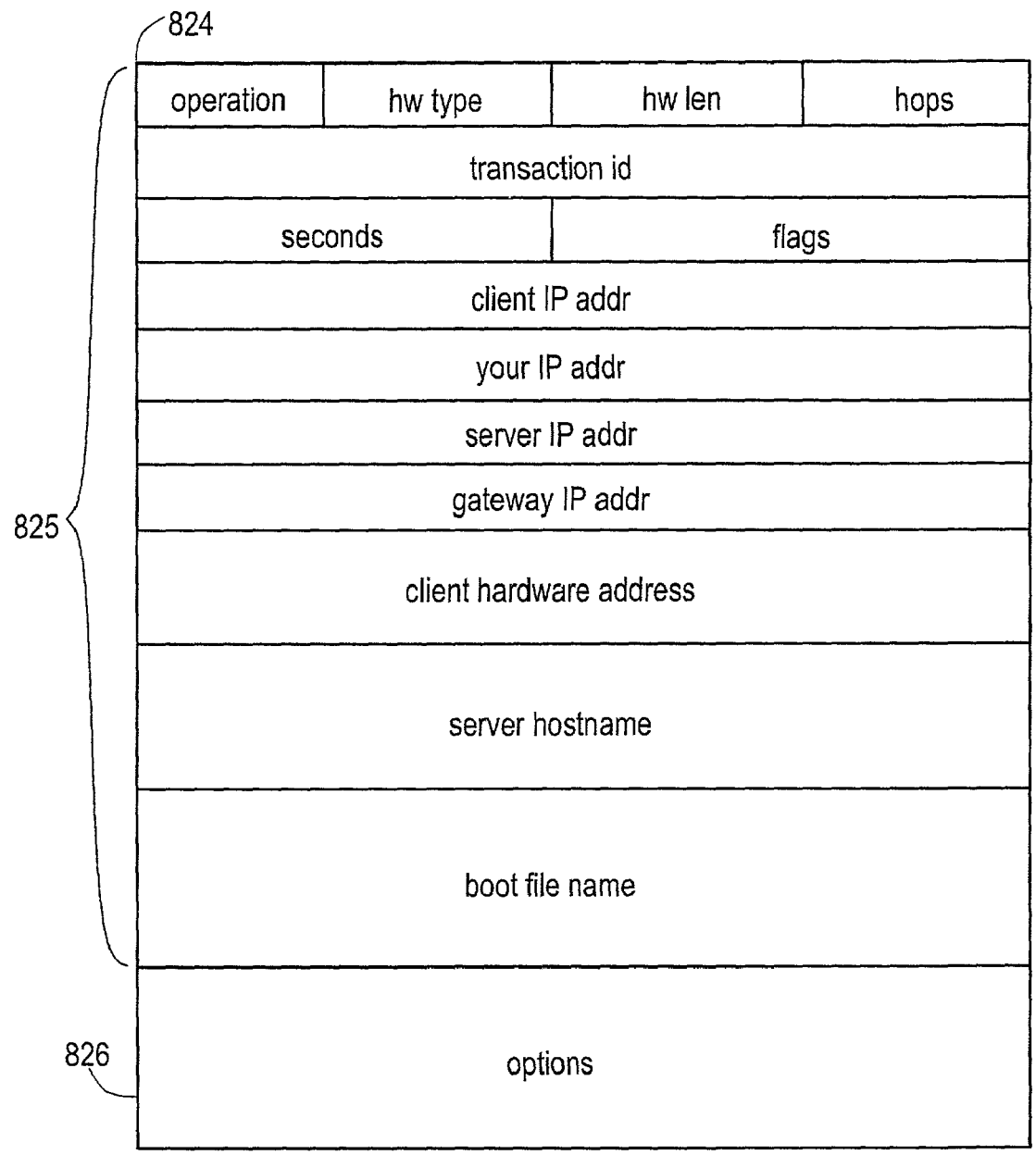
FIG. 21 illustrates a DHCP message structure.

The format of a standard DHCP message 824 is shown in FIG. 21. The standard DHCP message includes standard fields denoted 825 and vendor specific options field 826. In the present system, the standard fields 825 are used to carry IP address information and the vendor specific options field 826 is used to carry information regarding RID assignment and topology. Special control bits described further herein identify DHCP messages going upstream.

Figure 22:
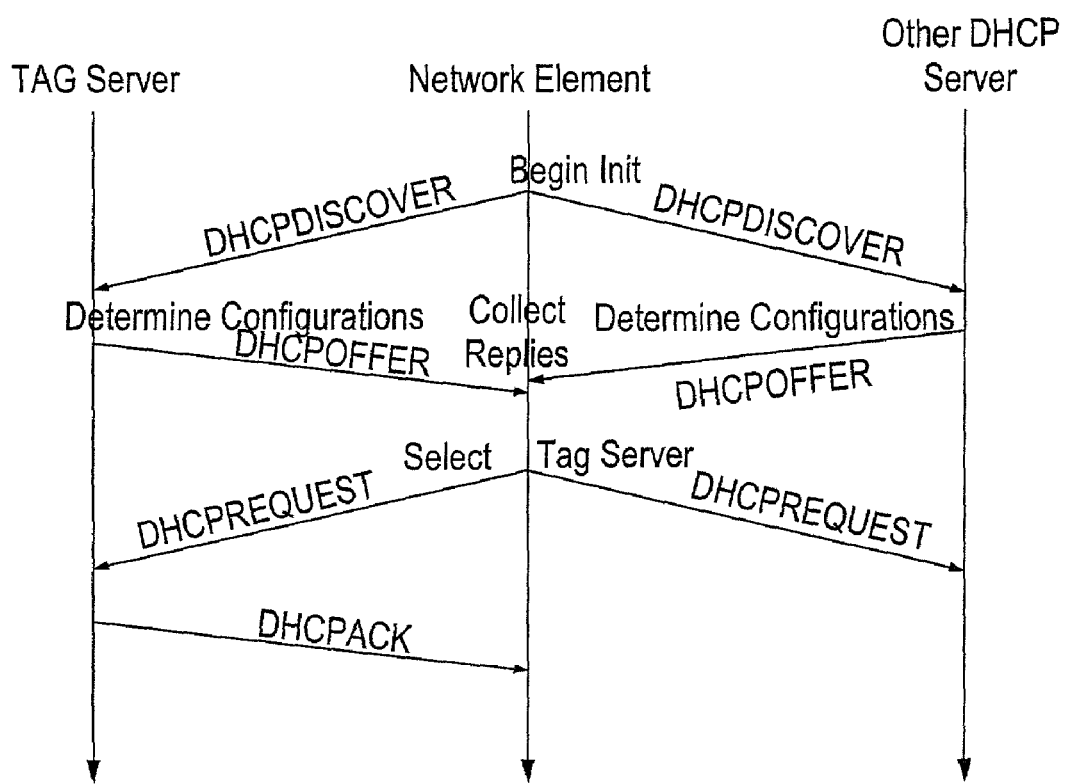
FIG. 22 illustrates message flow for tag assignment.

A sequence of events leading to RID and IP Address assignment in the present system is described as follows and shown in FIG. 22.

A newly installed or initialized network element (e.g., DS 114, SAS 116 or NIU 119; FIG. 3) broadcasts a DHCP-DISCOVER message looking for the Tag/Topology server 132. The options field 826 (FIG. 21) in the DHCP-DISCOVER is populated to differentiate between a network element and other user devices.

All "registered" devices in the upstream path between the initialized network element and the ODS 112 (FIG. 3) append their MAC Address and Physical Port numbers to the DHCPDISCOVER message in options field 826. This is done in order to construct a topology of the Access Network and is described further herein.

A relay agent of the router 110 (FIG. 3) relays this message to all known DHCP servers.

The Tag/Topology server 132 also receives this message and identifies that it comes from a valid network element. The Tag/Topology server sends back a DHCPOFFER that contains the IP Address and RID for the new network element. The Tag/Topology server can assign the RID based on topology if the need so arises. It also sets an option in the options field 826 to identify itself to the network element as the Tag/Topology server. Other DHCP servers may also send DHCPOFFER but they will not typically set the options field 826.

The network element recognizes the DHCPOFFER from the Tag/Topology server and sends back a DHCPREQUEST. This message identifies the Tag/Topology server whose offer is accepted. It is also relayed to all other known DHCP servers to inform them that their offer was rejected.

The Tag/Topology server sends back a DHCPACK confirming the IP Address and RID.

The network element is registered and gets its IP Address and RID.

DHCP Options

The manner in which the present system uses the DHCP options field 826 (FIG. 21) is now described. The options field 826 provides for up to 256 options. Of these, option codes 0–127 are standard options and option codes 128–254 are vendor specific. Each option has the following three sub-fields:

| Type/Option Code | 1 byte |
| --- | --- |
| Length | 1 byte |
| Value | Up to 255 bytes of information |

Figure 23:
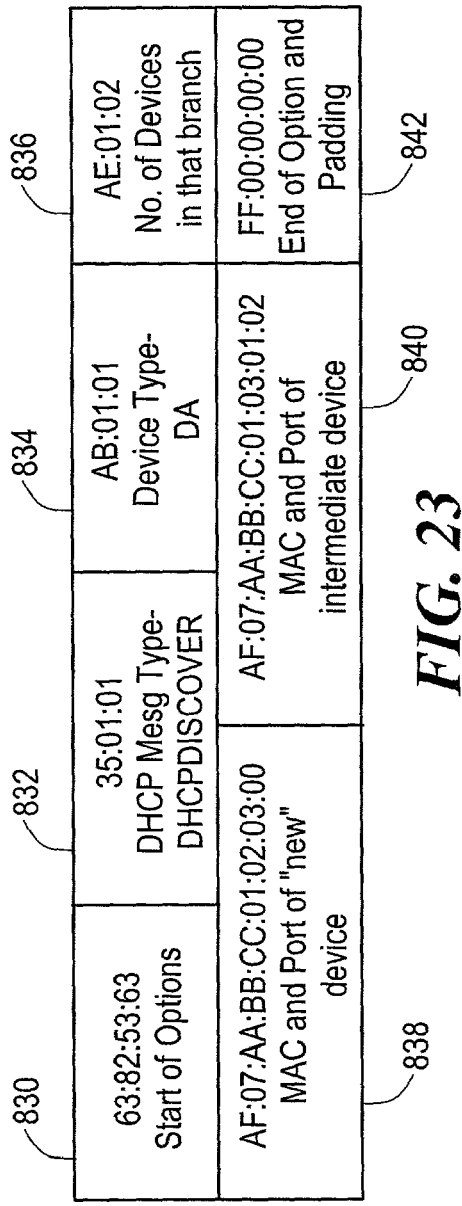
FIG. 23 illustrates DHCP options fields.

A typical options field as used in the present system is shown in FIG. 23. The start of the options field is identified by a start of options sequence 830. This is followed by the DHCP Message Type Option 832 that indicates the type of DHCP Message. Then follows a list of specific options 834, 836, 838, 840 described further below. The end of the options field is indicated by the END option 842.

The vendor specific option codes can be used for tag assignment and topology discovery purposes as shown in Table 9.

TABLE 9

Specific Option Codes

| Type (Hex) | Significance | Information Carried by Value Field |
| --- | --- | --- |
| 171 (AB) | Identify network element to Tag/Topology server | 1-Byte number identify DS, SAS or NIU |
| 172 (AC) | Identify Tag/Topology server to network element | 4-Byte number with the IP Address of the Tag/Topology server |
| 173 (AD) | Used to carry Routing ID Information in either direction | 3-Byte number that contains the Tag |
| 174 (AE) | Used to indicate the number of elements that have attached their MAC/Port for topology discovery | 1-Byte number that is the number of DSs and SASs in the upstream direction. This number is incremented by each device along the way that appends its MAC/Port information. |

TABLE 9-continued

Specific Option Codes

| Type (Hex) | Significance | Information Carried by Value Field |
|---|---|---|
| 175 (AF) | Used to indicate actual topology information. This field is used repeatedly by each device in the upstream direction to append its MAC/Port information | 7-byte number that carries the MAC and Physical Port information to construct topology of the new network element |

For example, referring again to FIG. 23, the option 834 includes type 171 (AB) and identifies the type of network element that is being initialized, in this case, a DS. Option 836 includes type 174 (AE) and indicates the number of elements that have attached their MAC/port information for purposes of topology discovery. In this case, option 836 indicates that the DHCP message includes information from two network elements. Options 838 and 840 include type 175 and indicate the actual MAC/port information for the new and intermediate elements, respectively.

It should be noted that IP Addresses and Tags can be assigned indefinitely or for a fixed duration (finite lease length). In the latter case, the IP Addresses and Tags will expire if they are not renewed. In order to renew the Tag and IP Address, the network element sends a DHCPREQUEST message. If the Tag/Topology server does not receive a renew message and the Tag expires, it is free to assign the Tag again to another network element. This can be done within the ambit of well-defined DHCP Messages.

Topology Discovery

Knowledge of the logical location of all network elements (DSs/SASs and NIUs) assists in performing troubleshooting, flow control, systematic assignment of RIDs to facilitate Wavelength Add Drop Multiplexing using Access Network Headers, network management and connection admission control.

As noted above, the Tag/Topology server 132 (FIG. 3) assigns Tags and IP Addresses and maintains an up to date topology of the network. As different network elements boot up and ask for IP Addresses and RIDs using the DHCPDISCOVER process described previously, the Tag/Topology server tracks and constructs a network topology. The Tag/Topology server can also request the Network Management Systems (NMS) 134 (FIG. 3) to prompt individual network elements to re-send their topology information at any time.

Initial topology discovery takes place using standard DHCPDISCOVER messages. As a network element boots up, it broadcasts a DHCPDISCOVER request as described above. The control bits are set as described further herein.

Figure 24:
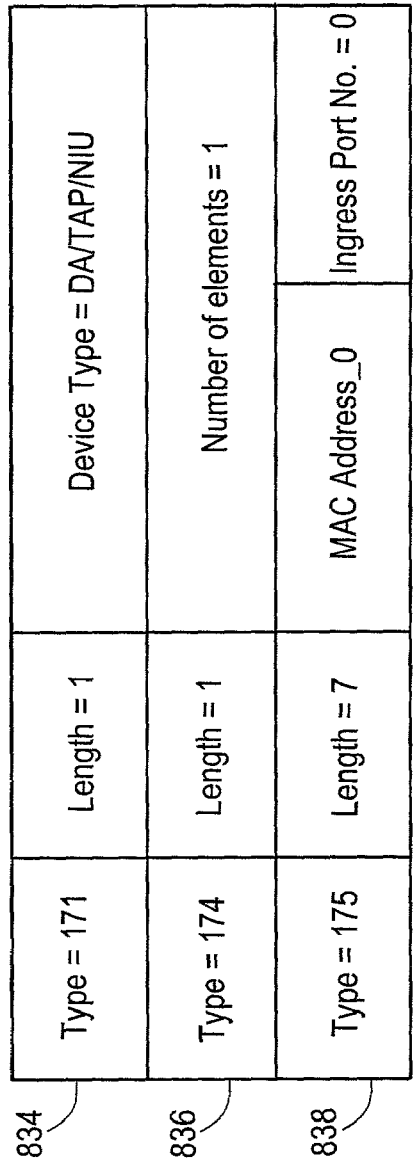
FIG. 24 illustrates DHCP options fields at an originating network element.

At the originating network element, the DHCP option fields 834, 836, 838 pertaining to topology discovery noted above in FIG. 23 are shown in more detail in FIG. 24. The topology information is constructed in DHCP Option 175. DHCP Option 174 contains the number of upstream elements that have already appended their information. Each subsequent network element adds its MAC address and the physical ingress port number on which it received this packet and increments the value of Option 174 by one. At an intermediate upstream element the DHCP Options fields are as indicated in FIG. 25.

The Tag/Topology server can derive the logical location of the new network element from the information in the options field of a completed packet and assign RIDs and IP Addresses accordingly.

In a dynamically changing system, the Tag/Topology server may lose track of the topology momentarily. In such a situation, it may ask the NMS to prompt the target element(s) to resend their topology using DHCPINFORM messages. In this case, the message structure remains the same as the DHCPDISCOVER and topology can be reconstructed. DHCPINFORM messages can also be sent periodically by the network element to ensure that topology information stays current.

Flow of User Traffic Within the Access Network

The flow of data traffic for a user device attached to a registered NIU 119 through home LAN 30 (FIG. 3) is now described.

For upstream traffic, the NIU performs a bridging function at the ingress to the Access Network and prevents local user traffic from entering the Access Network. For legitimate user traffic, the NIU inserts the Access Network Header into all upstream packets. The Access Network Header includes the unique RID assigned to the NIU by the Tag/Topology server. QoS bits described further herein are added as provisioned on a per flow basis. All network elements in the upstream path perform prioritization and queuing based on these QoS bit. At the ODS 112 (FIG. 3) the Access Network Header is discarded, the original Ethernet packet is reconstructed and handed to router 110 (FIG. 3).

For downstream traffic, the ODS 112 inserts an Access Network Header into each downstream packet based on the layer-2 destination address and recomputes the CRC. This header contains the 12-bit Routing ID of the NIU that serves the user device. All network elements forward the packet to various egress ports based on the entry in their routing table for this Routing ID. At the NIU, the Access Network Header is stripped off and the original (layer-2) packet is reconstructed and transmitted on the Home LAN 30 (FIG. 3).

Messaging Within the Access Network

Various network elements within the Access Network communicate with each other using a messaging protocol now described. The message processing depends on the Routing ID described above, the Control bits and the Destination MAC Address.

Control Bits

Referring again to FIG. 20, the Control bits 816 are part of the Access Network Header 806. Messaging packets with different control bit settings are processed differently by the different network elements. In the description of the embodiment described herein it is understood that no network element within the Access Network initiates messages for devices downstream from it. Network elements can initiate messages for other devices upstream. These messages can include information such as heartbeats and routing table updates. It should be understood also that the principles of the present system can be applied to a network in which messaging between all network elements takes place.

Significance of Control Bits for Downstream Packet Flow

In the downstream direction, control bits are used to mark messages from Access Network servers. These are special control messages that are meant for a network element and, for security reasons, should not reach the end user. The control bits are also useful for dynamically determining the NIU that serves an end device as described further herein.

The routing ID (RID) of a DS or SAS uniquely identifies the device. Hence, any frame that has the unique RID of the DS or SAS is forwarded to the processor 610 (FIG. 10) associated with that DS or SAS. All frames with Broadcast RID are forwarded to the processor and to all downstream egress ports. All downstream messages to the DS/SAS are processed by the TCP/IP stack.

The control bits have no significance at the DS/SAS as indicated in Table 10.

TABLE 10

Downstream Packet Handling at DS/SAS based on ID, Control Bits and Destination MAC Address

| Routing ID | Control Bits | Destination MAC Address | Behavior |
|---|---|---|---|
| Broadcast | X | X | Broadcast on All Ports and forward to Processor |
| Matches | X | X | Forward to Processor |
| Other | X | X | Forward on Relevant Ports Based on Routing Table |

The processing of downstream messages at the NIU is determined by the following factors. The RID of the NIU identifies the NIU and all user devices on its Home LAN. In other words, an NIU is not uniquely identified by an RID. The NIU is the last point at the Access Network before the data enters the subscriber premises. Hence, the NIU needs to filter out all control plane data. Control messages are identified using control bits and Destination MAC Addresses. The NIU needs to identify and respond to ARP-like messages from the CAC server for constructing the NIU-User device mapping.

The behavior of the NIU is indicated in Table 11:

TABLE 11

Downstream packet handling at NIU based on ID, Control Bits and Destination MAC Address

| Routing ID | Control Bits | Destination MAC Address | Behavior |
|---|---|---|---|
| Broadcast or Matches | 000 | Broadcast | Process Packet and Broadcast on Home LAN |
| Broadcast or Matches | 001 | Broadcast | Process Packet |
| Broadcast or Matches | 000 | Matches | Process Packet |
| Broadcast or Matches | 001 | Matches | Process Packet |
| Broadcast or Matches | X | Only OUI Matches | Discard Packet (Do not forward on Home LAN) |
| Broadcast or Matches | 000 | Does not Match | Forward Packet to Home LAN Interface |
| Broadcast or Matches | 001 | Does not Match | Parse Layer-2 Frame for Message from CAC Server |
| Broadcast or Matches | Other | X | Reserved - Discard for now |
| Other | X | X | Discard Packet |

Figure 26:
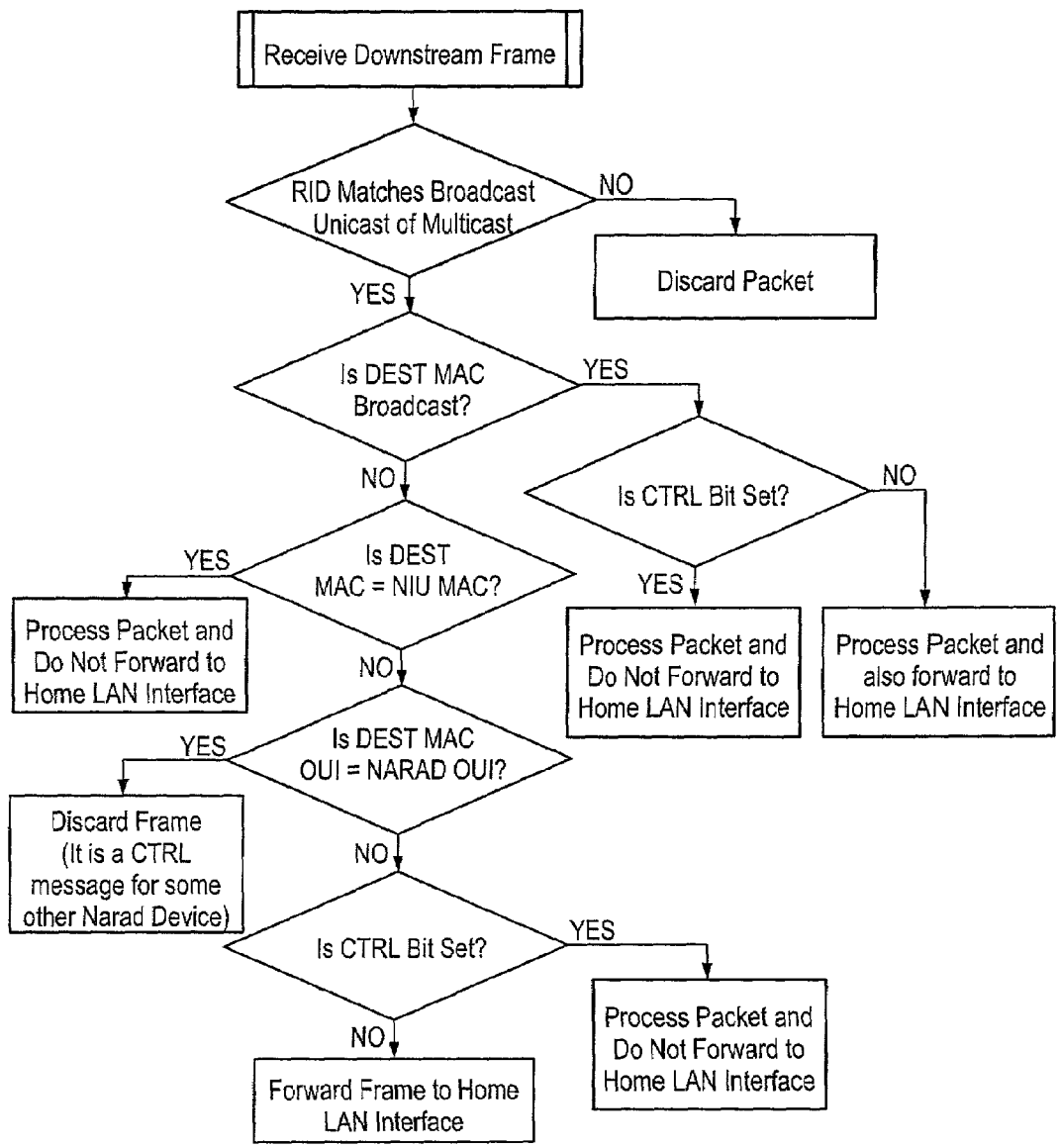
FIG. 26 illustrates downstream message processing at an NIU.

Downstream message processing is shown in FIG. 26.

Significance of Control Bits for Upstream Packet Flow

In the upstream direction there can be several kinds of messages flowing between the different network elements. Such messages are meant either for the parent only (e.g., so-called heartbeat messages) or for all the elements in the upstream path. As used herein, "parent" refers to the next upstream network element relative to the originating element which is referred to as the "child". In addition, DHCP messages flow all the way to the Tag/Topology Server and all network elements along the way append some information and pass it on as described herein above. All upstream messaging between network elements and other servers takes place at Layer-3 using their respective IP Addresses and does not require special control bits. The following messages are specified in Table 12:

TABLE 12

Upstream Message types

| Control Bits | Significance |
|---|---|
| 000 | User Data |
| 001 | Intercept, Parse and Take Necessary Action |
| 010 | Keep a Copy and also Forward upstream |
| 011 | DHCP Message (Append Required Information and Forward) |
| 100 | ARP Message (Indicates to the ODS that it needs to use this packet for label learning) |

The criterion for adding the control bits at the NIU is shown in Table 13:

TABLE 13

Control Bits Added by NIU Based on Message Type

| Packet Initiated By | Message Type | Control Bits Added |
|---|---|---|
| User Device | User Data (Non ARP) | 000 |
| User Device | ARP Messages | 100 |
| NIU | Packet meant for Server (Other Than Tag/Topology Server) | 000 |
| NIU | Packet Meant for Interception by Parent (e.g. Heartbeat) | 001 |
| NIU | Packet Meant to go to All Devices in the Upstream Path (e.g. Routing Update) | 010 |
| NIU | DHCP Messages originated by NIU (for topology discovery) | 011 |
| NIU | ARP Messages | 100 |

For packets going upstream, the behavior of the DS/SAS is shown in Table 14. It is important to note that the DS/SAS/NIU ID field is not examined to decide the course of action. Instead only the Control Bits are examined. Also, for all upstream messages, raw Layer-2 frames are examined and are not passed up the TCP/IP Stack.

TABLE 14

Upstream Packet Handling at DS/SAS Based on Control Bits

| Control Bits | Action |
|---|---|
| 000 | Pass Through |
| 001 | Intercept and Parse (Layer-2) Message. |
| 010 | Keep a Copy of the Message and Forward Upstream |
| 011 | Intercept the DHCP Message, Parse and Append MAC and Physical (ingress) Port Number and Forward Upstream |
| 100 | All DSs/SASs Pass Through and ODS intercepts for Label Learning |

For packets/messages initiated by the DS/SAS, the control bits are similar to those of packets initiated by the NIU as shown in Table 15.

TABLE 15

Control Bits Added by DS/SAS Based on Message Type

| Packet Initiated By | Message Type | Control Bits Added |
|---|---|---|
| DS/SAS | Packet meant for Server (other than Tag/Topology Server) | 000 |
| DS/SAS | Packet meant for interception by Parent (e.g. Heartbeat) | 001 |
| DS/SAS | Packet meant to go to all devices in the upstream path (e.g. Routing Update) | 010 |
| DS/SAS | DHCP Messages originated by DS/SAS (for topology discovery) | 011 |
| DS/SAS | ARP Messages (for label learning) | 100 |

Communication Between Access Network Servers and DS/SAS/NIUs

A network server farm 130 includes various servers 132, 134, 136 (FIG. 3) that need to communicate with the DSs, SASs and NIUs within the Access Network. All messaging between these servers and access network devices (e.g. SASs, DAs) takes place over UDP/IP.

Some of the servers that use standard protocols such as SNMP or DHCP communicate using well-defined ports and message structures. Others use private ports and communicate using a system Messaging scheme. These messages are part of the UDP Payload and are described herein.

Communication Within the Access Network

There is no downstream messaging between elements in the Access Network. This implies, for instance, that a SAS does not address the NIU downstream from it and a DS does not address any downstream SASs and DSs.

In the upstream direction, all messages are carried in the Layer-2 Payload and follow the pattern described herein below. The upstream messages contain the RID) of the source and appropriate Control Bits described above. In such upstream messages, the Layer-2 Destination Address is Broadcast; the Layer-2 Source Address is the MAC Address of the Source; the Layer-2 Protocol Indicator indicates Message Type.

Message Structure

In an embodiment, the "non-standard" messaging uses the approach described below and shown in FIG. 26. The exemplary message format 850 includes a message type (2 bytes) field 852, a message length (2 bytes) field 854 and an information field (1 to 1000 bytes) 856. It should be noted that all messaging between the network servers and a DS/SAS/NIU takes place over Layer-4 while all messaging within the Access Network takes place over Layer-2. However, the message structure shown in FIG. 26 remains the same. Based on the Message Type, the information is cast into the appropriate structure and processed. The message types include heartbeat or keep alive, routing table updates and NIU discovery messages.

Network Management

As noted above in reference to FIG. 3, the Access Network includes a network management system (NMS) server 134 that is responsible for monitoring and supervision of the network elements and for provisioning services. The NMS server communicates with the network elements using standard SNMP commands. Each network element, including ODSs, DSs, SASs and NIUs, includes a processor that is given an IP address and implements the SNMP protocol stack. The NMS server communicates with these processors to provision services, set control parameters, and retrieve performance and billing data collected by these processors. The network elements periodically transmit "stay alive" signals to their upstream peers; the status information based on the received stay alive signals can be communicated to the NMS server for use in fault diagnosis.

Services Overview

The Access Network of the present invention provides a Quality of Service (QoS) aware, high bandwidth access medium over cable to homes and small business customers. The Access Network is capable of supporting a variety of constant and variable bit rate bearer services with bandwidth requirements ranging from a few kilobits per second to several megabits per second, for example, and with Constant Bit Rate Real-Time (CBR-RT), Variable Bit Rate Real-Time (VBR-RT) and Non-Real-Time delivery. End-users are able to use these services to support applications such as voice telephony, video telephony, multi-media conferencing, voice and video streaming and other emerging services.

The HFC plant already offers cable television and, in some cases, broadband Internet access via DOCSIS. The cable service providers have made large investments in the plant and equipment needed to provide these services. The Access Network can be implemented on the HFC plant without disrupting legacy systems available on this plant.

Quality of Service (QoS) Classes

The Access Network of the present system provides QoS classes to support the various bearer services required by different end-user applications. The QoS classes are described as follows, though other additional services can be envisioned for support using the principles of the present system.

QoS Class 1 is associated with Constant Bit Rate Real-Time Services (CBR-RT). This QoS class supports real time services such as Voice over IP (VoIP), which have very stringent delay requirements. The services belonging to Class 1 typically have a constant bit rate requirement although this class can also include variable bit rate services such as voice telephony with silence suppression. Most of the applications using this service class have a bit rate requirement of for example, a few 10 s of kbps to 200 kbps. Total packet delay through the Access Network for this class is typically less than about 5 milliseconds.

QoS Class 2 is associated with Variable Bit Rate Real-Time Services (VBR-RT). This QoS class supports the large variety of constant and variable rate bearer services that have a relatively less stringent delay requirement. Existing and emerging audio and video applications with a variable bit rate requirement typically dominate applications using Class 2. The average bandwidth needed for applications using the VBR-RT service class typically range from a few 100 kbps to a few Mbps. For this service class the total packet delay (excluding packetization delay) over the Access Network is typically within 15 milliseconds.

QoS Class 3 is associated with Variable Bit Rate Non-Real-Time (VBR-nRT) Services with Throughput Guarantees. This QoS class supports VBR services with loose delay requirements, but with throughput guarantees. That is, the throughput received by an application using such a service is guaranteed over a suitably long time interval (e.g. 1 or 10 seconds); however, there are no guarantees for individual packet delays. Such a service can offer throughputs of several megabits per second, and is useful for applications such as video download, or data connections between offices located at different places.

QoS Class 4 is associated with Unspecified Bit Rate (UBR) Services. This QoS class supports UBR services which have no explicit delay or throughput requirements. The services in Class 4 are always available to an end-user, i.e., no call set up is required for an end-user application to be able to send or receive data using the Class 4—UBR service. In this sense, the UBR service is much like what typical users of the Internet receive from the latter. The maximum packet size allowed for this class is made large enough (e.g., around 1600 bytes) to be consistent with packet sizes allowed on typical Ethernet implementations. The typical throughput end-users can receive via UBR services is substantially larger (e.g., a few Mbps) than what is available via DOCSIS.

Since services belonging to the first three QoS classes, i.e., CBR-RT, VBR-RT and VBR-nRT, have explicit QoS guarantees, they have to be established via call setup or provisioning as the system needs to ensure that it has adequate resources to deliver the requested QoS guarantees. The UBR service, on the other hand, is always available, as it does not make any throughput or delay guarantees.

QoS Support

In this section the features that are included at the various network elements in order to deliver services with their associated QoS requirements are described.

As noted herein above, for each packet entering the Access Network an Access Network Header 806 (FIG. 20) is inserted by the corresponding NIU. A packet belonging to the traffic stream associated with a particular service is identified as belonging to a specific QoS class on the basis of the QoS field 818 in the Access Network Header. Once inside the Access Network, the treatment received by a packet at all network elements such as DSs and SASs is determined entirely by the value stored in its QoS field.

QoS Features at NIU for Upstream Traffic

The NIU represents the ingress point of the Access Network, and, as such, plays an important role in the overall QoS management. The features provided at the NIU for QoS support include packet classification, traffic policing, egress buffer control and transmission scheduling.

The specific details of the features that support QoS management over the Access Network are now described with reference to FIG. 28 which shows stages of packet flow through an NIU. The packet flow stages include packet classifier 1302, per-service instance traffic policing 1304, service-specific packet processing 1306, QoS Class based egress buffer control 1310, transmission scheduler 1312 and modem buffer 1314.

An incoming upstream packet is first processed through packet classifier 1302, which identifies the service instance to which the packet belongs. The next stage the packet passes through is the policing stage 1304. This stage monitors the flow associated with each service instance, and drops all of those packets that do not meet the policing criteria. The packets that pass this stage are then handed over to the appropriate service modules 1308 where they undergo service specific processing. At the end of the packet processing stage 1306 a packet is ready to be transmitted out. It is now handed to the egress buffer control stage 1310, which places the packet in the egress buffer associated with its QoS class. (Each QoS class has a fixed buffer space allocated to it on the egress side. There is no distinction between different service instances belonging to the same QoS class.) A packet that finds insufficient space in the egress buffer is dropped. Those that are accepted await their turn at transmission, which is determined by the transmission scheduler 1312. The transmission scheduler takes into account the relative priorities of different QoS classes and the flow control flags it has received from the upstream SAS device in its decisions regarding the time and order of packet transmission. A packet selected for transmission by the scheduler is copied into the modem buffer 1314, from where it is transmitted out over the drop.

The specific details of the processing stages that support QoS management are now described.

The NIU receives packets from end-user applications over the 100BaseT Ethernet interface that connects it to PCs and other devices on the subscriber premises. The packets are, therefore, compliant with the Ethernet standard. The NIU, as noted above, generates an Access Network header for the packet for use over the Access Network, and fills up the QoS field according to the QoS class associated with the corresponding traffic stream. Also, the NIU needs to police the traffic it receives from the subscriber to protect network resources. All of this processing requires identification of the service instance to which the packet belongs. Once a packet's service instance is determined, its QoS class and other processing requirements (e.g., VLAN tagging) can be determined as function of the service instance. Consequently, the first major step in the processing of an upstream packet is packet classification, meaning the identification of the service instance to which a packet belongs.

In order to be able to determine the service instance associated with an incoming upstream packet, the NIU uses a filtering table, such as one with the following format:

TABLE 16A

Packet Classification (Filtering) Table

| Source MAC Address | Source IP Address | Source Port ID | Destination MAC Address | Destination IP Address | Destination Port ID | Service Instance |
|---|---|---|---|---|---|---|
| XYZ | * | * | * | * | * | S1 |
| * | ABC | D | * | EFG | H | S2 |

Rows of the packet classification table identify the service instances associated with different flows. Not all address fields in Table 16 need to be filled with actual address fields to enable classification. "Wildcards" are also allowed, which match with any value in the corresponding field of the packet being classified. For instance, the first row of Table 16A has the "Source MAC Address" field filled with the MAC address (XYZ) of some device, and all other address fields filled with a "*" which is the wildcard. This means that all packets whose source MAC address equals XYZ should be considered as belonging to the service instance S1, regardless of the contents of the other address fields in that packet. On the other hand, the second row indicates that for a packet to be identified as belonging to service instance S2, its source IP address and port should be ABC and D, respectively, and the destination IP address and port should be EFG and H, respectively. (Source and destination MAC addresses are wildcards in this case, meaning that they will be ignored in the identification of a packet as belonging to S2.)

The packet classification table allows multiple rows to correspond to the same service instance. This feature can be particularly useful in the handling of VPN services between office locations. In these situations, all devices in an office location can be communicating with other locations via the same VPN service (with some QoS guarantees.) These devices could be identified by their MAC addresses. The classification table, then, would appear to be composed of multiple rows, each specifying the MAC address of a device in the source MAC address field (with the rest of the address fields filled with wildcards), and all having the identifier of the (same) VPN service in the service instance field.

Once the service instance associated with a packet is determined, it provides a pointer to the appropriate row of a "service descriptor" table, an example of which is shown in Table 16B:

TABLE 16B

Service Descriptor Table

| Service Instance | Service Type | Service Specific and Optional Attributes | Mandatory/QoS Related Attributes | | | |
|---|---|---|---|---|---|---|
| | | | Bit Rate | Max. Burst Size | Max. Packet Size | QoS Class |
| S1 | VPN | | Value 1 | Value 2 | Value 3 | Value 4 |
| S2 | L2TP | | Value 5 | Value 6 | Value 7 | Value 8 |

Each row of the service descriptor table corresponds to a unique service instance, and lists all the relevant attributes that define the service. Some of these attributes define the type of service, e.g. L2TP, VPN, which, in turn, define some of the processing that the packet undergoes at the NIU. Some more attributes can define additional actions to be performed on the packet. These actions include attaching a VLAN tag, or setting the TOS byte in a specific manner. The latter is a useful feature that can enable service providers using Diffserv based packet handling in their wide area network to provide preferential treatment to delay sensitive traffic even beyond the Access Network. These attributes are service specific or optional. In addition, each row of the service descriptor table contains some QoS related attributes which are defined (i.e. assigned a value to) for every service instance established at an NIU. These QoS related attributes include sustainable bit rate (or throughput), maximum burst size, maximum packet size and QoS class.

As noted above a call or connection that requires any service other than UBR uses an explicit call setup. During call setup the CAC server ensures that the system has adequate resources to deliver the required quality of service to that call before allowing the call to be established. Thus, when the CAC server grants a call request to an end user device, it also informs the corresponding NIU of the flow identifier information associated with the corresponding call and its QoS class. Similarly, when a provisioned service is being established, the provisioning server interacts with the CAC server to ensure that the system has adequate resources to deliver the desired QoS. Once this interaction is over and it has been found that the desired service level can be supported, the CAC server informs the concerned NIU about the service being provisioned. This information includes the type of the service being provisioned, criteria for identifying packets belonging to the service instance, service specific and optional attributes, and mandatory (QoS related) attributes of the service. When the NIU receives this information from the CAC server, it adds one or more rows to the packet classification table to identify packets belonging to that service instance, and adds one row to the service descriptor table to hold information related packet processing and QoS management associated with the service (instance) being set up. Conversely, when a call terminates or a provisioned service is being discontinued, the CAC server informs the NIU of the corresponding event. The NIU, then, deletes from the packet classification and service descriptor tables the entries associated with the call or the provisioned service being discontinued.

Traffic Policing and Transmission Scheduling

Another important function performed by the NIU is the policing of the traffic it receives from the subscriber and forwards to the Access Network. Traffic policing is desirable for QoS management in that without these features, there is no control over the traffic being released into the network at different QoS levels. This control is used for delivering the QoS associated with different service classes since certain quality metrics (e.g., low delays) cannot be achieved unless the total traffic associated with certain QoS classes is held within certain limits. Traffic policing is also used to prevent "cheating" by subscribers.

In the present system, traffic policing at the NIU is implemented using "token buckets" which regulate the sustained flow rate of traffic into the network around it's negotiated value while allowing some local variability in the traffic inflow around its long-term average. In an embodiment, the policing of traffic is performed on a "per service instance" basis. That is, there is a token bucket associated with each service instance set up at an NIU, and it regulates the flow of traffic associated with that service instance.

Figure 28:
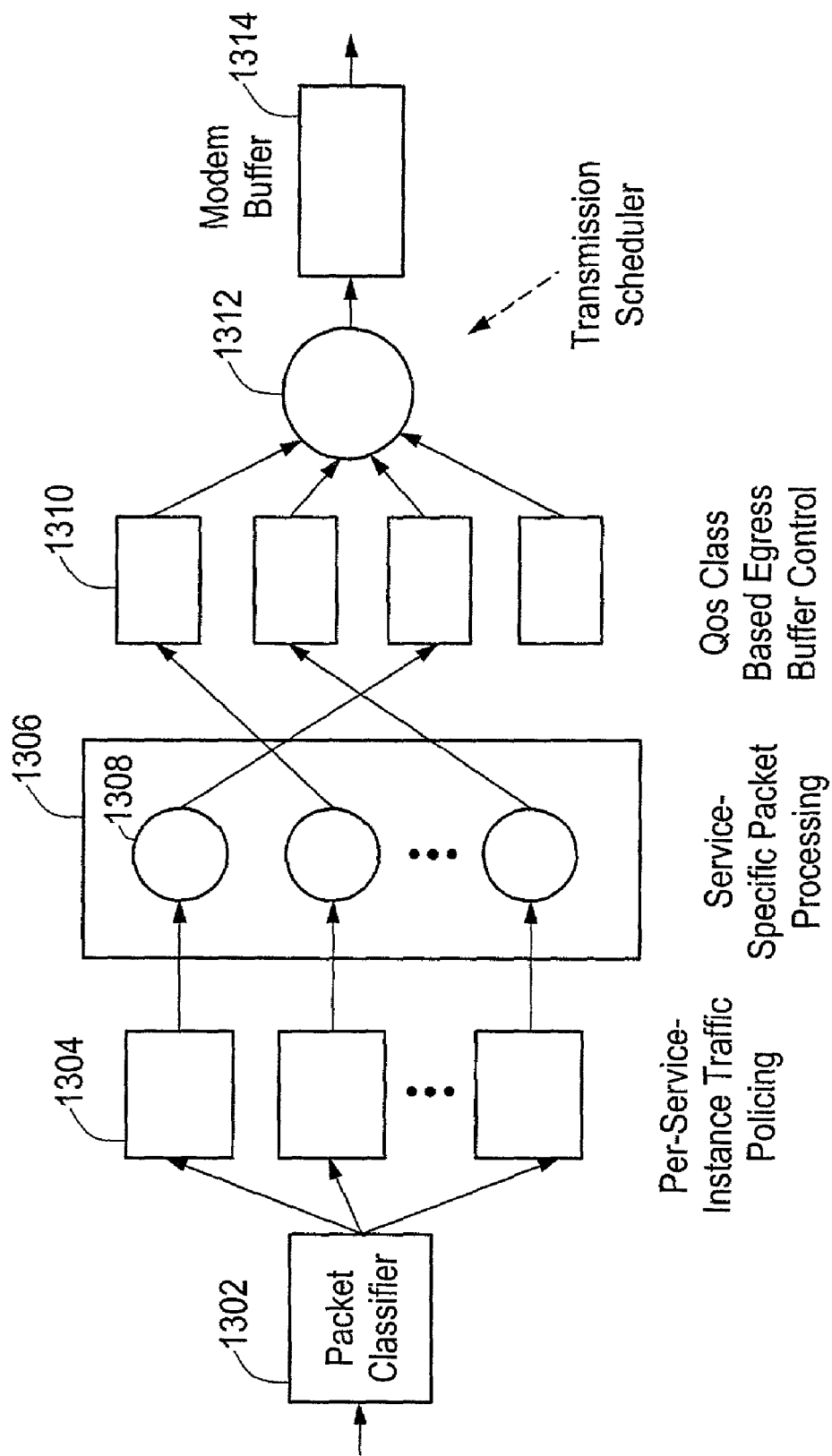
FIG. 28 illustrates upstream packet flow through a network interface unit.

As shown in FIG. 28, the traffic policing stage 1304 immediately follows the packet classification stage 1302. That is, traffic policing precedes the service specific packet processing stage 1306, which typically requires a significant amount of NIU processing capacity. This ordering ensures that the NIU processing capacity is not wasted on non-compliant packets that get dropped at the policing stage.

For each service instance, there is a token bucket, which is characterized by two parameters: token_size and max_burst_size which respectively determine the average sustainable traffic rate and the largest traffic burst that the token bucket allows into the network.

The NIU maintains a clock, which is used for updating the state of the token buckets for all service instances. the NIU also maintains a state variable, X, for each token bucket. At the end of each clock period of duration T ms, the NIU updates the state variable, X. It does this using the following update equations:

$$X \leftarrow X + \text{token\_size} \quad (\text{Eq. 1})$$

$$\text{If } (X > \text{max\_burst\_size}) X \leftarrow \text{max\_burst\_size} \quad (\text{Eq. 2})$$

Since the clock period T is fixed, the token size parameter (token_size) of a token bucket determines the rate at which the corresponding service instance can transmit data on a sustained basis. Specifically, if token_size is measured in bits and the clock period, T, is measured in milliseconds, then the maximum sustainable data rate for the corresponding service class is given by token_size/T kbps.

Packet handling and token bucket updates are done independently, in an asynchronous manner. Whenever a packet is received by an NIU from its subscriber interface, it is passed through the packet classifier to identify its service instance. Once the service instance of a packet is identified, the packet is handed to the corresponding traffic police block 1304. The latter compares the length of the packet with the current value of its state variable X. If X is smaller than the packet length, the packet is dropped right away. Otherwise, it is passed on to the next stage (service specific processing 1306) based on its service instance, and the value of X is decremented by the packet length.

Service Specific Packet Processing

Service specific packet processing involves the processing a packet undergoes at the NIU depending on the service instance to which it belongs. For instance, such processing, in the case of VLAN based VPN services, can include attaching a VLAN tag to the packet. It can be much more elaborate in the case of some other services such as L2TP based VPN services. The service modules 1308 which carry out service specific processing, have FIFO queues where packets awaiting processing are lined up. Limits can be placed on the size of these queues in order to ensure that packets waiting for service modules having temporary problems (e.g. when under malicious attack) do not end up occupying large segments of memory. If a packet handed to a service module for service specific processing finds that the corresponding queue size has reached its limit, it is immediately dropped. Packet size restrictions can also be enforced at this stage. For instance, if a service instance is set up with a limit on the maximum packet size, a packet belonging to that service instance can be dropped at this stage if its size exceeds the corresponding limit. (Alternatively, packet size restrictions may be enforced at the traffic policing stage.)

For convenience, the packet processing stage 1306 also includes some service independent processing that all packets need to undergo. This service independent processing follows service specific processing, and includes such things as the attachment of a Access Network label, with the QoS field filled with the QoS class associated with the packet's service instance, and recalculation of the packet's Ethernet check-sum. At the end of this processing, a packet is ready to go out and is handed to the egress buffer control stage 1310.

Egress Buffer Control

Since there are four QoS classes in the embodiment of the Access Network, there are four egress buffers—one for each class—in each NIU. Each egress buffer is allocated a fixed amount of space to hold packets. The egress buffer control stage 1310 performs a simple operation. When a packet is handed to this stage, it checks if the egress buffer associated with the packet's QoS class (which is a function of its service instance) has adequate space (in terms of byte count) to hold the packet. If it does, the packet is placed in that buffer where it waits for its turn at transmission. Otherwise, it is dropped.

Transmission Scheduler

The transmission scheduler 1312 has the responsibility to hand packets to the modem in a manner that is consistent with the priorities associated with different QoS classes and the flow control restrictions imposed by the SAS device. The latter requirement is important since a packet handed to the hardware for copying into the modem buffer cannot be stopped from being transmitted.

QoS class 1 (which is associated with CBR-RT services) is at the highest priority, followed by QoS class 2, QoS class 3 and QoS class 4 in that order. The transmission scheduler observes absolute, but non-preemptive priorities between these QoS classes. Moreover, the NIU periodically receives flow control flags from the SAS device, which, for each QoS class, indicate whether the NIU has permission to transmit a packet belonging that class. The NIU stores in a register the values of most recent flow control flags it has received from the SAS. The transmission scheduler uses these values in its scheduling decisions.

Because of the fact that once packets are handed to the hardware (the DMA controller, in particular) for copying them into the modem buffer they cannot be stopped from being transmitted, tight coordination is required between the transmission scheduler and the hardware to ensure that only a manageable quantity of packets is handed to the hardware at any time. This is achieved as follows.

The modem buffer 1314 has a limited amount of buffer space e.g., 3200 bytes. Periodically, e.g., every 100 microseconds, the hardware writes into a designated register the amount of memory space available in the modem buffer at that instant, and sends an interrupt to the CPU. The CPU processes this interrupt at the highest priority, and as part of this interrupt processing calls the function representing the transmission scheduler task. When the transmission scheduler is called, it reads (from the relevant registers) the values of the most recent flow control flags as well as the memory space (in bytes) available in the modem buffer. It uses this information in its scheduling decisions as shown in FIG. 29.

Figure 29:
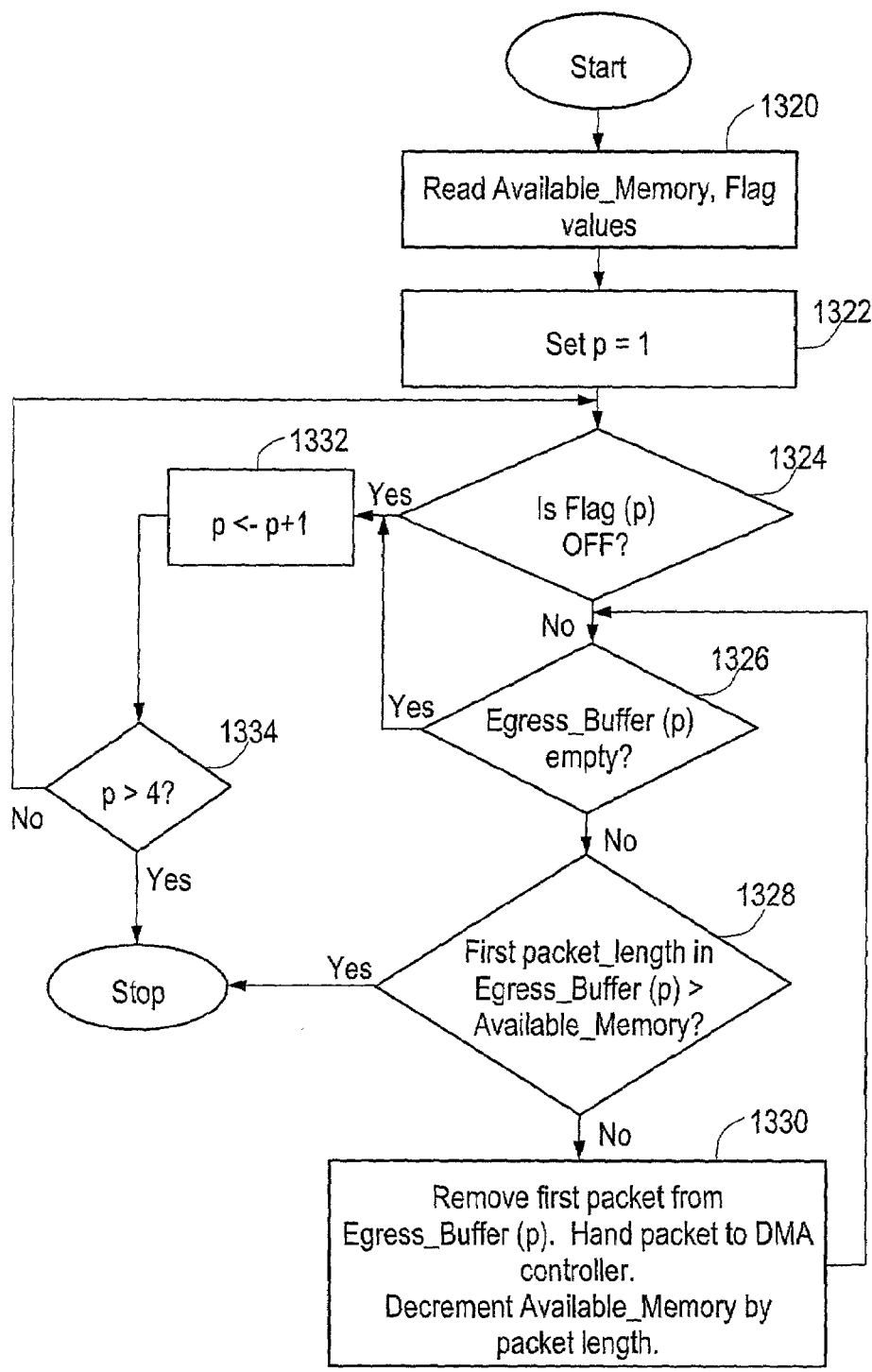
FIG. 29 illustrates a scheduler task in an embodiment.

In FIG. 29, the variable, Flag[p], stands for the current value of the flow control flag associated with QoS class p (where p=1, 2, 3 or 4.) The variable Available_Memory stands for the memory space (in bytes) available in the modem buffer. As shown in FIG. 29, when the CPU processes the hardware interrupt, it calls the transmission scheduler task, which reads the variable, Available_Memory, from a designated register. The value of this variable is decremented (by the length of the packet) every time a packet is handed to the DMA controller for copying into the modem buffer. Once the transmission scheduler task is exited, the DMA controller can copy the packets independently, without involving the CPU in this process. The copying can take at most 10 to 20 microseconds, which is well short of the interrupt interval.

Note that the total byte count of packets handed to the DMA controller on any one execution of the transmission scheduler never exceeds the available memory in the modem buffer. Also, if the transmission scheduler encounters a packet that cannot be copied into the modem buffer because it would violate the available memory constraint, the scheduler is exited even if there are smaller packets at lower priority levels in their respective egress buffers. This is to prevent small low priority packets from overtaking large higher priority packets because of their size.

In another embodiment, traffic shaping/policing is done on a per QoS Class basis. This alternate traffic shaping/policing approach used at the NIU is described with reference to FIGS. 30–33. Queue[1] 862A, Queue[2] 862B, Queue[3] 862C, Queue[4] 862D (referred to generally as 862) are input buffers associated with the four QoS classes. The input buffers receive packets on lines 860A, 860B, 860C, 860D from QoS mapping logic 858, which determines the QoS class as noted above for incoming packets received from the end user devices on line 857. Flow Control (FC) Flag 1, Flag 2, Flag 3, Flag 4 indicated at 864A, 864B, 864C, 864D, respectively, are transmission control flags each of which corresponds to one of the four QoS classes. The FC flags are referred to generally as 864. In addition, for each QoS service class there is an associated token bucket (TB) indicated at 865A, 865B, 865C, 865D. Buffers 870A, 870B are transmit buffers, each of which is large enough to store a full sized (e.g., maximum transmission unit or MTU size) packet. The NIU has two transmit buffers so that the transceiver can transmit one packet while scheduler 866 copies another packet into the other transmit buffer that is ready for transmission. Buffer flags 868A,

868B correspond to the transmit buffers. The traffic shaping/policing is managed by the scheduler 866.

In the alternate embodiment described with reference to FIGS. 30–33, for each QoS class, there is a token bucket and an input buffer. Each token bucket is characterized by two parameters: token_size and max_burst_size which respectively determine the average sustainable traffic rate and the largest traffic burst that the token bucket allows into the network. Note that the NIU uses a token bucket for each QoS class, rather than for each traffic flow. Thus, the parameters associated with the token bucket and the size of the input buffer for a QoS class can be determined by the total traffic associated with that class that is expected to pass through the particular NIU.

The NIU maintains a clock that is used for updating the state of the token buckets for all QoS classes. In addition, the NIU maintains a state variable, X, for each token bucket. At the end of each clock period of duration T, the NIU updates the state variable X using the update equations (Eq. 1) and (Eq. 2) noted above for the first embodiment.

Since the clock period T is fixed, the token size parameter (token_size) of a token bucket determines the rate at which the corresponding service class can transmit data on a sustained basis. Specifically, if token_size is measured in bits and the clock period, T, in milliseconds, then the maximum sustainable data rate for the corresponding service class is expressed as token_size/T kbps.

Figure 30:
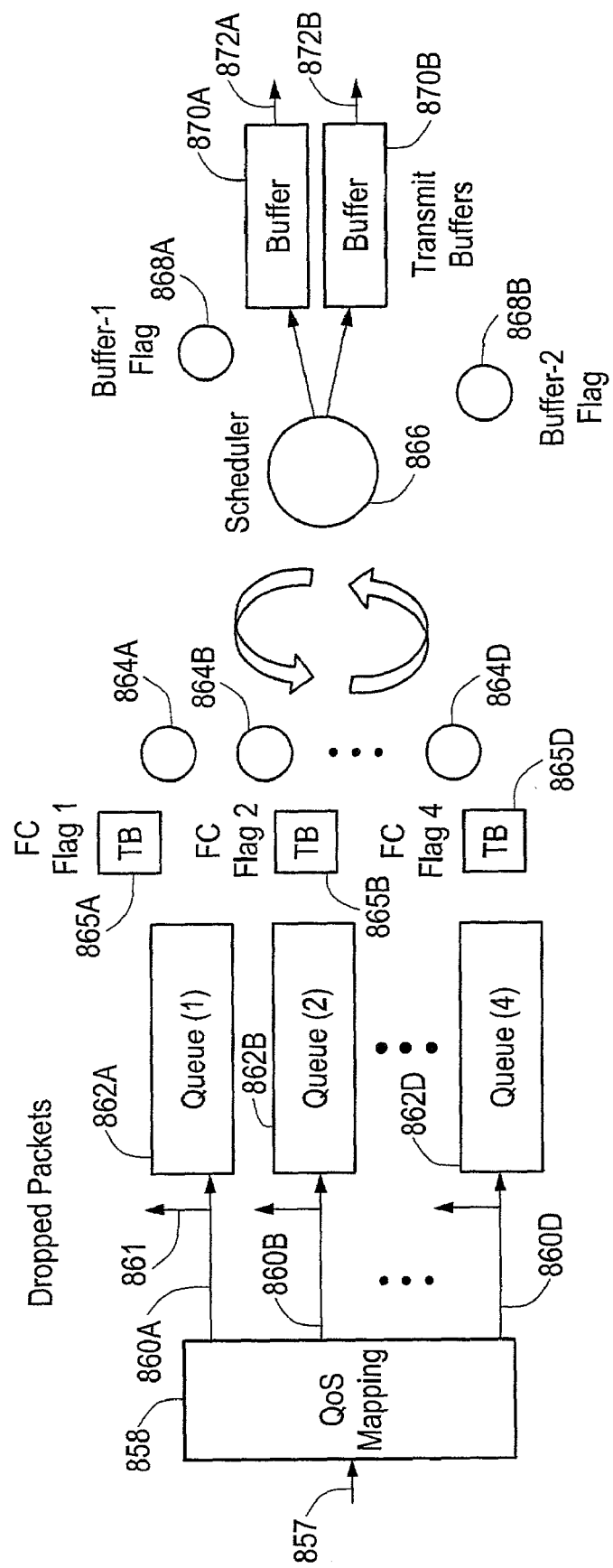
FIG. 30 illustrates traffic shaping/policing and transmission scheduling at a network interface unit in another embodiment.
Figure 31:
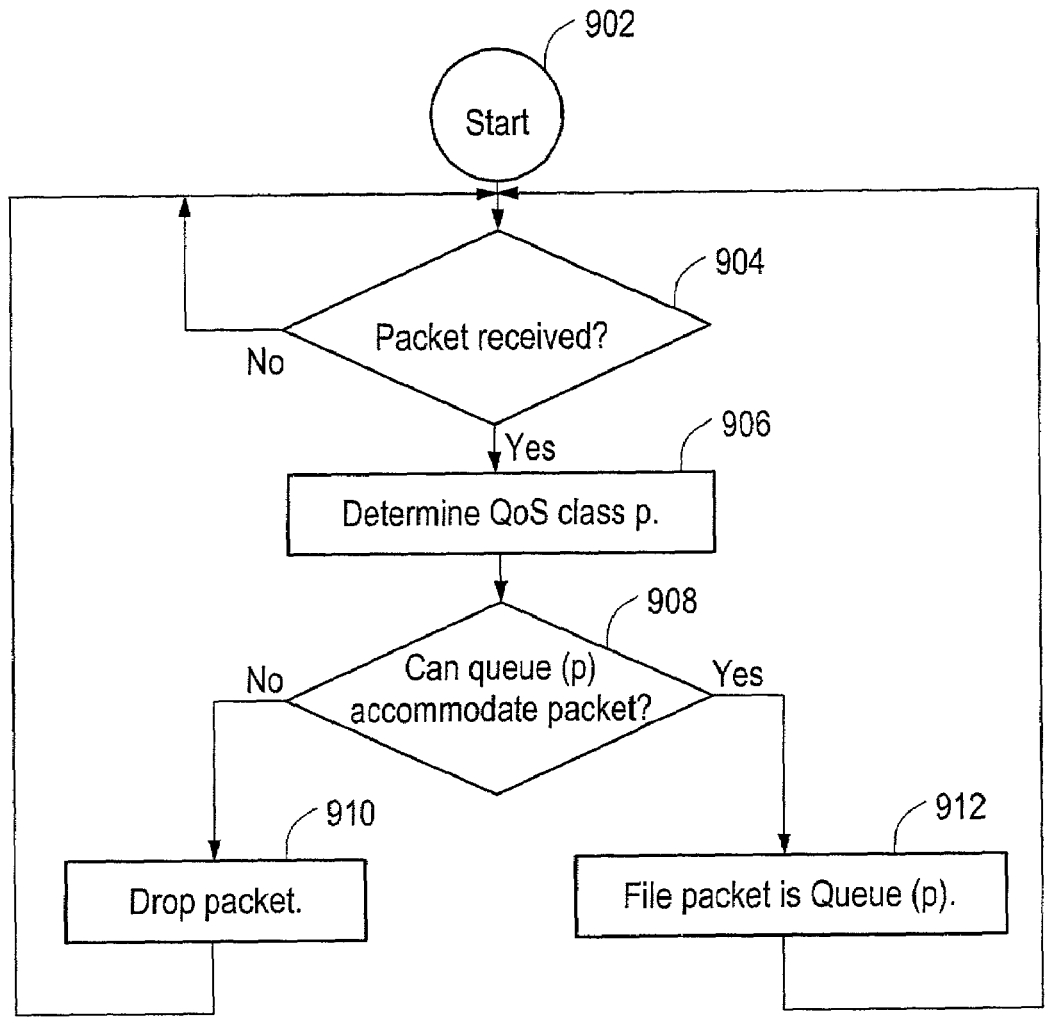
FIG. 31 is a flow diagram of packet mapping logic a network interface unit.

Packet handling and token bucket updates are done independently, in an asynchronous manner. FIG. 31 is a flow diagram that represents the packet mapping and input control logic of the NIU. Whenever a packet is received by an NIU from its subscriber interface at 904 and has undergone service specific processing, it is passed through the mapping logic 858 (FIG. 30) to identify its QoS class at 906. Once the class of a packet is identified, and an Access Network Header is attached to it, the NIU at step 908 checks if there is adequate space in the input buffer 862 associated with the QoS class of the packet to accommodate the packet. At 910 the packet is dropped (line 861 in FIG. 30) if the input buffer has insufficient space for the packet. Otherwise at 912 the packet is admitted to the proper input buffer and scheduled for transmission by the scheduler 866 in a FIFO order within that class.

The token buckets 865 regulate the outflow of the corresponding traffic streams. When the accumulated credit as indicated by the state variable X for a particular token bucket exceeds the length of the first packet waiting in the corresponding input queue, it means that the packet can now be transmitted over the output link without violating the flow constraints imposed on the flow associated with the corresponding QoS class and represented by its token bucket.

In the case of an NIU, there are four input queues, each of which may have a packet that is ready for transmission as determined by the corresponding token bucket. Also, the SAS to which the NIU is directly connected periodically sends ON-OFF flow control signals to the NIU indicating to the latter from which of the four QoS classes the SAS is ready to receive traffic. Specifically, once every $T_F$ milliseconds (e.g., 10 us), the SAS sends to the NIU a signal carrying four indicators, one for each QoS class. If the indicator associated with a QoS class is ON (e.g., represented by a flag value of 1), the NIU is free to send the SAS traffic belonging to the particular QoS class. If the indicator value is OFF (e.g., represented by a flag value of 0), the NIU holds traffic belonging to that QoS class until the indicator value is changed to ON.

The NIU stores the most recent values of the indicators in the four flow control (FC) flag fields 864 (Flag 1, Flag 2, Flag 3 and Flag 4). The FC flag fields indicate whether the NIU is free to forward traffic belonging to their respective QoS classes. Thus, the NIU not only has to make a choice between the multiple packets that may be ready for transmission (as determined by their respective token buckets), but also has to take into account whether it has permission to forward traffic belonging to particular QoS classes (as indicated by the corresponding FC flag values). The scheduler 866 carries out this task in a manner that obeys the constraints imposed by the token buckets and the flag values, while attempting to minimize the delays for the first three QoS classes (i.e., Classes 1, 2, 3).

As noted above, the NIU has two transmit buffers 870A, 870B (FIG. 30) so that the transceiver can transmit one packet while the scheduler 866 is copying another packet into the other transmit buffer that is ready for transmission. To ensure that the transceiver transmits packets in the same order in which the scheduler has copied them into the transmit buffers, the pointers Next_Write_Buffer and Next_Read_Buffer and the buffer flags 868A, 868B (i.e., Buffer 1 flag and Buffer 2 flag) are used.

Figure 32:
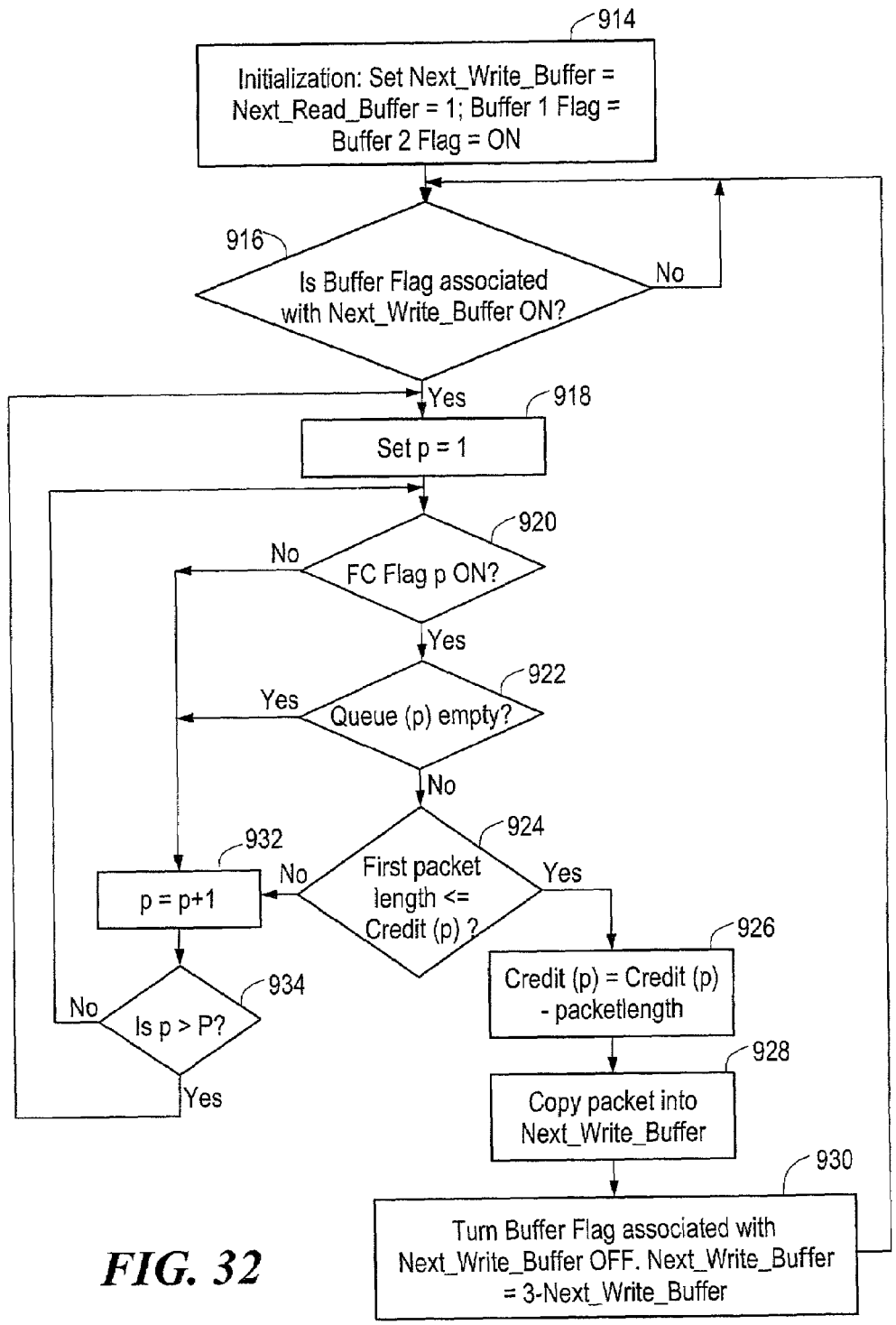
FIG. 32 is a flow diagram of scheduler logic at a network interface unit.
Figure 33:
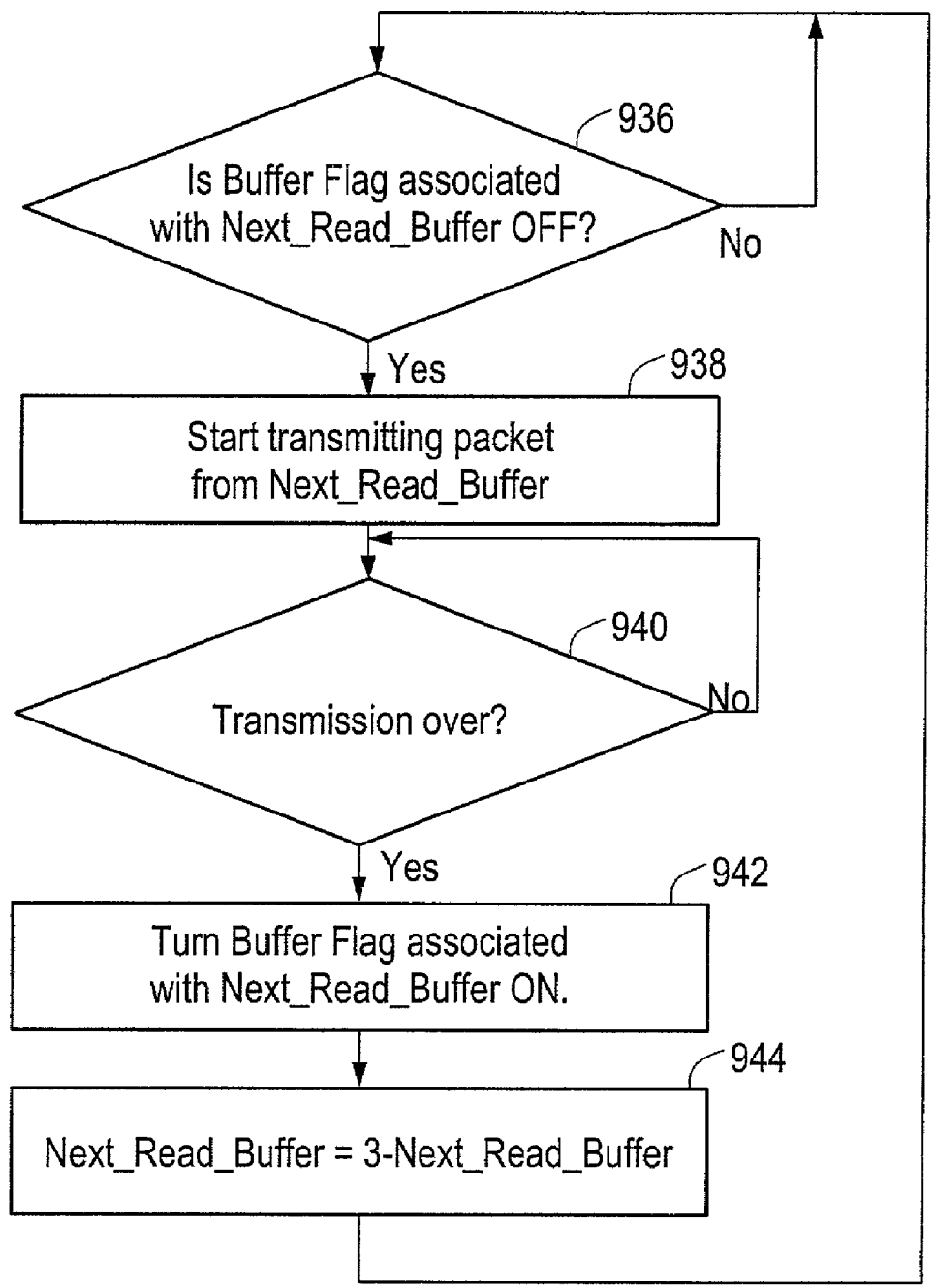
FIG. 33 is a flow diagram of transmitter logic at a network interface unit.

The scheduler alternately uses the two transmit buffers to copy packets which are ready for transmission. However, it cannot copy a packet into a buffer unless the corresponding buffer flag 868 is ON which indicates that the buffer is empty. When the transmitter has copied a packet into a buffer, it turns the buffer flag OFF. The transceiver turns it back ON when it has finished transmitting the corresponding packet so that the transmit buffer is again empty. This logic is clearly indicated by FIGS. 32 and 33. FIG. 32 is a flow diagram that illustrates the scheduler logic and FIG. 33 represents the transceiver logic.

Referring to FIG. 32, the scheduler uses non-preemptive priorities between the QoS classes, with Class 1 at the highest priority level and Class 4 at the lowest. Thus, whenever the scheduler has to make a choice between packets belonging to two different QoS classes, both of which are ready for transmission (i.e., the corresponding token buckets have enough credit to accommodate the length of those packets and the corresponding FC flags 864 (FIG. 30) are ON), the scheduler selects for transmission the packet belonging to the higher priority class. The packet selected for transmission is copied into the transmit buffer indicated by the value of the Next_Write_Buffer provided the corresponding buffer flag 868 is ON. When the scheduler copies a packet into a transmit buffer, it decrements the accumulated credit, the variable credit[p], for the corresponding token bucket by the length of the copied packet. The variable credit[p] is the same as the variable X in the foregoing equations.

Note that if the buffer flag corresponding to the Next_Write_Buffer is OFF, the scheduler has to wait until it is turned back ON. However, once a packet has been selected for transmission and the scheduler starts copying it into a transmit buffer, it does not interrupt this process to handle a higher priority packet which may have become ready for transmission in the meantime. Thus, after finishing copying a packet into a transmit buffer, the scheduler scans the input queues going from the highest priority queue to the lowest priority queue to see which is the highest priority packet waiting at the head of its queue which is ready for transmission.

The scheduler logic begins with initialization of the parameters, including setting Next_Write_Buffer=Next_Read_Buffer=1, and setting Buffer Flag 1 and Buffer Flag 2 to ON at 914. At 916, the scheduler checks whether the buffer flag associated with the buffer indicated by the value of Next_Write_Buffer is set ON. If the buffer flag is OFF, the scheduler waits and tries again. If the buffer flag is ON, the scheduler begins at the highest priority (p=1) at 918 and checks whether the FC flag for the corresponding queue is ON at 920. If the FC flag is OFF, the scheduler increments the priority counter at 932. If the FC flag is ON, the scheduler checks at 922 whether the corresponding queue is empty. If the queue is empty, or if the FC flag is OFF, the priority counter is incremented. If the queue is not empty, the scheduler checks at 924 whether the token bucket for that queue has enough credits. If there are enough credits, at 926 the credits are decremented by the packet length and the packet is copied into the buffer indicated by Next_Write_Buffer at 928. At 930 the buffer flag associated with the buffer indicated by Next_Write_Buffer is turned OFF.

The transceiver logic is illustrated in the flow diagram of FIG. 33. The transceiver transmits packets in the order in which the scheduler 866 has copied them into the transmit buffers 870 (FIG. 30). The transceiver maintains a pointer Next_Read_Buffer that is initially synchronized with the pointer Next_Write_Buffer maintained by the scheduler. After the corresponding buffer flag has been turned OFF by the scheduler at 936, the transceiver starts transmitting the contents of the buffer pointed to by Next_Read_Buffer at 938. Note that when the buffer flag is OFF it means that the corresponding transmit buffer has a packet that is ready for transmission. After checking that transmission of the contents of the buffer has been completed at 940, the buffer flag associated with that transmit buffer is turned ON at 942. At 944 the transceiver changes the Next_Read_Buffer to point it to the other transmit buffer and returns to 936 to wait until the corresponding buffer flag is turned OFF.

Note that the transceiver operates completely oblivious to the FC flags 864 (FIG. 30) sent by the SAS and maintained by the NIU. If there is a packet in the transmit buffer pointed to by Next_Read_Buffer and the corresponding buffer flag is OFF, the transceiver transmits that packet regardless of the state of the FC flag maintained by the NIU. It is the responsibility of the scheduler not to copy packets into the transmit buffers if the SAS is not ready to receive them as indicated by the corresponding FC flags.

QoS Features at Intermediate Network Elements

In this section the QoS management features are described that are included at intermediate network elements such as DSs and SASs. Although SASs and DSs are distinct devices, they both include similar features to support QoS management.

The QoS management features at SASs and DSs include upstream packet handling, upstream flow control and downstream packet handling.

Upstream Packet Handling

The upstream packet handling features ensure low latency for the delay sensitive, high priority packets while keeping the overall throughput high and maintaining fairness in the treatment of the traffic belonging to the lowest (UBR) priority class. In order to achieve this objective, an intelligent transmission scheduling discipline is used at the intermediate network elements. This scheduling discipline, which combines priorities with weighted round robin scheduling, provides for low delays for high priority traffic and fairness in the treatment of UBR traffic.

Figure 34:
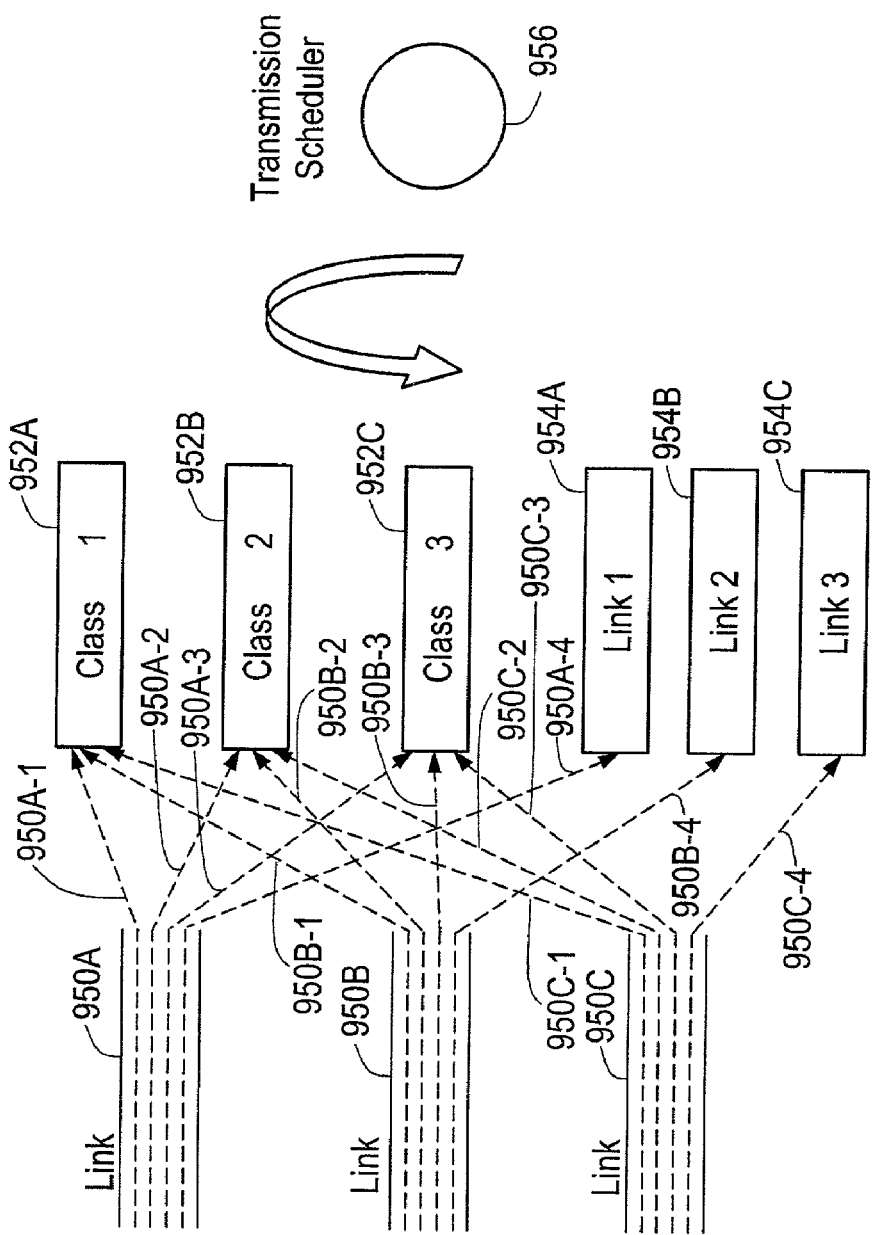
FIG. 34 illustrates traffic queuing at an intermediate network element.

The transmission scheduling discipline for intermediate network elements is defined such that for each such device, each of the top three QoS classes (i.e., Classes 1,2 and 3) have a common queue while there are per link queues for the fourth (UBR) class (i.e., Class 4). Thus, for an intermediate network element that has K links bringing upstream traffic to it, there are 3 common queues at that device—one for each of the top three QoS classes—in addition to K queues (one per link) for the fourth QoS class. FIG. 34 illustrates upstream traffic queuing at an intermediate network element which has K=3 links, the links being denoted 950A, 950B, 950C. Traffic streams of packets on the upstream links 950A, 950B, 950C for the top three QoS classes are queued in corresponding common queues 952A, 952B, 952C. Thus, QoS Class 1 packets of streams 950A-1, 950B-1, 950C-1 are queued in common queue 952A. Likewise, QoS Class 2 packets of streams 950A-2, 950B-2, 950C-2 are queued in common queue 952B and QoS Class 3 packets of streams 950A-3, 950B-3, 950C-3 are queued in common queue 952C. In addition, there are per link queues 954A, 954B, 954C for the Class 4 QoS packets. Thus, packets in stream 950A-4 are queued in link queue 954A, packets in stream 950B-4 are queued in link queue 954B and packets in stream 950C-4 are queued in link queue 954C. Transmission scheduler 956 manages the queues as described further herein.

The transmission scheduling discipline observes strict, non-preemptive priorities between the QoS classes, and uses a weighted round robin discipline to allocate the available system capacity (i.e., trunk bandwidth) in a fair manner to UBR traffic carried by different links. Packets in the same queue follow the FIFO order among them. Moreover, it does not schedule a packet for transmission if the flow control flag for the corresponding QoS class is OFF.

Figure 35A:
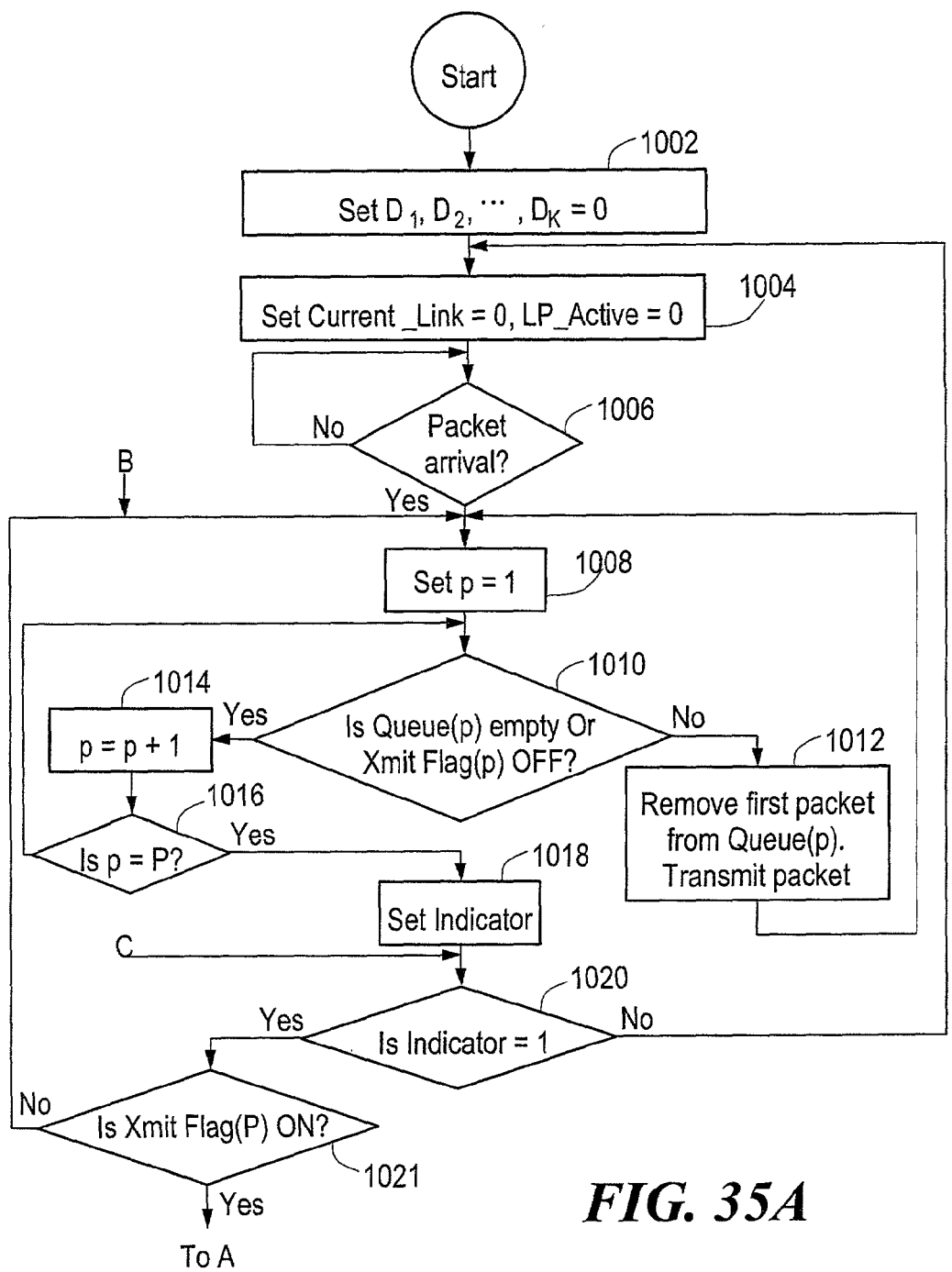
FIGS. 35A, 35B illustrate scheduling logic at an intermediate network element.
Figure 35B:
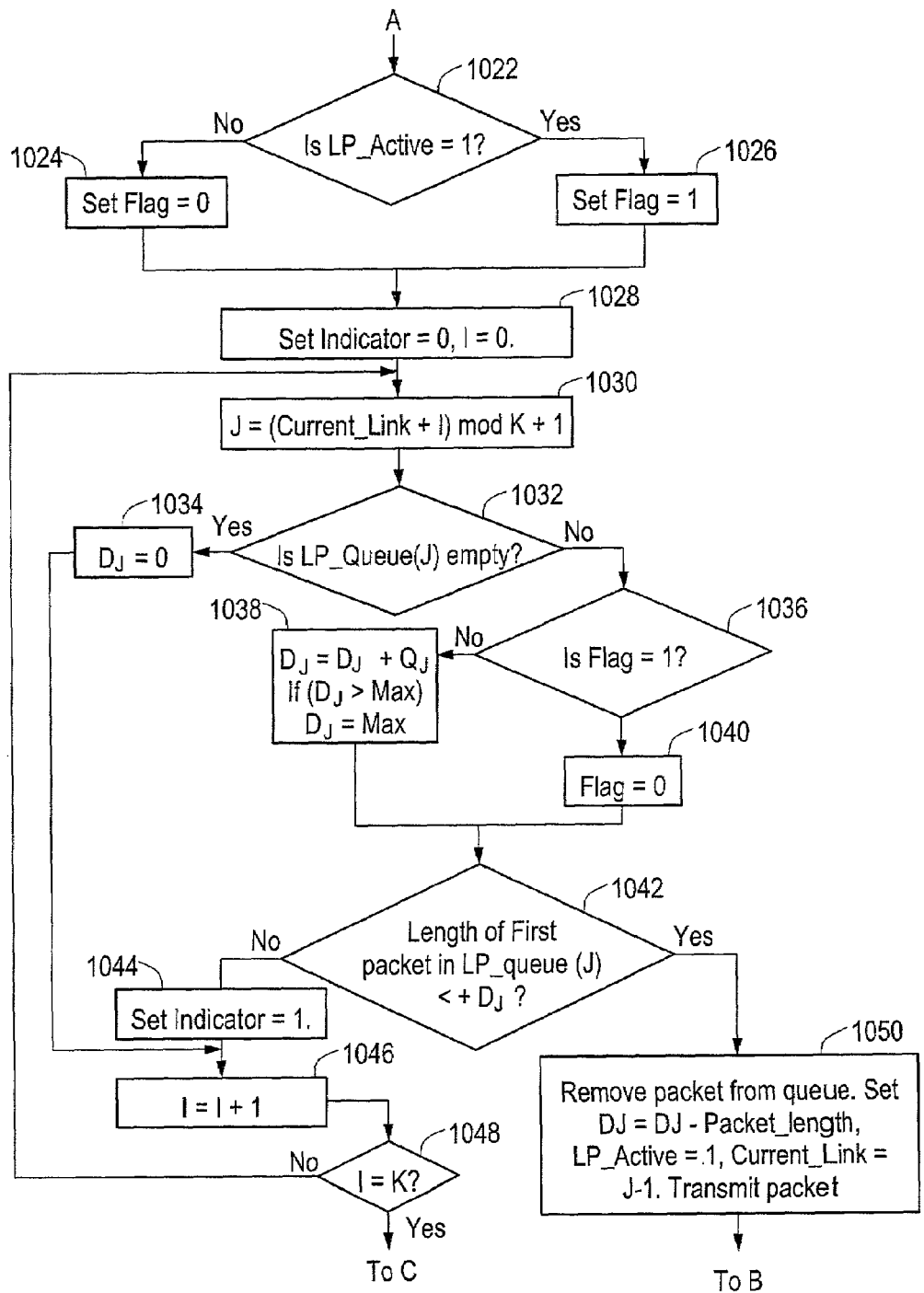

Strict priorities between classes means that if two packets belonging to different QoS classes are ready for transmission in their respective queues and the corresponding flow control flags are on, the scheduler takes up for transmission that packet which belongs to a higher priority class. Thus, after every transmission, the scheduler checks the queues to look for the highest priority packet that is ready for transmission. If the highest priority packet that is ready for transmission belongs to one of the top three QoS classes and if the corresponding flow control flag is ON, the packet is immediately taken up for transmission. If the queues associated with the top three QoS classes are empty, the per-link queues associated with the fourth (UBR) class are inspected for packets awaiting transmission. As mentioned earlier, a weighted round robin discipline is used to schedule transmission of the packets belonging to the fourth QoS class. FIGS. 35A, 35B illustrate the logic used by the scheduling discipline that combines priorities with weighted round robin scheduling. The loop indicated between blocks 1008 and 1012, 1016 (FIG. 35A) relate to servicing of the priority queues for the top three QoS classes. The flow blocks in FIG. 35B relate to servicing of the per-link queues associated with the fourth (UBR) class.

The logic embodied in the flow diagram of FIG. 35B can be summarized as follows. Every link queue associated with the lowest priority QoS class (class P in the notation of the flow diagram) has a service quantum associated with it. The quantum (or weight) associated with link queue J is denoted by $Q_J$. The magnitude of the quantum associated with a link queue is proportional to the share of the available capacity that the scheduler intends to allocate to that queue. In addition, there is a parameter called Max that determines the maximum credit a queue can accumulate. The parameter Max as well as the service quanta associated with different links can be downloaded to the intermediate network elements by the NMS at system setup or provisioning time. A suitable value for the Max parameter is 1600 bytes which is large enough to accommodate the largest sized packets in the system.

A basic weighted round robin discipline is now described to facilitate an understanding of the functioning of the actual service discipline used at intermediate network elements.

In a basic weighted round robin service discipline, the system keeps track of the "credit" accumulated by each queue. The credit associated with link queue J is denoted by $D_J$ in FIGS. 35A, 35B. Whenever the server (the transmission scheduler in this case) moves to serve one of the queues, say link queue J as indicated at block 1028, it increments the credit $D_J$ by the amount $Q_J$ as indicated at block 1038. If $D_J$ is found to be greater than the parameter Max, $D_J$ is set equal to Max. The server then looks at the first packet in link queue J at 1042. If the length of this packet is less than or equal to $D_J$, it decrements $D_J$ by the length of the packet, removes the packet from link queue J and starts transmitting it at 1050. When the packet transmission is over, it looks at the new packet that is now at the head of link queue J to see if its length is less than or equal to the current value of $D_J$ and repeats the process until either link queue J is empty at 1032 or the length of the first packet at the head of queue J is greater than $D_J$. If it is the former, the server sets $D_J$ to zero at 1034, otherwise it leaves $D_J$ unchanged. In either case, the server moves on to the next link queue J+1 at 1030 and repeats what it did at link queue J. In case J corresponds to the last queue, the server moves back to the first queue.

The transmission scheduling discipline works much the same way as the basic weighted round robin discipline. Here, too, when the server moves to one lowest priority (i.e. UBR) queue from another, the accumulated credit for the former is incremented by its service quantum. Also, a packet waiting at the head of a UBR queue cannot be scheduled for transmission unless the accumulated credit for that queue is at least equal to the packet's length when the server comes to that queue. The only difference is the presence of high priority queues that have a non-preemptive priority over the UBR queues. Thus, at the end of every packet transmission, the high priority queues are inspected at 1008, 1010 (FIG. 35A) to see if any of them have a packet ready for transmission. As a consequence, when the server is visiting a UBR queue, the visit can be broken (after a packet transmission) in order to transmit higher priority packets that may have arrived in the mean time. When the server finishes transmitting the high priority packets at 1016, it returns to the same UBR queue it was serving when it had to leave to serve the high priority queues. When this happens, it is considered a continuation of the same visit to the UBR queue so that its credit is not incremented by its service quantum. The UBR queue's credit will be incremented the next time the server returns to it after visiting all other UBR queues. The variable LP_Active in FIGS. 35A, 35B indicates whether the server's visit to a UBR queue was broken to serve high priority queues.

Upstream Flow Control

Upstream flow control is an important QoS management feature that is used at all intermediate network elements. Upstream flow control is used since the total rate at which different trunks or feeders can bring traffic to an intermediate element can far exceed the rate at which this traffic can be carried further upstream. Since the total rate at which the traffic can converge to a DS can be several Gbps, to address this problem by providing a large enough buffer space is impractical. Flow control provides a better approach. Upstream flow control in DSs and SASs is now described.

As described earlier and shown in FIG. 34, each network element (a DS or a SAS) has one common queue for each of the top three QoS classes and per link queues (i.e. one for each link) for the UBR class. Each queue has a separate (and fixed) allocation of the buffer space set aside for the upstream traffic. The network element keeps track of the buffer occupancy and maintains a flag for each of these queues. It also has two parameters—a high threshold $TH_H$ and a low threshold $TH_L$—for each queue. The parameters—buffer space allocation, high and low thresholds—are downloaded at system setup time. The flag values for all queues are initialized to ON (i.e. set to 1).

Figure 36:
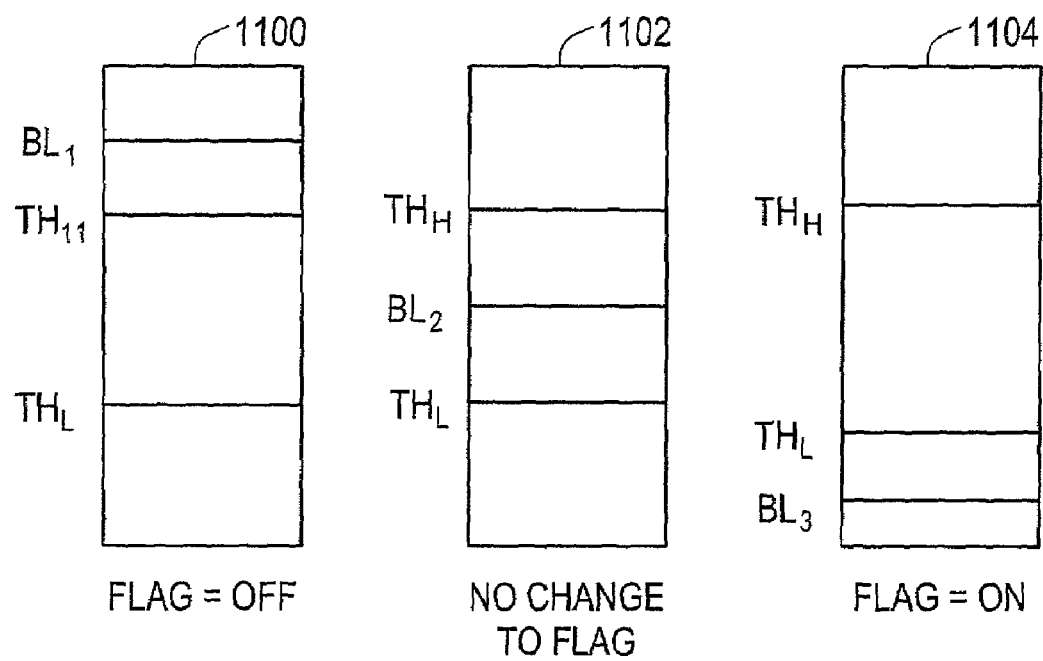
FIG. 36 illustrates flow control thresholding at an intermediate network element.

The flags are turned ON and OFF in an asynchronous manner at packet arrivals and departures. When a packet arrives at the network element, the element ensures that it has adequate buffer space in the appropriate queue to accommodate the packet. If the queue has insufficient space, the packet is dropped. Otherwise it is filed in the queue. The network element also updates the buffer occupancy for the queue if the packet is admitted. If the buffer occupancy exceeds the high threshold for that queue, the corresponding flag is turned OFF (=0) as indicated by buffer level BL1 for buffer 1100 in FIG. 36. Buffer occupancy for a queue is also updated after a packet has been removed from it after its transmission further upstream. If the buffer occupancy for the queue is found to be below the corresponding low threshold, the flag for that queue is turned ON (=1) as indicated by buffer level BL3 for buffer 1104. The flag does not change for a buffer level BL2 between the high and low thresholds as shown for buffer 1102.

The network element (e.g., A) periodically sends the current values of the relevant flags to all of the network elements that are directly connected to it in the downstream direction. Thus, the element A will send to element B (which is directly connected to the former in the downstream direction) the current values of the flags associated with the top three priority queues as well as the current value of the flag associated with the queue meant for UBR traffic received by element A from element B. The flag values are sent to element B using the special "flow control" bits periodically inserted into the byte stream as described earlier.

Each network element (DSs, SASs and NIUs) maintains four flags—one corresponding to each of the four QoS classes—for the traffic that it sends upstream. The flag values are updated when the element receives the flow control byte from the element directly connected to it in the upstream direction. Thus, when element B receives a flow control byte from element A, the former updates the values of the flags it maintains for the four QoS classes. A network element can transmit (in the upstream direction) a packet belonging to a given QoS class only if the current flag value for that class is 1. Thus element B can transmit a packet belonging to, say Class p, only if the current value of the flag associated Class p is 1. Otherwise, regardless of the priority level of the packet, it must be held up at element B until the flag value for Class p changes back to 1. Note that if a packet belonging to Class p is already being transmitted when element B receives a flow control byte which results in the flag for Class p being turned OFF, element B will continue to transmit the packet (i.e. it will not abort the transmission). However, if there is another packet belonging to Class p that is also awaiting transmission at element B, it will not be taken up for transmission until the flag value for Class p is changed back to ON. Note that if the flag value for a higher priority class is OFF while that for a lower priority class is ON, the device can send lower priority packets even if there are higher priority packets awaiting transmission.

Downstream Packet Handling

Downstream packet handling is rather simple when compared to upstream packet handling. In the downstream direction, each outgoing port is allocated a fixed share of the buffer space (equivalent to 2 to 3 MTU). When a packet is received by an intermediate device from its upstream neighbor, the latter looks up the routing table to identify the port the packet should be directed to. If the port has adequate buffer space to accommodate the packet, the packet is copied into the port's transmit buffer where it awaits transmission over the corresponding link. In the downstream direction, packets are handled FIFO regardless of their QoS class.

QoS Features at the Head-end Router

A QoS feature that is included at the Head-End Router relates to rate control and prioritization of traffic belonging to different QoS classes. The rate control is used since there is no flow control and only limited buffering capability within the access network except at the ODS. Consequently, unless the head-end router releases downstream traffic in such a manner that it remains within the capacity of every link that carries it, there could be significant packet losses due to buffer overflows.

A related feature that is used at the head-end router is buffering and prioritization of traffic. In the downstream direction, traffic from various sources accumulates at the router and the sum total bandwidth of the links bringing downstream traffic to the Access Network can easily exceed the bandwidth of the main access trunk. Consequently, the router buffers traffic to avoid potential packet losses. The capability to buffer traffic is complemented by an ability to prioritize traffic according to their QoS class so that high priority traffic does not suffer large delays in case there is a temporary traffic overload.

Connection Admission Control

Connection admission control is an important part of the overall QoS management scheme in the Access Network. Without connection admission control, the network cannot ensure that the system has adequate resources to deliver the desired QoS to the various kinds of connections that are established over the Access Network. Connection Admission control (CAC) is exercised via the Connection Admission Control Server (CAC server) 136 (FIG. 3). The features that are provided at the CAC server in order to exercise connection admission control are now described.

Every non-UBR connection requiring a guaranteed QoS needs to be given a go-ahead by the CAC server before it can be established over the Access Network. The features provided at the CAC server include call agent interface features, provisioning interface features, NIU interface features, CAC server internal features, and signaling features.

Call Agent Interface Features

Typically, most applications requiring a high QoS such as guaranteed throughput at a certain level and some limit on packet delays involve signaling between the end-user application and a call agent 140 (FIG. 3) in the service provider network. For instance, a voice over IP (VoIP) call involves signaling between the end-user application or a residential gateway that resides on the customer premises and call server (i.e. a call agent) in the service provider network using SIP, or H.323 or some similar protocol. It is the responsibility of the call agent to ensure that the system has adequate resources to provide the required QoS to the connection being set up. Within the Access Network, which forms the access portion of the end-to-end connection, it is the CAC server 136 (FIG. 3) that keeps track of the system resources that are available at any time. The call agent is completely oblivious to the state of the Access Network, which is likely to be dealing with many such call agents handling connection requests from many kinds of applications. Therefore, the call agent needs to interact with the CAC server to see if the Access Network has adequate resources for the call.

The following protocol and the associated messages are defined to enable a call agent to interact with the CAC server to reserve resources for a connection.

Resource Reservation Protocol

A simple protocol is defined to enable a call agent to interact with the CAC server. This protocol is intended to identify the features that need to be supported by the signaling protocol between the CAC server and call agents. Since the call agents are non-proprietary entities, the actual signaling protocol is that which is supported by the call agents, e.g., MGCP.

Figure 37A:
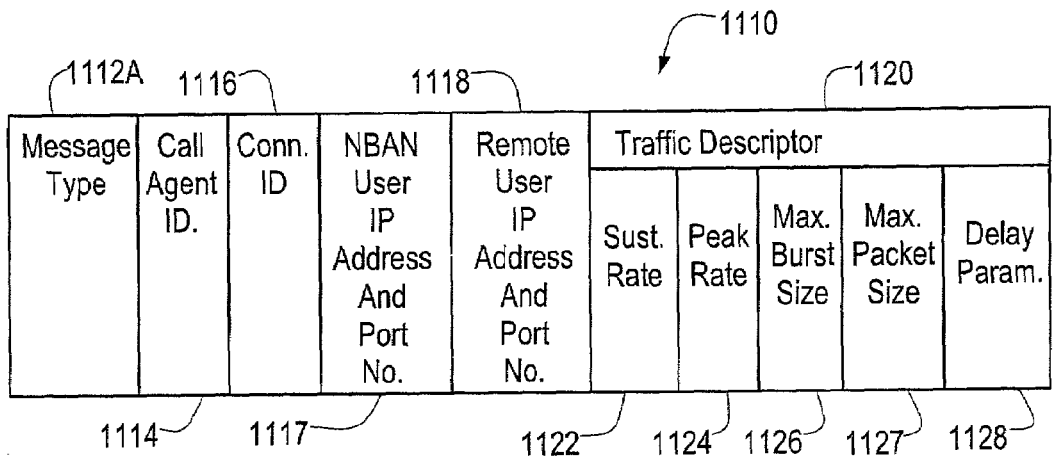

When a call agent wants to reserve resources for a connection, it sends a Resource_Request message to the CAC server as shown in FIG. 37A. All messages in this protocol begin with a message type field 1112 that is one byte long. Besides the message type field, the Resource Request message includes an identifier 1114 of the call agent, an identifier 1116 of the connection for which resources are being requested, the IP address and port number 1117 of the end-user device attached to the Access Network that is involved in that connection, the IP address and port number 1118 of the far end device and a traffic descriptor 1120.

The identifier of the call agent can be its public IP address. The identifier of the call is a four-byte integer that has been selected by the call agent to refer to that connection. The call agent can use this identifier to refer to this connection throughout its lifetime. Within the CAC server the identifier of the call agent and the identifier of the connection are together used to identify the connection so that there is no confusion even if two different call agents used the same connection identifiers to refer to two different connections. The traffic descriptor 1120 contains five fields: the sustained throughput rate 1122 needed for the connection, the peak rate 1124 at which it is likely to transmit data, the maximum burst size 1126 that it can transmit at the peak rate, the maximum packet size 1127 and the delay requirement parameter 1128.

Figure 37B:
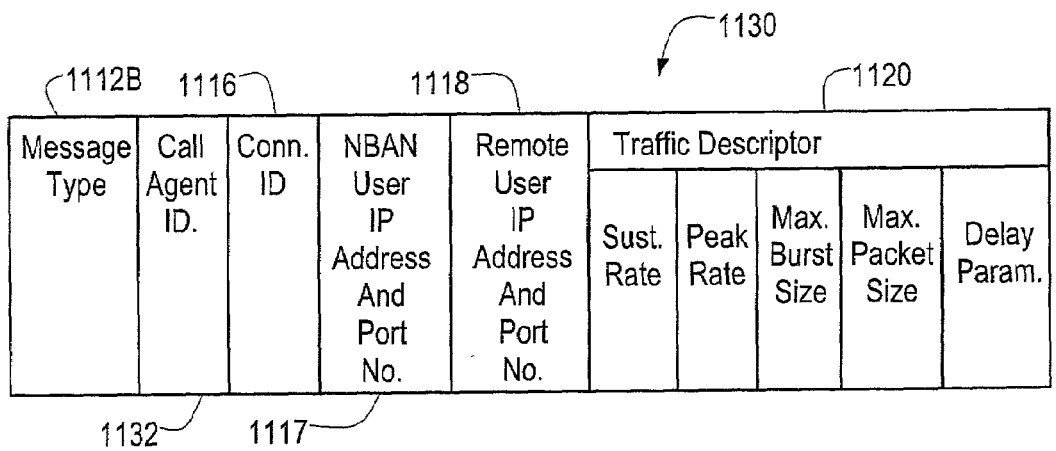
Figure 37C:
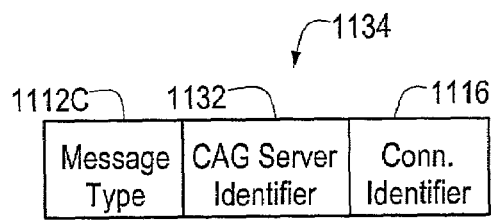

When the CAC server receives a Resource_-Request message 1110, it inspects its internal resource usage database to see if the system has adequate resources to deliver the QoS needed for the connection being established. If the system has adequate resources (according to its internal policies), the CAC server updates its resource usage database to account for the connection being established, and responds to the call agent with a Request_Grant message 1130. If the system does not have adequate resources, the CAC server responds with a Request_Denial message 1134. The formats of these two messages are as shown in FIGS. 37B and 37C respectively. Each includes a CAC Server identifier field 1132.

The Connection Identifier field 1116 used in both Request_Grant and Request_Denial messages is filled with the same connection identifier used by the call agent in the original Resource Request message.

The call agent typically is involved in resource reservation activities with some other entities in the wide area network. If it receives the needed resources from all of these entities, it sends a Resource_Commit message to the CAC server. This message is an indication to the CAC server that the connection has been established. The CAC server responds to the Resource_Commit message with either a Commit_Confirm message or a Release_Confirm message. The former is a confirmation that the resources have been committed to that connection; the latter is an indication that although the resource request received earlier from the call agent was granted by the CAC server, the CAC server now wants to tear down the connection. In the former case, the end-users involved in the call can proceed to exchange data. In the latter case, the call agent can tear down the connection by sending appropriate messages to the end-users. The formats of the Resource_Commit 1136, Commit_Confirm 1138 and Release_Confirm 1140 messages are as shown in FIGS. 37D, 37E and 37F respectively.

In the case of a call that has been established via the procedure described above, when an end-user indicates to the call agent that the connection should now be terminated, the call agent sends a Resource_Release message 1142 to the CAC server. The CAC server then releases the resources committed for that connection, updates its resource usage database and sends Release_Confirm message to the call agent. The format of the Resource_Release message is as shown in FIG. 37G.

Figure 38:
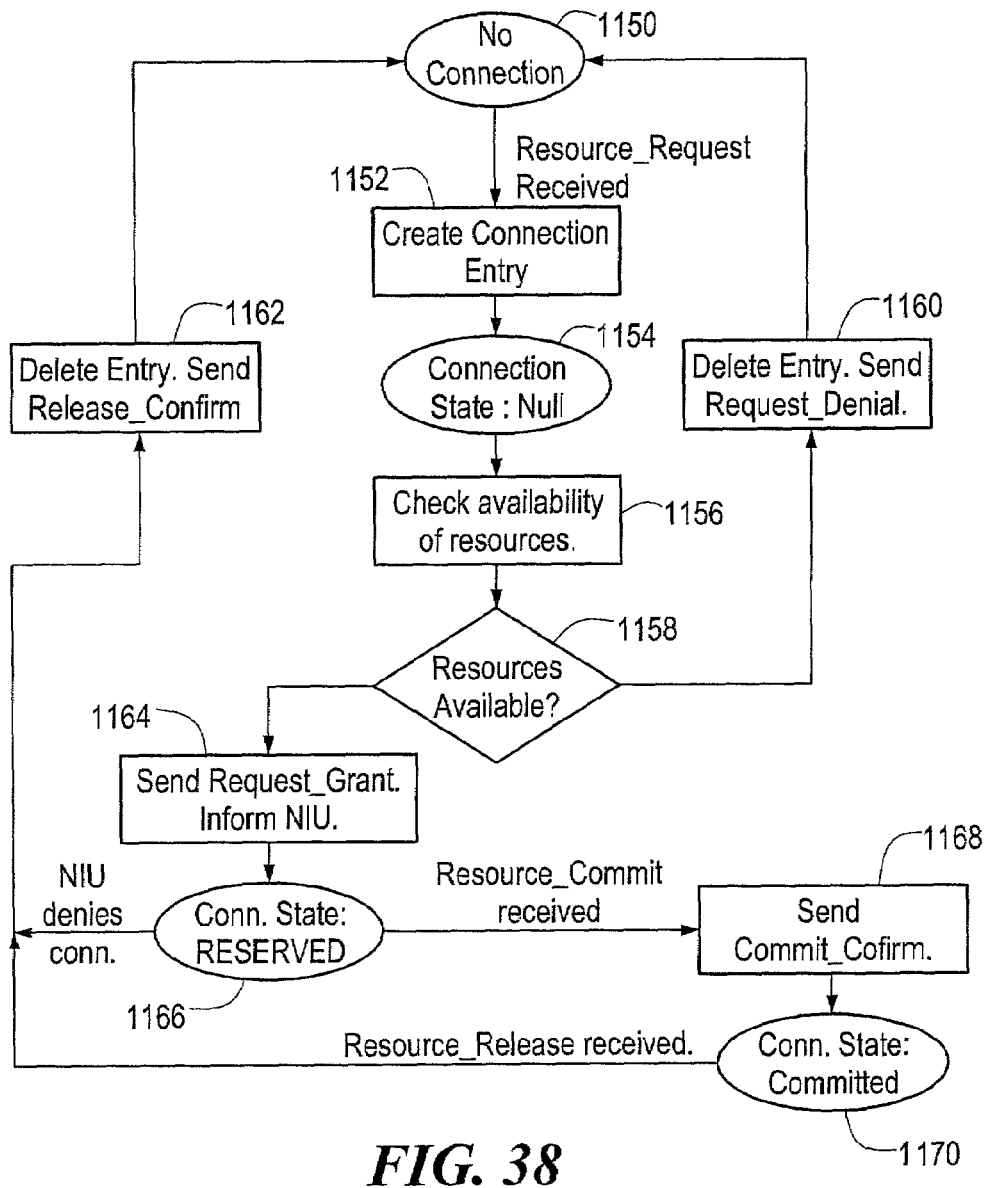
FIG. 38 illustrates a state diagram of CAC server logic for keeping track of changes in the state of a connection and corresponding CAC server actions.

The state diagram of the CAC server logic for keeping track of changes in the state of a connection and the corresponding CAC server actions is as shown in FIG. 38. The connection states include no connection 1150, NULL state 1154, RESERVED state 1166 and committed state 1170.

A similar resource reservation protocol can be used between the Provisioning Server 135 (FIG. 3) and the CAC Server in order to enable the former to establish provisioned services. The messages and protocol state transitions in this case can be similar to the messages and state transitions described for the call agent above. However, the format of the messages in this case are more flexible to accommodate the variety of service options and packet classifier information needed to support provisioned services. For example, to support communication between the Provisioning Server and the CAC Server, an exemplary message format for Resource_Request and Resource_Commit Messages for Provisioned Services can include the following fields: Message type, Provisioning Server ID, NIU ID, Provisioned Service ID, Service type, Traffic Descriptor, Packet Classifier Information and Service specific options. Likewise, Request_Grant and Commit_Confirm Messages for Provisioned Services can include the following fields: Message type, CAC Server ID, NIU ID, Provisioned Service ID, Service type, Traffic Descriptor, Packet Classifier Information and Service specific options. Request_Denial and Release_Confirm Messages for Provisioned Services include the fields Message type, CAC Server ID and Provisioned Service ID. A Resource_Release Message for Provisioned Services includes Message type, Provisioning Server ID and Provisioned Service ID fields.

In the messages defined above for supporting communication between the Provisioning Server and the CAC Server, the interpretation and structure of the field Traffic Descriptor is the same as that defined for the corresponding messages between Call Agents and the CAC Server. The NIU ID is an identifier of the NIU at which the service is being provisioned. It should be unique among all the NIUs being handled by the CAC server and the provisioning server. One possibility is to use the MAC address of an NIU as its identifier. The interpretation and structure of the fields Service Type, Packet Classifier Information and Service Specific Options are described further herein.

NIU Interface Features

The following is a description of the messages that flow between the CAC server and the NIU. The messages enable the CAC server to inform the NIU about the setting up, tearing down and modification of connections and provisioned services, and help it to update the filtering (i.e. packet classification) and ingress traffic policing parameters. An assumption here is that the CAC server merely informs the NIU about the traffic characteristics of a new connection being established; the NIU locally carries out the token bucket and buffer size computations.

The messages involved in the interaction between the CAC server and the NIU include Setup Message, Request-Confirmed Message, Request-Denied Message, Teardown Message, Modify-Parameters Message, Get-Parameters Message and Conn-Parameters Message.

Figure 39:
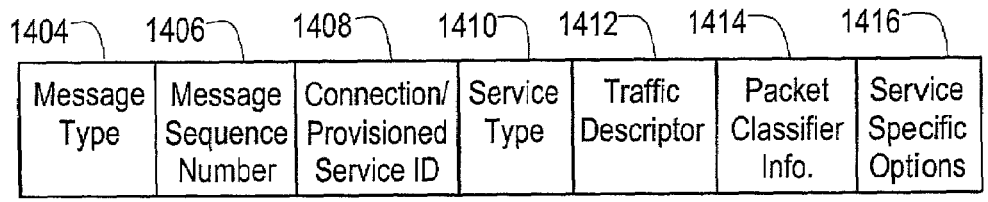
FIG. 39 illustrates a setup message format.

The Setup message is used to inform an NIU about the establishment of a new connection or a provisioned service. When a new connection is being established between a subscriber application that accesses the Access Network through a given NIU and some remote end-point, or when a new provisioned service is being established for subscriber devices connected to the NIU, the CAC server (after receiving a resource request from the concerned call agent or provisioning server and determining that the Access Network has adequate resources to handle the connection) sends a Setup message to the NIU. The Setup message has the high-level structure shown in FIG. 39 and includes the following fields: MessageType 1404, MessageSequence Number 1406, Connection/Provisioned Service ID 1408, ServiceType 1410, TrafficDescriptor 1412, Packet Classifier Information 1414 and Service Specific Options 1416.

The structure of the Setup message identifies the information it needs to carry. The field Message Type identifies this message as a Setup message. The Message Sequence Number field is used to identify copies of the same message in case multiple copies of the same message are received by the NIU. This could happen, for instance, if the NIU's response to a Setup message is lost so that the CAC server, believing that the original message may not have reached the NIU, retransmits it. However, when such retransmissions occur, the CAC server uses the same Message Sequence Number in the retransmitted message which enables the NIU to identify it as a copy of the original message (in case that message was received by the NIU.)

The Connection/Provisioned Service Identifier provides an ID associated with the connection or provisioned service. This can be a concatenation of the call agent ID and the connection ID provided by the call agent. This identifier is assigned to the connection/provisioned service by the CAC server at setup time and used by it and the NIU to refer to the connection/provisioned service throughout its life.

The next high-level field is Service Type. This field identifies the service associated with the connection/provisioned service. The service in this context refers to the kind of processing a packet undergoes at the NIU. If the service type is 0, it indicates the default service, which involves attaching an Access Network label to the packet with the QoS field filled in accordance with the QoS class associated with the packet and recomputation of its Ethernet checksum. (Typically, all switched connections, which are set up through some interaction between a call agent and the CAC server, use the default service type.) All services requiring special handling of packets (e.g. L2TP, Ethernet over IP, VLAN based VPN services) have a distinct Service Type associated with them.

Figure 40A:
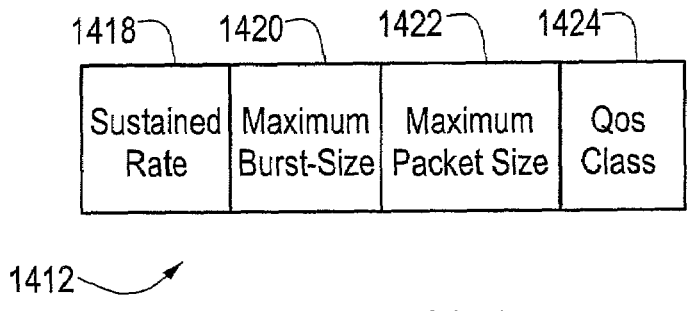
FIGS. 40A–40C illustrate subfields for the setup message of FIG. 39.

The Traffic Descriptor field comes next. This field consists of four subfields as shown in FIG. 40A. The traffic descriptor field includes subfields for sustained rate 1418, maximum burst-size 1420, maximum packet size 1422 and QoS class 1424. The subfield Sustained Rate refers to the bit rate at which the corresponding connection or provisioned service can transmit data in a sustained manner. The Maximum Burst-Size subfield refers to the maximum burst length for which the connection/provisioned service can deliver data to the Access Network at line rate. The parameters, Sustained Rate and Maximum Burst-Size, are used by the NIU to setup a token bucket based policing scheme for the connection/provisioned service. The Maximum Packet Size places a restriction on the size of packets the connection/provisioned service can generate. Finally, the QoS Class refers to the priority class associated with the connection.

Figure 40B:
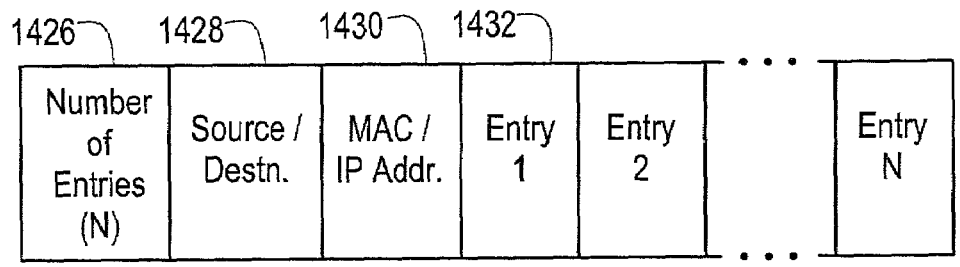

The next high-level field is the Packet Classifier field. The information contained in this field enables the NIU to identify packets that belong to the connection/provisioned service being established. For a simple connection, the packet classifier could be as simple as the source IP address and port ID. However, in the case of a provisioned service, packets originating from several designated devices may have to be identified as belonging to the same service. Future services and applications may require even greater flexibility in defining the characteristics to be used in packet classification. Consequently, a flexible structure has been defined for the Packet Classifier field. FIG. 40B shows this structure which includes three fixed subfields (with fixed lengths), followed by a variable number of "Entry" fields. The Packet Classifier field begins with the "Number of Entries" subfield 1426, which indicates how many Entry fields have been included in it. The next (fixed) subfield is the Source/Destination subfield 1428. It indicates if each Entry field contains source address(es) or destination address(es) or both. If the value contained in this field is 1, it means the entry fields contain source addresses; if it is 2, it means that the entry fields contain destination addresses; and if it is 3, then the entry fields contain source and destination addresses. The third fixed subfield is the MAC/IP Address subfield 1430. If the value contained in this field is 1, it means that the entry fields contain MAC addresses; if it is 2, it means that entry fields contain IP address-Port ID pairs; and if it is 3, it means that the entry fields contain both MAC addresses and IP address-Port ID pairs. Thus, the Packet Classifier field enables the NIU to identify packets belonging to a given connection or service on the basis of source/destination MAC addresses, IP address—Port ID pairs or a combination thereof. It also allows wildcards, which match with any value contained in the corresponding field.

Table 17 lists all the possible combinations of values contained in the Source/Destination and MAC/IP address subfields and the corresponding contents of the entry subfields. Note that there are as many of these entry subfields as the value specified in the Number of Entries subfield.

TABLE 17

Relationship between Source/Destination, MAC/IP Address fields and Entry fields

| Source/Destination | MAC/IP Address | Contents of Entry Subfields |
|---|---|---|
| 1 | 1 | Source MAC address |
| 1 | 2 | Source IP address-Port ID |
| 1 | 3 | Source MAC address, Source IP address-Port ID |
| 2 | 1 | Destination MAC address |
| 2 | 2 | Destination IP address-Port ID |
| 2 | 3 | Destination MAC address, Destination IP address-Port ID |

TABLE 17-continued

Relationship between Source/Destination, MAC/IP Address fields and Entry fields

| Source/Destination | MAC/IP Address | Contents of Entry Subfields |
|---|---|---|
| 3 | 1 | Source MAC, Destination MAC address |
| 3 | 2 | Source IP address-Port ID, Destination IP address-Port ID |
| 3 | 3 | Source MAC address, Source IP address-Port ID, Destination MAC address, Destination IP address-Port ID |

It is clear from Table 17 that it is not just the number of entries in the Packet Classifier field that is variable; the size of each entry also varies depending on the contents of the Source/Destination and MAC/IP address fields.

Figure 40C:
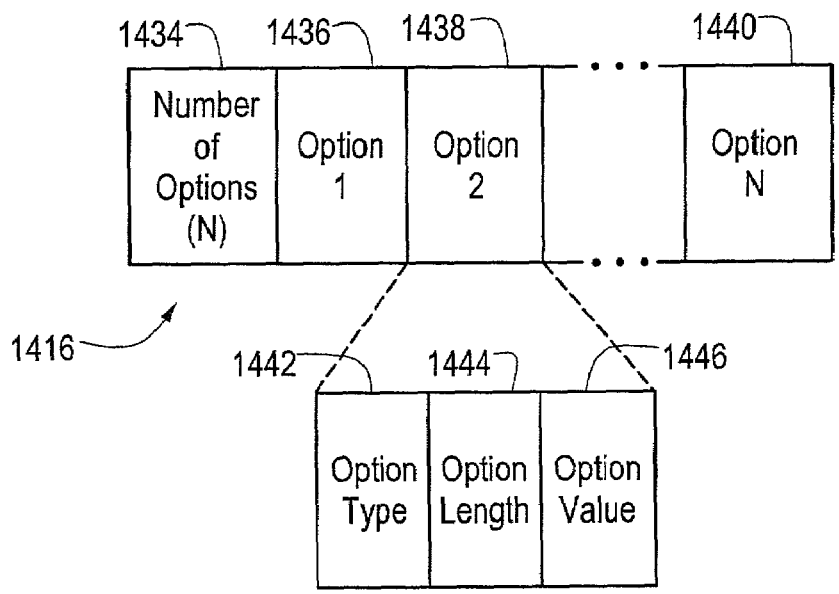

The last high-level field of the Setup message is the Service Specific Options field. The structure of the Service Specific Options field is as shown in FIG. 40C.

The Service Specific Options field begins with a "Number of Options" subfield 1434. The value contained in this field indicates how many Option entries 1436, . . . , 1440 follow. Each Option entry has the "Type-Length-Value" structure 1442, 1444, 1446. The significance of Option Type depends on the Service Type defined earlier. For instance, if the Service Type indicates a VPN service based on VLAN tagging, then Option Type 1 could mean that the contents of the corresponding Option Value field indicate the VLAN tag to be used. On the other hand, for some other service type, Option Type 1 could possibly mean something entirely different.

Figure 41:
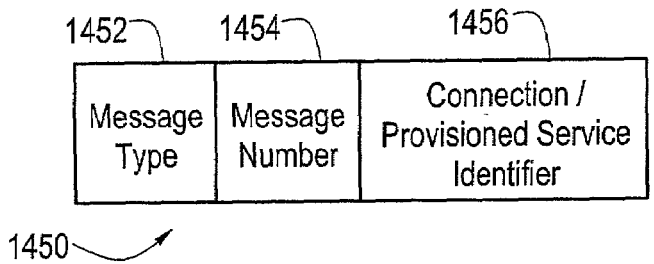
FIG. 41 illustrates a message format for request, teardown and get parameters.

An NIU can respond to a Setup message with either a Request-Confirmed or a Request-Denied message. Both acknowledge receipt of the corresponding Setup message to the CAC server. In addition, the Request-Confirmed message informs the CAC server that the NIU is going ahead with allocating its own resources to the connection (or provisioned service as the case may be), whereas the Request-Denied message tells the CAC server that the connection/provisioned service cannot be established. Both messages have identical formats as shown in FIG. 41; they differ only in the Message Type field 1452, which tells whether it is a Request-Confirmed or Request-Denied message. The Message-Number field 1454 contains the value stored in the corresponding field of the Setup message in response to which the present Request-Confirmed or Request-Denied message is being sent. This helps the CAC server to relate the response to the correct request. A Connection/Provisioned Service Identifier field 1456 is also included.

During connection teardown, the call agent informs the CAC server that the connection is being torn down. (In the case of a provisioned service, the teardown request would come from the Provisioning Server.) The CAC server, after releasing the network resources allocated to the connection/provisioned service, sends a Teardown message to the concerned NIU. The NIU responds to the CAC server with a Request-Confirmed message and releases its local resources. The Teardown message can include a "wildcard" for the connection identifier parameter. In this case, the CAC server is requesting the NIU to tear down all of the connections/provisioned services it has established. The NIU then releases resources allocated to all connections/provisioned services and sends a Request-Confirmed message to the CAC server. The Teardown message has a structure similar to that of Request-Confirmed and Request-Denied messages. The message type field identifies the type of message being sent.

Figure 42:
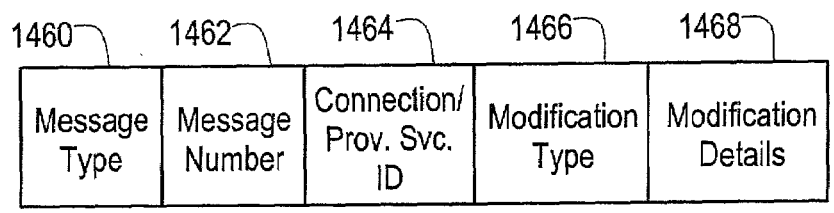
FIG. 42 illustrates a message format for a modify parameters message.

The Modify-Parameters message (FIG. 42) is used by the CAC server to request the NIU to modify the parameters associated with a connection or a provisioned service. Modification of parameters in this case involves changing the traffic descriptor, packet classifier or service specific options field for a connection or a provisioned service. Such a change could be occasioned by a need to change the bit rate or QoS class associated with a connection or a provisioned service (impact on the traffic descriptor field), or adding or deleting end-user devices using a given provisioned service (impact on the packet classifier field), or changing a specific service option being used by a provisioned service (impact on the service specific options field.) The Modify-Parameters message has been designed to enable the CAC server to handle all of these possibilities. The Modify-Parameters message includes fields: MessageType 1460, Message Number 1462, Connection/Provisioned Service ID 1464, Modification Type 1466, Modification Details 1468.

The Message Type field 1460 identifies this message as a Modify-Parameters message, whereas the contents of the Message Number and Connection/Provisioned Service ID fields have the same meaning as the corresponding fields in the Setup message. The field Modification Type 1466 specifies the kind of change the CAC server wishes to make to the connection or provisioned service identified in the Connection/Provisioned Service ID field 1464. Table 18 gives the relationship between the contents of the Modification Type field and the corresponding parameter modification being sought.

TABLE 18

Relationship between the Value of the Modification Type Field and the Corresponding Action

| Modification Type | Action |
| --- | --- |
| 1 | Add one or more entries to packet classifier |
| 2 | Delete one or more entries from packet classifier |
| 3 | Change traffic descriptor |
| 4 | Add or change one or more service options |
| 5 | Delete one or more service options |

The contents of the Modification Details field depend on the action being sought by the CAC server (and specified by the value of the Modification Type field.) If the value of Modification Type is 1 or 2 (i.e. adding or deleting packet classifier entries), the Modification Details field appears as shown in FIG. 40B, with the number of entries subfield indicating the number of packet classifier entries being added or deleted. If the value of Modification Type is 3 (i.e. when the traffic descriptor is being changed), the Modification Details field has a structure as shown in FIG. 40A. This field carries the values of the new traffic descriptor parameters. Even if the value of a parameter is not being changed, the corresponding subfield in the Modification Details field will be filled with its current value (which is being left unchanged.) If the value of the Modification Type field is 4 (adding or changing one or more service options) or 5 (deleing one or more service options), the structure of the Modification Details fields is as shown in FIG. 40C, with the number of options subfield carrying the number of options being added or changed (in case Modification Type is 4), or the number of options being deleted (in case Modification Type is 5.)

Adding and changing service options is covered under the same modification type as the preceding discussion shows. If an option included in the Modification Details field (of a Modify-Parameters message) has not already been set up for the corresponding service, it is an "add" action. On the other hand, if an option included in the Modification Details field has already been established (most likely with a different value) for the corresponding service, the modification action is of "change" type.

Note that if the service type associated with a provisioned service is to be changed, one cannot use a Modify-Parameters message. This is because service options associated with a provisioned service depend upon its type so that changing the service type for an instance of provisioned service could lead to possible inconsistencies in the data stored at the NIU. If the service type associated with a service is to be changed, the (old) provisioned service needs to be torn down first, followed by the establishment of a new service with the desired service type. The messages to be used in this case would be Teardown and Setup messages.

Besides the types of messages described above, which are needed during connection setup and teardown phases and for changing connection parameters, the CAC server can send a Get-Parameters message to the NIU to request it to send the parameters associated with a connection. The Get-Parameters message also has a structure similar to that shown in FIG. 41.

When an NIU receives a Get-Parameters message, it inspects its local cache to see if the Connection/Provisioned Service Identifier field in the message matches with any of the connection identifiers that it has set up. If a match is found, the NIU responds with a Conn-Parameters message carrying the parameters associated with the connection. If no match is found, the NIU responds with a Conn-Parameters message indicating that the connection identifier was invalid (i.e. with all of the relevant fields set to 0). In either case, the Conn-Parameters message uses the value contained in the Message Number field of the Get-Parameters message to help the CAC server relate the response (the Conn-Parameters message) to the correct request. The CAC server can send a Get-Parameters message to an NIU with the connection identifier parameter set to a wildcard. In this case, the message indicates a request for parameters associated with all connections established at the NIU. The NIU then responds with a Conn-Parameters message carrying the parameters associated with all the connections established at the NIU. To allow for the desired flexibility in this message, it has the structure shown in FIG. 43 and includes fields: Message Type 1472, Message Number 1474, Total Number of Connections 1476, Number of Connection Parameter Sets In Message (M), 1478, Connection Parameter Sets 1, . . . , M 1480. A Connection Parameter Set includes subfields: Connection/Provisioned Services ID 1482, Service Type 1484, Traffic Descriptor 1486, Packet Classifier 1488, Service Specific Options 1490.

Figure 43:
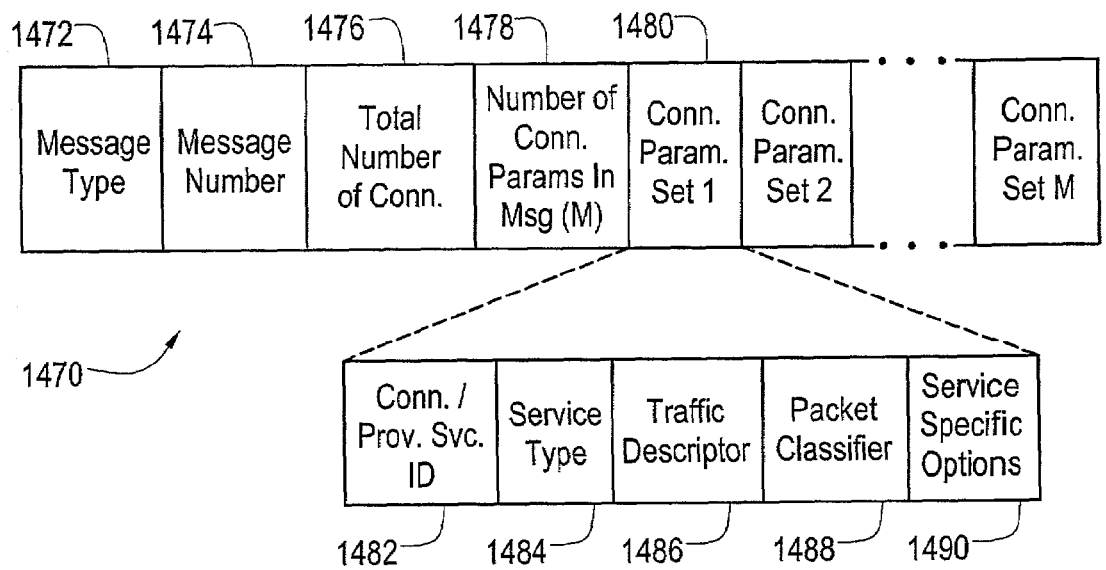
FIG. 43 illustrates a connection parameters message format.

The message format shown in FIG. 43 provides the needed flexibility to allow the NIU to respond to different versions of the Get-Parameters message and also to be able to provide the various pieces of information associated with a connection or a provisioned service that are stored in its local memory. When the Get-Parameters message asks for the parameters of a specific connection identified by its ID, if the NIU has a connection with that identifier, it sends a Conn-Parameters message with the field "Number of Conn.

Parameter Sets in Message" equal to 1, followed by the parameters associated with that connection. If the NIU does not have a connection with the specified identifier, it responds with a Conn-Parameters message where the "Number of Conn. Parameter Sets in Message" field is set to 1, followed by the Connection Parameters field in which the Connection ID is the same as what was specified in the Get-Parameters message, but the rest of the fields are all set to 0. Finally, if the Get-Parameters message uses a wildcard in the Connection Identifier field, the "Number of Connection Parameter Sets in Message" field in the Conn-Parameters response is set equal to the number of connections that have been established at the NIU, followed by that many sets of connection parameters. The field "Total Number of Connections" in all of these cases is set equal to the number of connections/provisioned service instances established at the NIU. The structure of the connection parameter subfields and their contents are similar to those of the corresponding fields in a Setup message.

CAC Server Internal Features

The QoS management features that are internal to the CAC server are now described. These features define what kind of algorithms and data representation and processing capabilities are used at the CAC server to enable it to carry out its primary task of ensuring that the connections established over the Access Network receive the QoS that was promised to them.

When a Resource_Request message is received by the CAC server, it has to see if the critical segments of the Access Network that are likely to become bottlenecks have adequate bandwidth to support the connection at its desired QoS. Thus the CAC server needs some means to identify the critical segments and keep track of their utilization levels. The tree-and-branch topology of the Access Network and the fact that as one traverses the network in the upstream direction the link bandwidth cannot decrease makes it easy to identify the critical segments whose utilization needs to be considered when allowing or disallowing a connection request.

A segment is a portion of a cable that connects a network element to its next upstream neighbor. Because of the constraints on topology and link speeds described above, a critical segment is defined as that portion which brings upstream traffic to an element at a speed which is lower than the speed at which the traffic is going to be carried beyond that element.

The critical segments are a function of topology and can be identified by processing the topological data that is available at the Tag/Topology server of the Access Network.

Figure 44:
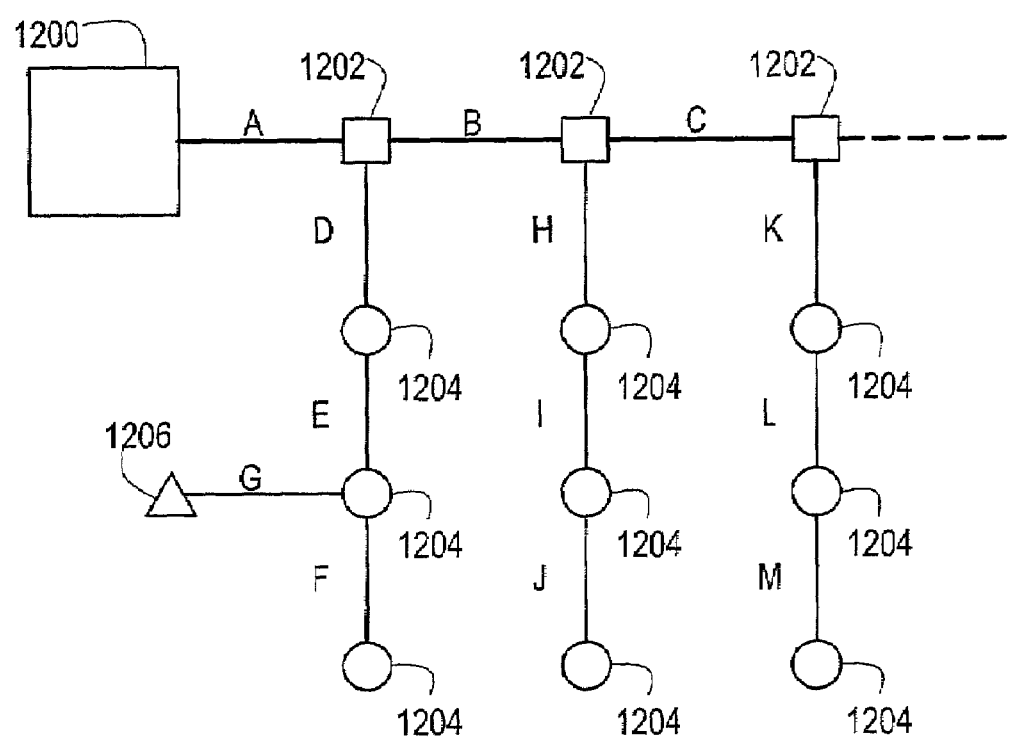
FIG. 44 illustrates an exemplary topology.

An exemplary topology is shown in FIG. 44. The elements include head end router 1200, DSs 1202, SASs 1204 and NIU 1206. Segments A, B, C are higher speed (1 Gbps) than segments D, E, F, G, H, I, J, K, L, M (100 Mbps). It can be seen that segments A, D, H, K are critical segments whereas the remaining segments are not.

CAC Server Data Requirements

The CAC server maintains four sets of data. They are: NIU Data, End User—NIU Mappings, Resource Utilization Data, and Connection Data.

The NIU data identifies for each NIU the critical segments through which data injected into the Access Network by that NIU would traverse. This data is of the form shown in Table 19:

TABLE 19

Structure of NIU Data

| | | |
|---|---|---|
| $NIU_1$ | ( | $Segment_{1,1}$ |
| | | $Segment_{1,2}$ |
| | | . |
| | | . |
| | | . |
| | | $Segment_{1,m}$ |
| $NIU_2$ | ( | $Segment_{2,1}$ |
| | | $Segment_{2,2}$ |
| | | . |
| | | . |
| | | . |
| | | $Segment_{2,n}$ |

In Table 19 above, it is assumed that $Segment_{1,1}, \ldots, Segment_{1,m}$ are the critical segments through which data entering the Access Network via $NIU_1$ would pass. Thus, for the NIU 1206 shown in FIG. 44, the NIU data identifies segments A and D as the critical segments associated with that NIU. The NIU data can easily be gleaned from the topological data received from the Tag/Topology server. This data can be set up at the time of system set up and refreshed periodically.

End User—NIU mappings are similar to the ARP caches maintained by edge routers and are maintained by the CAC server in a similar manner. These mappings contain the association between end user IP addresses and the identifiers of the corresponding NIU through which data destined for that end user needs to pass. Since these associations need to be learned in the same way ARP caches are built, the CAC server implements an ARP-like protocol in order to learn these mappings as described herein.

Resource utilization data stores the utilization state for each of the critical segments. The parameters needed to define the utilization state of a critical segment depend on the connection admission control algorithm used to decide whether a connection request is to be granted. In a scenario, the connection admission control algorithm accepts or denies a connection request on the basis of the total bandwidth utilization due to the top three QoS classes to be supported on the Access Network. In this case, the utilization state of a critical segment is the three-tuple $(U_1, U_2, U_3)$ where the numbers $U_1, U_2, U_3$ respectively denote the total bandwidth utilization due to the three QoS classes on that critical segment.

Connection data represents the information stored by the CAC server for each of the connections/provisioned services set up on the portion of the Access Network being controlled by the CAC server. This information enables the CAC server to respond to call agent (or provisioning server) messages involving these connections and identify the resources being used by each of them so that when one of them is terminated, the CAC server can release the resources that were set aside for that connection and update the utilization state of the critical segments involved in that connection. For each connection, the connection data maintained in the CAC server includes the following fields: call agent/provisioning server ID, connection/provisioned service ID, connection state, service type, NIU ID, critical segments list, original traffic descriptor, derived traffic descriptor, packet classifier information and service specific options.

In the connection data, the meanings of the fields call agent/provisioning server ID, and connection/provisioned service ID are clear from the above description of the Resource_Request and other messages received from the call agent/provisioning server. The meanings of the fields NIU ID and critical segment list are also clear. They respectively refer to the NIU through which the connection passes and the list of the critical segments traversed by the connection. The field connection state refers to the state of the connection. This field can take one of three values: NULL, RESERVED and COMMITTED. It is NULL when an entry for the connection is created but resources (on its critical segments) have not been reserved by the CAC server for the use of this connection. When the CAC server reserves resources for the connection on its critical segments and updates the utilization state of these segments, the connection state is changed to RESERVED. When the CAC server receives a Resource_Commit message from the call agent/provisioning server and responds to it with a Commit_Confirm message, it changes the state of the connection to COMMITTED.

The meanings of the fields, Service Type, Packet Classifier Info. and Service Specific Options, are the same as the meanings of the corresponding fields defined earlier as part of the definition of the Setup message sent by the CAC server to the NIU when it wishes to establish a connection or a provisioned service. The structure of these fields is identical to that of their counterparts in the Setup message. The remaining fields, Original Traffic Descriptor and Derived Traffic Descriptor, are now described.

The Original Traffic Descriptor field has five subfields—Sustained Rate, Peak Rate, Maximum Burst Size, Maximum Packet Size and Delay Parameter—which store the values of the corresponding parameters associated with a connection or provisioned service. The CAC Server receives these values from the Call Agents or Provisioning Servers via the Resource_Request and other messages and uses these values while interacting with these agents. The Derived Traffic Descriptor field has four subfields—Sustained Rate, Maximum Burst Size, Maximum Packet Size and QoS Class. The Sustained Rate subfield of the Derived Traffic Descriptor field represents the effective bandwidth associated with that connection or provisioned service. The QoS Class subfield represents the QoS class accorded to the connection/provisioned service by the CAC server. The Maximum Burst Size and Maximum Packet Size subfields have the same interpretation as the corresponding subfields of the Original Traffic Descriptor. The CAC Server determines the effective bandwidth and QoS Class associated with a connection/provisioned service as functions of the various subfields of the Original Traffic Descriptor, and uses the Derived Traffic Descriptor in its messages to the NIU. The Original Traffic Descriptor remains hidden from the NIU.

CAC Server Algorithms

The algorithms that are used at the CAC server are described in relation to the tasks that are performed by these algorithms.

Identification of Critical Segments

This is a basic algorithm that is used to identify critical segments from the raw topology data that the CAC server receives from the Tag/Topology server. The raw topology data received from the Tag/Topology server contains a list of all parent-child pairs and the speed of the link connecting the parent to the child. In this terminology, if two devices are immediate neighbors of one another, the upstream device is considered the parent, and the downstream device its child. Once the critical segments and their associated link speeds are identified, the CAC server can build the resource utilization data for these segments.

Construction of NIU Data

For each NIU, this algorithm identifies the critical segments on the path between the NIU and the head-end. This algorithm has much in common with the algorithm for identification of critical segments so that both of them can be combined.

Algorithm for Maintaining End-User—NIU Mappings

As described above, the CAC server maintains mappings that are similar in nature to the IP Address—MAC Address mappings maintained in an ARP cache. The CAC server uses an algorithm to maintain these mappings in a cache and to obtain new ones that are missing in the cache. If a mapping has not been used for a certain period of time, it will be deleted from the cache to prevent old, out-of-date mappings from misdirecting connections.

Computation of Effective Bandwidth

This is one of the key algorithms to be implemented at the CAC server. When a connection request is received by the CAC server, the latter, using the appropriate mappings, first determines the NIU through which the connection would pass and the critical segments on its path. Next, using the original traffic descriptor associated with the connection request, the CAC server invokes this algorithm to calculate the effective bandwidth associated with this connection. At the same time, using the delay parameter part of the traffic descriptor, the CAC server identifies the QoS class to be assigned to the connection. The effective bandwidth computations take into account the sustained throughput rate and the peak rate and the maximum burst size for the connection. The effective bandwidth of a connection lies between the sustained throughput rate and the peak rate. For a CBR connection, the effective bandwidth is the same as the (constant) bit-rate associated with that connection.

The CAC Server constructs the Derived Traffic Descriptor for a connection after determining its effective bandwidth and QoS Class. As described earlier, the Sustained Rate parameter of a connection's Derived Traffic Descriptor is the same as its effective bandwidth. At the NIU, the shaping parameters associated with the connection, namely the token bucket rate and token bucket size, are computed using the sustained throughput rate and maximum burst size parameters of the connection's derived traffic descriptor. In an embodiment, the Sustained Rate parameter of a connection's Original Traffic Descriptor is used as its effective bandwidth. This eliminates the need for complex algorithms that are typically needed for effective bandwidth computation. Also, with this definition, effective bandwidths become additive, which leads to significant simplification of the admissible region. Another fallout of this simplification is that the Sustained Rate parameters of both the Original and Derived Traffic Descriptors are identical.

Connection Admission Control Algorithm

The connection admission control algorithm of the CAC server is used for determining whether a connection request can be granted or denied based on the current utilization levels of the critical segments of the Access Network. The connection admission control algorithm maintains an "admissible region" for each critical segment. The admissible region for a critical segment can be represented by a region in a three dimensional space where each dimension represents bandwidth utilization on that critical segment due to one of the three top QoS classes. In this representation of the admissible region, the effective bandwidth of a connection is its sustained throughput rate. After the CAC server has identified the critical segments associated with a connection and its effective bandwidth, it uses the latter in conjunction with the existing utilization levels for the top three QoS classes on each of the critical segments to see if admitting the connection would lead to utilization levels outside of the admissible region on any of the critical segments. If the admissible region is violated in this manner on any of a connection's critical regions, the connection request is denied. Otherwise, the connection request is granted.

Algorithm to Maintain Utilization Data

This algorithm updates the utilization data for the critical segments in the Access Network whenever a connection is established or torn down. The term utilization is used in a rather general sense here, and, depending on the effective bandwidth computation being used, may or may not represent true utilization. If sustained throughput rate is used as the effective bandwidth of a connection, the utilization level on critical segment due a given QoS class represents the true bandwidth utilization due to that class on that segment.

CAC Server Signaling Features

The CAC server communicates with three sets of entities: call agents, other servers and network elements. The signaling features implemented at the CAC server enable it to communicate with these entities.

Communication with external entities such as call agents involves traffic flow over the service provider's network which is non-proprietary e.g., standard protocols such as TCP or UDP over IP. Thus, the CAC server implements these protocol stacks to support actual signaling that takes place between it and the call agents. The (higher level) signaling protocol is selected such that it is supported by the call agents interacting with the CAC server. The resource reservation protocol described above is intended to identify the requirements for the messages that need to be exchanged between the call agents and the CAC server for QoS management purposes. The actual protocol used depends upon what is supported by the call agents.

Communication between the CAC server and other servers also takes place via the router so that the basic network and transport layer protocols to be used for this communication can be standard, namely TCP or UDP over IP. The actual signaling protocol that rides on top of this protocol stack can be proprietary.

Communications between the CAC server and network elements also take place via the router so that the TCP or UDP over IP protocol stack can be used for transport.

Associating End Devices with NIUs for Bandwidth Provisioning by the CAC Server

In the Access Network, the NIU is unaware of the user devices hanging off its Home-LAN. Hence, when any device inside the house wishes to initiate a session for the first time, the CAC server is also unaware of the NIU that serves the device. However, this association is important for determining the state of the network for connection admission, provisioning the relevant NIU with QoS and Policing parameters and other actions.

A method of learning the NIU<-->User Device association at the CAC server is now described. When setting up/tearing down a call, the CAC server may be aware of the IP Address of the end-device. If the CAC server is not aware of the NIU that serves this end point, the following sequence of events takes place:

The CAC server sends a DISCOVER_NIU message downstream. This message has the End Device IP Address as Destination IP Address of the IP Packet.

The Router constructs a Layer-2 frame. The Destination MAC Address is the End Device MAC Address.

When this packet enters the Access Network, the ODS looks at the source IP Address, identifies this message as a control message and inserts the appropriate control bits and RID corresponding to the end point.

The packet is routed through the Access Network (based on the RID) and reaches the The NIU recognizes the control bits and processes the packet (even though the Destination MAC and IP Address belong to the End Device).

The frame is parsed and the payload says it is a DISCOVER_NIU message.

The NIU responds with an NIU_IDENTIFY message to the CAC server. This message is addressed directly to the CAC server.

The CAC server adds an entry to its table of End Device IP <_>NIU IP for future use. From then on the CAC server can directly address the NIU for connection admission control related to that end point.

Figure 45:
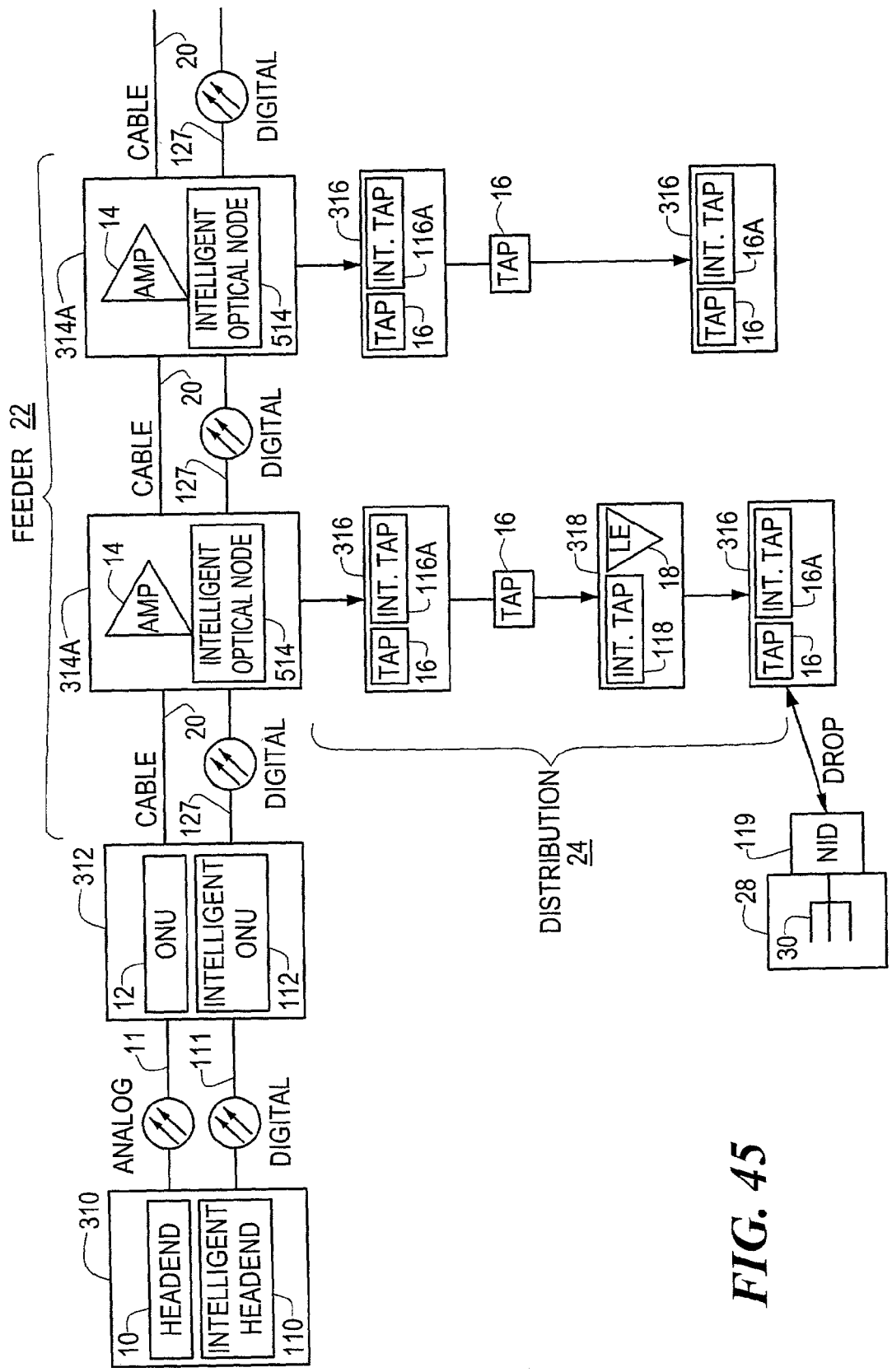
FIG. 45 illustrates a second embodiment of a network configuration of intelligent network elements in accordance with the present invention.

A second embodiment of a network configuration is shown in FIG. 45, wherein digital transmissions associated with the intelligent network devices are carried over separate optical fibers at rates of about 10 Gbps or higher. This approach has the tremendous advantage of providing very high bandwidth (e.g., 100 Mbps) to each customer.

As shown in the configuration of FIG. 45, a separate optical fiber 111 carries digital transmissions between the intelligent headend 110 and the intelligent ONU 112. This configuration also uses optical fiber 127 between the ONU assembly 312 and trunk amplifier assemblies 314A. The trunk amplifier assemblies 314A each include conventional trunk amplifier 14 and an intelligent optical node 514 also referred to as a mini Fiber Node (mFN) described further below. Because of the use of optical fiber in the feeder, the bandwidths can be increased in both the feeder and the distribution. Other embodiments can be deployed which use all fiber cable in the feeder/distribution.

Figure 46:
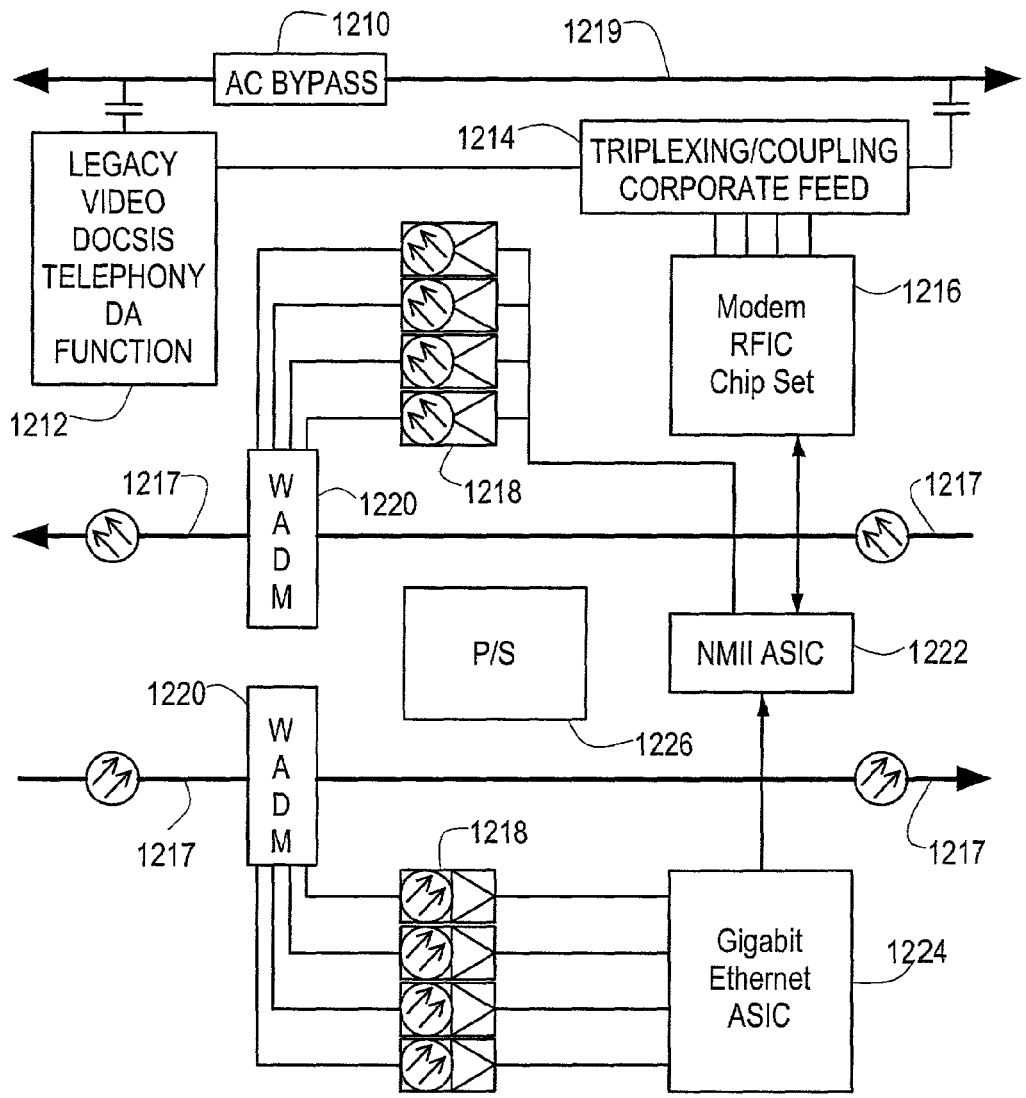
FIG. 46 is a block diagram of a mini fiber node of the network of FIG. 45.

The mFN is shown in FIG. 46 and provides Gigabit Ethernet and legacy services to 100 homes, relays legacy services to 3 additional ports, and facilitates fiber-optic transmission between the headend and successive mFNs. In addition to modem, DWDM, and other RF/photonic functions, the mFN subsumes the function of legacy Video, DOCSIS, and Telephony RF transmission normally performed by the Distribution Amplifier (DA) found in conventional HFC systems. The mFN provides Wavelength Add Drop Multiplexing (WADM) 1220 in both upstream and downstream directions. At the modem subsystem, Ethernet traffic from optical transceivers is combined/separated from legacy HFC RF signals traveling to/from the subscriber. In addition, MAC and QoS operations are performed by an ASIC within the mFN.

The mFN includes 4 external optical connections 1217 and 5 external RF connections. For simplicity, only one of the 4 downstream RF paths 1219 is shown. Optical data flows through WADM structures 1220 in both directions in order to facilitate the adding/dropping of Gigabit Ethernet wavelengths. Optical data signals are detected and passed through a GbE circuit 1224 to a media independent interface (Mil) circuit 1222 and to an RF modem chip-set 1216 for up-conversion and combination with legacy RF at the triplexing/coupling corporate-feed structure 1214. RF data signals are demodulated and passed to the MII 1222, where they are queued and passed to optical transmitters 1218. Downstream legacy RF is decoupled from distribution AC via two blocking capacitors, where it is amplified/equalized and passed to the triplexing/coupling corporate-feed structure 1214 for combination with GbE data traffic. AC power is fed to the local power supply 1226 for conversion and routing to bias circuitry.

Ancillary Legacy/DOCSIS Monitoring, Manageability, and Provisioning Capability Afforded by the Access Network A very powerful aspect of the Access Network of the present system is that it affords many ancillary monitoring, management, auto-configuration, auto-provisioning, and fault recovery features for use in supporting Legacy/DOCSIS parallel offerings to provide addressability and adaptability heretofore unheard of in modem HFC systems. All power level adjustment, slope equalization, and ingress-control functions required by modem HFC plants are completely automated in the present system. This automation is primarily facilitated by the use of addressable attenuators, equalizers, and switches for topology configuration, in conjunction with a comprehensive suite of power monitoring (both RF and DC) and slope measurement capabilities.

The system provides fault tolerance by virtue of its distributed-gain approach. During a legacy system bootstrap operation, legacy amplification is activated only in select network elements in order to optimize analog video performance with respect to noise and linearity constraints. In concert with the activation of gain in select elements, all attenuators are adjusted to provide target RF power levels at every point in the cable plant. Afterward, the attenuators are adaptively controlled as necessary to compensate for temperature variations in amplifiers and coaxial cable plant. In the event that an activated amplifier fails, it can be bypassed, and an adjacent upstream amplifier is activated in its place to rapidly restore an acceptable quality of analog video to all customers downstream from the failure in question. However, those customers that are otherwise serviced by the failed amplifier will experience temporary degradation in signal quality until a technician is sent for repair work. The overall effect of the gain redistribution feature is to drive system availability arbitrarily close to unity.

Slope equalization is initially set during the legacy bootstrap operation and is also adaptively controlled in order to compensate for drift that can occur from temperature variations of the legacy amplifiers. Return-path equalization for ingress control during DOCSIS upstream transmission is initially set during the bootstrap operation using cable loss estimates from within the downstream spectrum, and unless an override option is exercised via CMTS service requests to the EMS, the return-path equalization is adaptively controlled commensurate with downstream adaptations. In addition to the override option associated with return-path equalization settings, the EMS can take complete control of any and all addressable features of the legacy plant portion of the present system. This option is provided primarily for troubleshooting purposes, and typically is not be used under normal operation conditions. Finally, Auto-Provisioning is made possible through the addition of port-deactivation switches at each drop.

During system boot/bypass, all ports are initially active and hard-wired nominal or stored gain/attenuation settings are used for all active components in the legacy path. FLASH memory is also used to store settings for rapid power hit recovery. A functional block diagram of the legacy RF portion was shown above in FIG. 18. Legacy loss equalizer adjustments are based on explicit multi-frequency slope measurements, and legacy gain or attenuator settings are based on multi-channel, analog video average power measurements. Through-path amplifier activation decisions are driven by triple-C performance criteria. Activation of any given amplifier stage is determined from the measurement of input power at the following SAS, and is chosen so as to meet the minimally acceptable CNR criterion.

Figure 47:
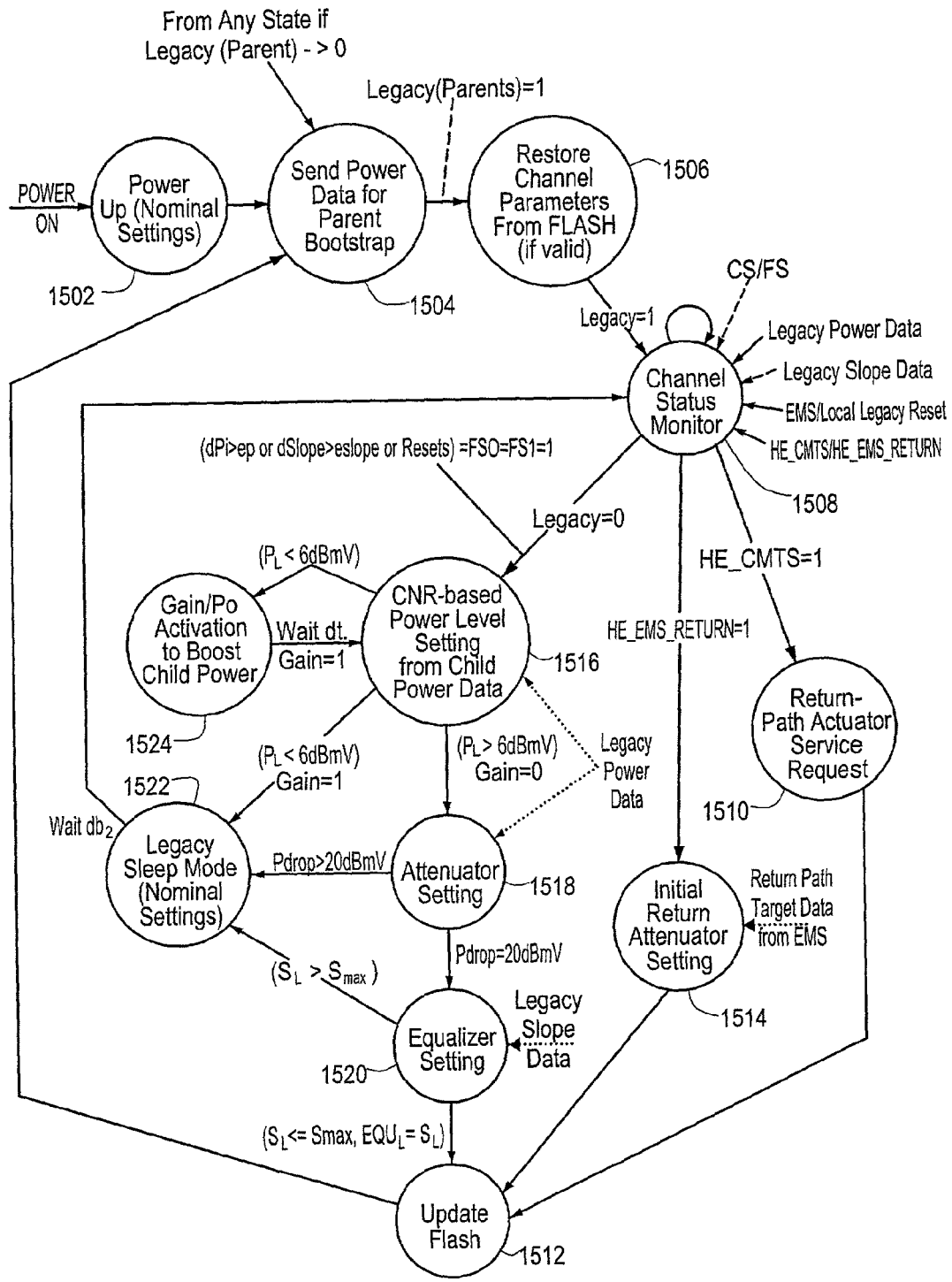
FIG. 47 illustrates a state diagram for a legacy bootstrap.

A state machine for legacy RF initialization is shown in FIG. 47. Upon power up 1502, the first step is to measure, and then transmit to the parent, the legacy input power level at 1504. This input power data is used by the parent during its through path gain activation decision process. The next step at 1506 in the legacy initialization and auto-configuration process involves a restoration of settings from FLASH memory for possible rapid recovery from disruptions such as power hits. After the FLASH-based parameter restoration has taken place, the channel status monitoring state is entered at 1508, where a comparison of new power and slope data to previous measurement results from FLASH is used to determine whether an adaptation cycle is in order. If there has been a significant change in cable plant characteristics since the last adjustment, a legacy-adjust hold is sent to the child, and another cycle of calibrations is performed.

The downstream calibration process involves three basic steps. The first step 1516 involves determining whether the through path gain is required based on input power telemetry data from the downstream child. The second step involves adjustment of attenuator settings 1518 in order to provide 20 dBmV at each of the drop ports. The last of the three steps involves the adjustment of a voltage-controlled bridged-T equalizer at 1520 in order to compensate for the frequency dependent loss characteristic of the coaxial line. After the three downstream legacy adjustments have been completed, the results are written to FLASH memory at 1512, a legacy acknowledgment (Legacy=1) is sent to the child via the Out-Of-Band (OOB) telemetry channel, and the channel-status-monitoring mode 1508 is reentered.

Upstream return-path adjustments are initiated by the EMS, and require that data from all of the elements in the trunk and branch topology be sent to the EMS prior to onset of the adjustment process. EMS initial return-path attenuation settings will be extrapolated from loss data taken during the downstream adjustment phase. Afterward, CMTS initiated service requests via the EMS to fine tune attenuator settings will be accommodated. Otherwise, settings will be adapted in concert with downstream adaptations. After completion of legacy bootstrap, non-subscribing ports will be deactivated.

Figure 48A:
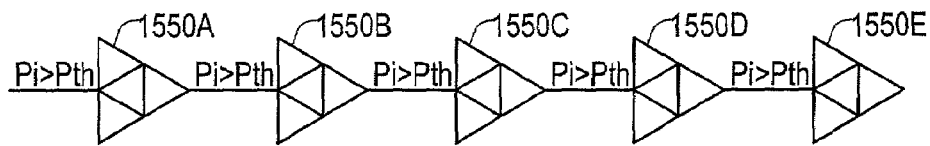
FIGS. 48A–48C illustrate gain-redistribution in a segment of the present system.
Figure 48B:
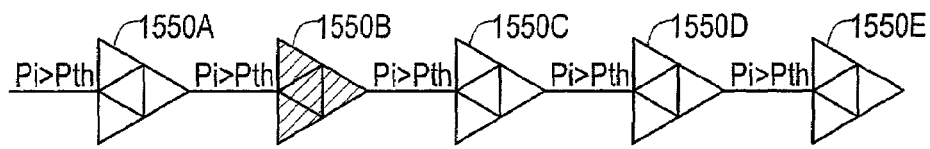
Figure 48C:
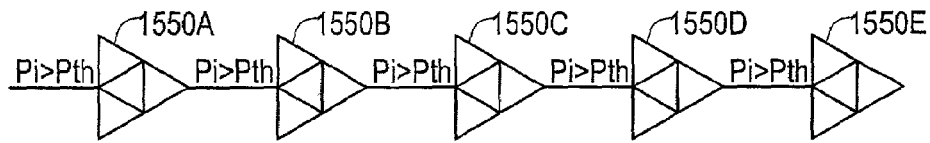

The gain-redistribution feature of the present system provides a very powerful way to adapt to amplifier-failure events, and therefore, facilitate fault tolerance in the legacy channel. FIGS. 48A–48C show an exemplary segment of the Access Network that includes a series of network elements 1550A, 1550B, 1550C, 1550D, 1550E. Initial amplifier activation choices are driven by the triple-C requirements of the cable-TV industry for analog video quality as indicated by the measurements shown in FIG. 48A for each element. Afterward, the adaptation process is triggered in the event of an otherwise unexplained drop in legacy input power at a given element, e.g., element 1550B, as shown in FIG. 48B. In order to ensure adequate CNR performance, the suspect amplifier is bypassed, and the previous upstream amplifier is activated as shown in FIG. 48C. This approach is intuitively correct because the suspect amplifier would not have been originally activated unless absolutely necessary in order to preserve CNR in the first place. Once the new amplifier activation has taken place, the legacy bootstrap automatically ripples downstream as previously explained.

Auto-Configuration Capabilities and Initialization

The Access Network system includes automatic configuration, measurement, adjustment, bootstrapping, provisioning, Built In Self-Test (BIST), and Fault Recovery mechanisms.

A quadrature nulling based slope equalization technique, combined with sub-ranging AGC capability, add analog adaptive channel equalization capability to the 16-QAM modem embodiment described above (FIG. 3). Further, when operated in conjunction with a companion modem, a BIST feature includes full analog loop-back BERT capability that can verify full 100 Mb/s and 1 Gb/s functionality of each modem under test at all carrier frequency options. When combined with fault isolation techniques incorporated within the BIST procedure, an additional bypass switch feature allows for circumventing network elements with failed modems, and therefore, rapidly restoring the Access Network topology. Carrier and Symbol synchronization are performed using traditional PLL and DLL techniques respectively.

After a DHCP-based discovery process and dynamic address assignment is performed, an array of element measurement/adjustment data and keep-alive/heartbeat information is forwarded, via SNMP, to the EMS for storage as objects in a family of Management Information Bases (MIBS). In addition to its use in tracking the general health of the Access Network and legacy services of the present system, the MIBS are also used to perform additional adjustments for return-path equalization of plant ingress in DOCSIS applications.

At any given element along the sequential ripple path from ODS to the end of the trunk and branch structure, the address assignment procedure must be completed by each parent before children are allowed to do the same. Therefore, even though Access Network PHY-Level and Legacy Bootstrap operations of offspring will occur simultaneously with parental address assignment in order to expedite system bootstrap, all attempts by children to communicate with the NMS prior to a successful 4-way parental handshake will be blocked.

System Bootstrap and MODEM Setup Procedure

Figure 49:
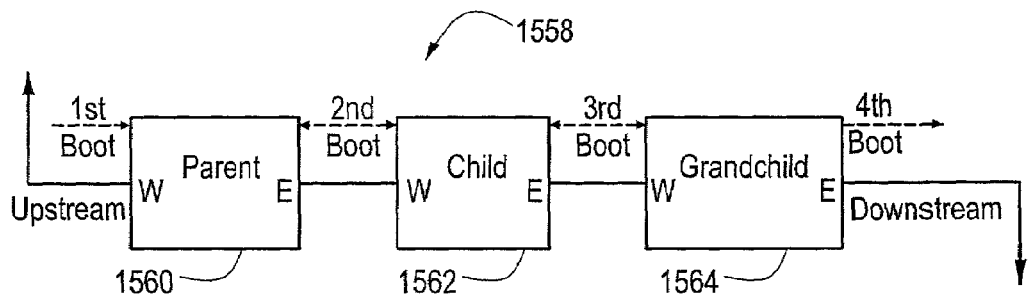
FIG. 49 illustrates modem bootstrap communication along a segment of the present system.

The system initialization paradigm involves a ripple-fashion bootstrapping sequence, originating at each ODS and propagating along DS trunks, and in turn, along Tap branches as shown in FIG. 49 which shows a branch or segment 1558. Upon power-up or EMS Reset, BIST is performed between east and west modems of each element (parent 1560, child 1562 and grandchild 1564) to confirm full analog loop-back with acceptable BER performance.

After completion of BIST, the next step in the bootstrap process involves an upstream handshake operation. Downstream transmissions are not made until successful upstream handshake is complete. Upstream link establishment includes AGC and slope equalization, carrier recovery, frame recovery, and loop-back transmission to parent using a complementary carrier frequency. Successful upstream loop-back enables downstream transmissions and invokes upstream link status monitoring. Repeated failed attempts at upstream link establishment, or loss of upstream carrier SYNC, results in a BIST operation being triggered. Failure of BIST, or CPU, triggers bypass and manual servicing.

Downstream link establishment includes complementary transmission at east port modems and default transmission on drop port modems (complementary transmission on all four DS ports). As in upstream link establishment, carrier and frame SYNC are followed by loop-back through each child. East port modem link inactivity timeouts triggers BIST, but drop modem link inactivity does not. Finally, FLASH memory is used to store element configuration settings for possible rapid recovery after disruptions such as those caused by, e.g., power hits.

Figure 50:
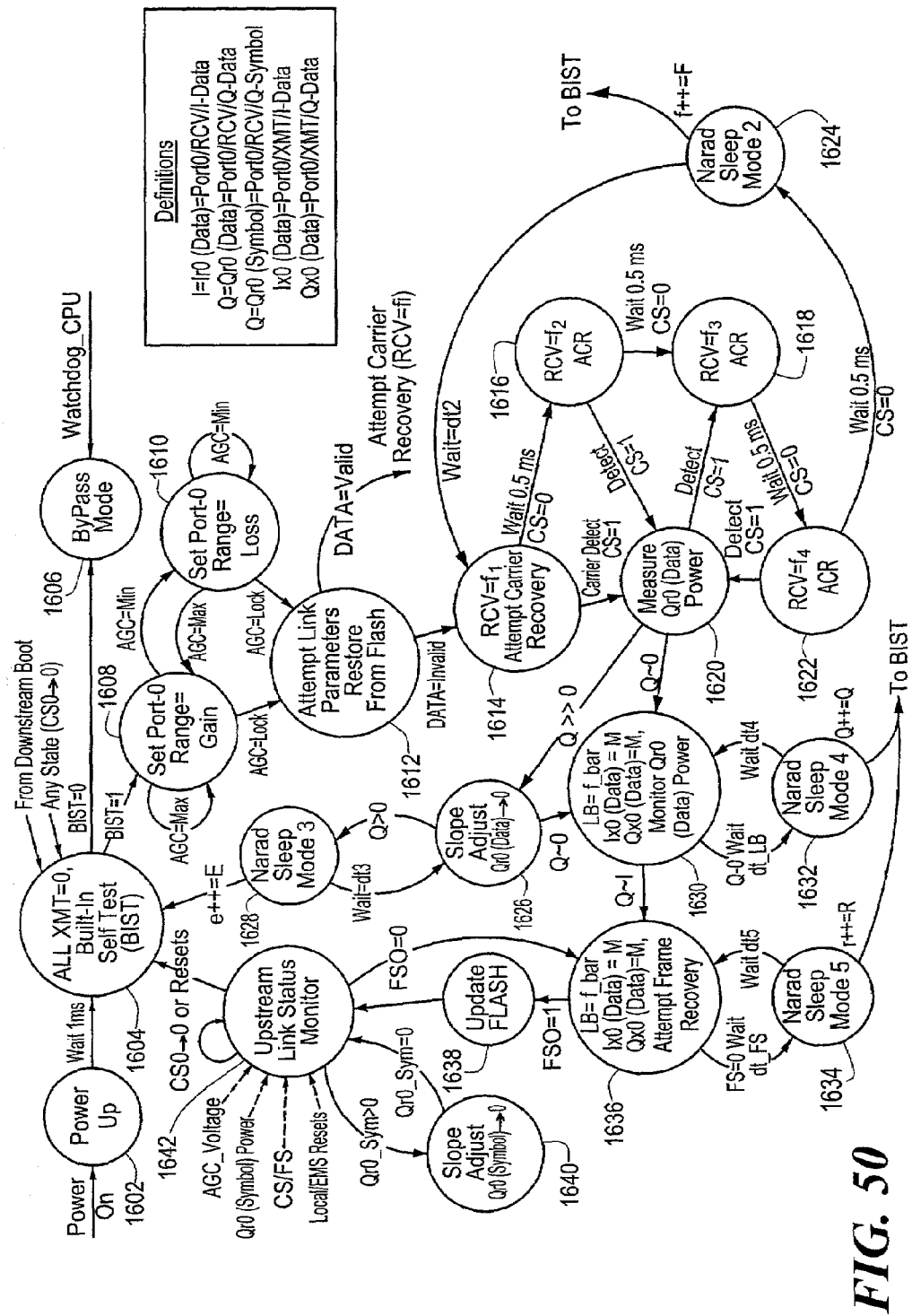
FIG. 50 illustrates a modem upstream bootstrap state machine.

An upstream bootstrap state machine is shown in FIG. 50. Modem bootstrap is initiated from either power-up, loss of carrier, or EMS reset states 1602. After termination of transmission at all ports, a BIST operation is performed 1604, which involves BER testing (BERT) of a full analog loop-back between east and west modems. The BERT is performed over the entire carrier frequency and data rate space in both directions in order to ensure full upstream and downstream modem functionality.

If BIST fails, or the CPU fails, then modem bypass mode 1606 is triggered, wherein traffic flows through the device for regeneration at the next modem location. As a consequence of the modem bypass, and if the CPU remains functional, legacy gain and slope is set based on input power level and upstream/downstream cable loss data stored in FLASH memory. If the CPU is not functional, then legacy gain is bypassed and equalizer/attenuator settings will revert back to hard-wired nominal values.

Upon a successful BIST operation, the next step in the upstream boot operation involves the range control of an Automatic-Gain Control (AGC) circuit. Initially, the most sensitive range setting is chosen, and the AGC control voltage is monitored 1608. If the control voltage is within the normal locking range, the most sensitive AGC range setting is appropriate, and carrier recovery can begin at 1614. However, an AGC control voltage outside of the normal locking range may require either a change of AGC range, or a wait for signal return, or both. For example, when the AGC is already in the most sensitive mode (with gain) and the signal power level remains below the AGC-lock limit, then nothing else can be done. In fact, the signal may not be present at all.

After an AGC lock condition is achieved, the next step in the process involves recovering carrier. In an attempt to possibly expedite rapid carrier synchronization, previous settings stored in FLASH are used as an initial seed at 1612. If unsuccessful, the local oscillator is cycled through each of the carrier frequency possibilities at 1614, 1616, 1618, 1622 in order to locate the parent's carrier. A correct carrier frequency choice by the local oscillator will enable a PLL to automatically lock onto the incoming signal, which in turn, will cause the Carrier SYNC (CS) flag to be set. On the other hand, failure to recover carrier will eventually result in another BIST operation at 1604.

Beyond carrier recovery, slope equalization is performed using a Quadrature Nulling (QN) technique starting at 1620. The QN technique involves a four-way handshake, which is facilitated by the parent initially sending only In-Phase Data. The QN technique involves adaptively adjusting the slope equalizer until Q-Channel integrated data power is at a local minimum. Beyond initial slope adjustment during boot, periodic QN-based tweaking of the slope equalizer setting is possible during the symbol synchronization period of the frame.

Once the slope equalizer adjustment is completed, I-Channel data is looped back to the parent on the complementary carrier frequency. This upstream transmission mode is sustained until Q-Channel data is received from the parent, which is indicative of successful parental AGC, Carrier SYNC, and slope-equalization operations. Upon Q-Channel reception from parent, reciprocation with Q-Channel data loop-back will take place, to complete the four-way handshake. At this point since RF Loop Back (RFLB) is complete (i.e., I and Q data is present), an attempt at symbol synchronization and frame recovery is possible. An automated DLL technique will slide the data in order to align for maximum eye opening, and hence minimum BER performance. Once the DLL self adjusts, and symbol synchronization has taken place, framing can take place at 1636. Successful framing will cause the FS flag to be set, at which time a write to FLASH at 1638 will take place in order to store all current settings for possible rapid recovery in the event of power loss or cable cut, for example.

After a write to FLASH, the steady-state condition involves continuous monitoring of link status at 1642, including CS, FS, slope drift, etc. In the event that the coaxial slope characteristics begins to drift beyond reasonable error bounds, a symbol-SYNC period QN procedure will take place at 1640 until a return to acceptable limits is attained.

Figure 51:
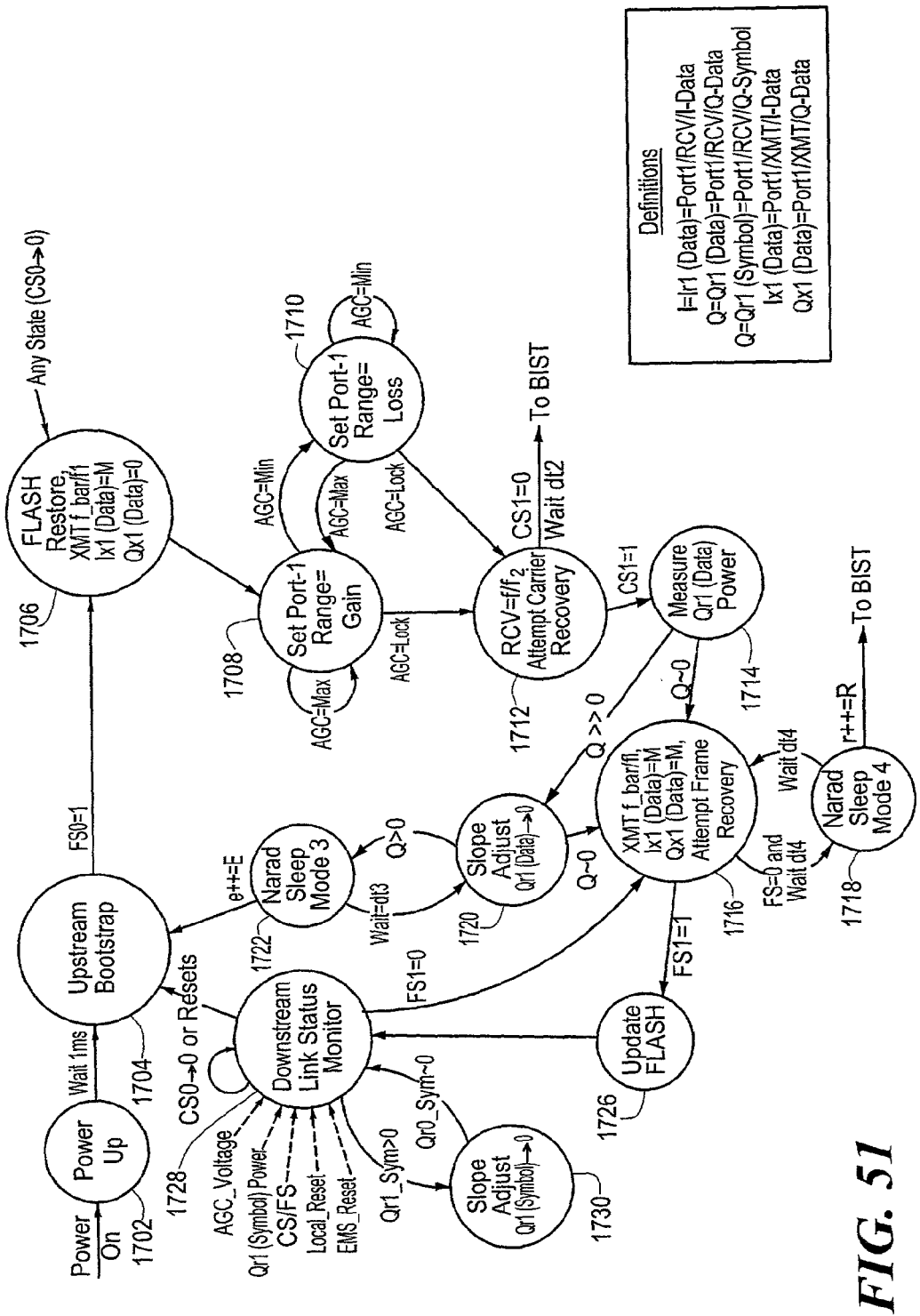
FIG. 51 illustrates a modem downstream bootstrap state machine.

Once the upstream bootstrap has been completed (i.e., FS0=1), downstream bootstraps begin on the east port and each of the drop ports. A downstream bootstrap state machine is shown in FIG. 51. The first step at 1706 following the start of the process involves transmitting In-Phase data on a complementary carrier frequency from the east port in order to facilitate slope equalization at the receiving end. The first step also involves the restoration of equalizer settings from FLASH in preparation for possible rapid convergence during loop-back from the child. The next step involves the same AGC range setting procedure as in the upstream case, and requires a return carrier signal from the downstream modem. As in the upstream case, once the AGC is in lock, it is possible to establish carrier synchronization. However, in the downstream case, the correct carrier frequency is known a priori. Therefore, the local oscillator frequency is set to f (which is the same carrier received during the upstream boot operation) in the case of the east modem.

Once carrier recovery is achieved (CS1=1), QN-based slope equalization can be performed. Successful slope equalization will be conveyed to the child by transmitting Q-Channel data as well as I-Channel data. When the child eventually reciprocates with Q-Channel data, the frame recovery process can begin at 1716 as was done in the upstream boot procedure. Successful frame synchronization (FS1=1) will be followed by another write to FLASH at 1726 in order to provide for possible boot acceleration during recovery from power hits, etc. Post boot coaxial cable slope drift will be corrected in exactly the same manner as described in the upstream boot procedure.

MODEM Built In Self Test (BIST)

A BIST capability is included in the present system to facilitate troubleshooting, fault localization, and bypass activation in the event that a given modem is malfunctioning. An internal RF coupling path is provided in the network element (FIG. 10) to enable full analog loop-back capability. In the BIST mode, BER testing is performed in both directions, at both data rates, and at all four carrier frequencies. The BIST operation involves the generation of a Pseudo-Random Bit Sequence (PRBS) in the CPU, which in turn, is loaded into the ASIC for transmission through the cascade of modems under test. Once received, the data is checked for bit errors, and the process is repeated with several PRBS vectors, at each carrier frequency, data rate, and direction setting.

MODEM Fault Detection and Bypass Recovery

Figure 52:
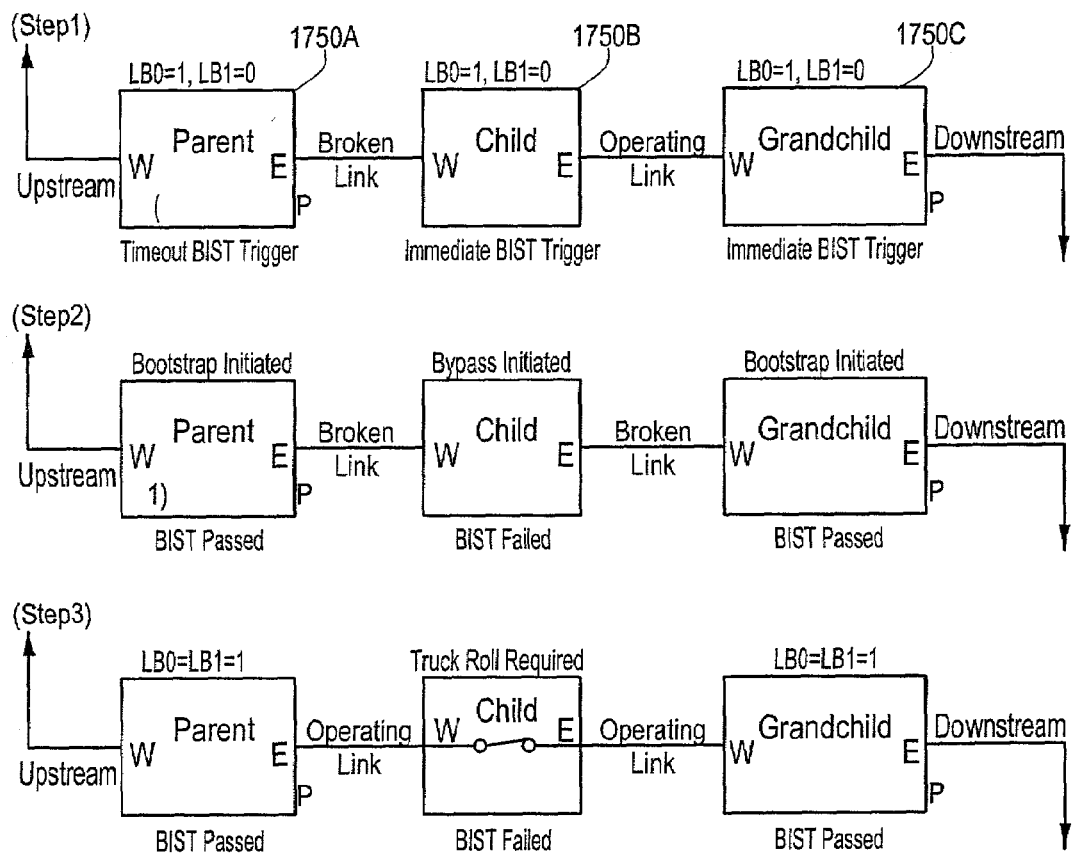
FIG. 52 illustrates modem BIST, bypass and fault recovery.

The use of BIST capability in fault detection and recovery is shown in FIG. 52 which shows a segment or branch of parent, child, grandchild devices 1750A, 1750B, 1750C, respectively. Each of the steps from broken link to restoration are shown, with the overarching principle being that each network element makes an independent decision as to whether it should place itself into modem bypass mode.

It will be apparent to those of ordinary skill in the art that methods disclosed herein may be embodied in a computer program product that includes a computer usable medium. For example, such a computer usable medium can include a readable memory device, such as a hard drive device, a CD-ROM, a DVD-ROM, or a computer diskette, having computer readable program code segments stored thereon. The computer readable medium can also include a communications or transmission medium, such as a bus or a communications link, either optical, wired, or wireless, having program code segments carried thereon as digital or analog data signals.

It will be further apparent that those skilled in the art should readily appreciate that the programs defined herein are deliverable in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable by a processor or as a set of instructions embedded in a carrier wave. Alternatively, the operations and methods may be embodied in whole or in part using hardware components, such as Application Specific Integrated Circuits (ASICs), state machines, controllers or other hardware components or devices, or a combination of hardware, software, and firmware components.

While the system and method disclosed herein have been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. In a network having plural intelligent network elements, a method of discovering the network topology comprising:

sending a first message from one of the intelligent network elements on a transmission path to a topology server, the first message including information identifying the one intelligent network element wherein the information identifying each intelligent network element in the first message includes MAC address and physical port information for each corresponding intelligent network element;

at each intermediate intelligent network element in the transmission path, appending to the first message information identifying each intermediate intelligent network element;

wherein each intelligent network element includes a switch.

2. In a network having plural intelligent network elements, a method of discovering the network topology comprising:
sending a first message from one of the intelligent network elements on a transmission path to a topology server, the first message including information identifying the one intelligent network element wherein the first message comprises a DHCPDISCOVER message including an options field having the information identifying each network intelligent element in the transmission path;
at each intermediate intelligent network element in the transmission path, appending to the first message information identifying each intermediate intelligent network element;
wherein each intelligent network element includes a switch.

3. The method of claim 1 further comprising sending a second message from the topology server to the one intelligent network element, the second message including a routing ID for the one intelligent network element.

4. The method of claim 3 wherein the second message comprises a DHCPOFFER message.

5. The method of claim 1 further comprising sending a third message from the one network element to the topology server periodically, the third message including information identifying the one intelligent network element.

6. The method of claim 5 wherein the third message comprises a DHCPINFORM message including an options field having the information identifying each intelligent network element in the transmission path.

7. The method of claim 1 wherein the plural intelligent network elements are interconnected using point-to-point data links over a tree and branch network.

8. A system comprising:
a topology server;
plural intelligent network elements, each intelligent network element including a switch, at least one intelligent network element operable to send a first message from one of the intelligent network elements on a transmission path to the topology server, the first message including information identifying the one intelligent network element wherein the information identifying each intelligent network element in the first message includes MAC address and physical port information for each corresponding intelligent network element;
each intermediate intelligent network element in the transmission path operable to append to the first message information identifying each intermediate network element.

9. A system comprising:
a topology server;
plural intelligent network elements, each intelligent network element including a switch, at least one intelligent network element operable to send a first message from one of the intelligent network elements on a transmission path to the topology server, the first message including information identifying the one intelligent network element wherein the first message comprises a DHCPDISCOVER message including an options field having the information identifying each intelligent network element in the transmission path;
each intermediate intelligent network element in the transmission path operable to append to the first message information identifying each intermediate network element.

10. The system of claim 8 wherein the topology server is operable to send a second message to the one intelligent network element, the second message including a routing ID for the one intelligent network element.

11. The system of claim 10 wherein the second message comprises a DHCPOFFER message.

12. The system of claim 8 wherein the one intelligent network element is further operable to send a third message to the topology server periodically, the third message including information identifying the one intelligent network element.

13. The system of claim 12 wherein the third message comprises a DHCPINFORM message including an options field having the information identifying each intelligent network element in the transmission path.

14. The system of claim 8 wherein the plural intelligent network elements are interconnected using point-to-point data links over a tree and branch network.

* * * * *